(12) United States Patent
Broadhurst et al.

(10) Patent No.: US 8,817,609 B2
(45) Date of Patent: Aug. 26, 2014

(54) COMMUNICATIONS SYSTEM AND METHOD FOR LOAD MANAGEMENT

(75) Inventors: Ian Broadhurst, Rugby Warwickshire (GB); Anthony Peter Lumb, Warwickshire (GB); Donald David Stewart, West Midlands (GB)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1814 days.

(21) Appl. No.: 11/570,008

(22) PCT Filed: May 25, 2005

(86) PCT No.: PCT/EP2005/052387
§ 371 (c)(1),
(2), (4) Date: Dec. 12, 2007

(87) PCT Pub. No.: WO2005/120087
PCT Pub. Date: Dec. 15, 2005

(65) Prior Publication Data
US 2008/0267064 A1  Oct. 30, 2008

(30) Foreign Application Priority Data
Jun. 4, 2004  (GB) .................................. 0412574.6

(51) Int. Cl.
*H04L 12/26* (2006.01)
*H04Q 3/00* (2006.01)

(52) U.S. Cl.
CPC ... *H04Q 3/0091* (2013.01); *H04Q 2213/13387* (2013.01); *H04Q 2213/13034* (2013.01); *H04Q 2213/13389* (2013.01); *H04Q 2213/13106* (2013.01); *H04Q 2213/13166* (2013.01); *H04Q 2213/13196* (2013.01)
USPC ........................................................ 370/230

(58) Field of Classification Search
None
See application file for complete search history.

(56) References Cited

U.S. PATENT DOCUMENTS

| | | | |
|---|---|---|---|
| 5,450,483 A * | 9/1995 | Williams | 379/112.04 |
| 5,636,212 A * | 6/1997 | Ikeda | 370/233 |
| 5,650,993 A | 7/1997 | Lakshman et al. | |
| 6,097,697 A | 8/2000 | Yao et al. | |
| 6,169,727 B1 | 1/2001 | Song | |
| 6,363,052 B1 * | 3/2002 | Hosein | 370/230 |
| 6,542,462 B1 * | 4/2003 | Sohraby et al. | 370/229 |
| 6,826,268 B2 * | 11/2004 | Adams | 379/112.04 |
| 6,882,653 B1 | 4/2005 | Kiuchi et al. | |
| 7,254,228 B2 * | 8/2007 | Segev et al. | 379/221.07 |

(Continued)

FOREIGN PATENT DOCUMENTS

| | | |
|---|---|---|
| EP | 0955749 | 11/1999 |
| EP | 0955749 A1 | 11/1999 |
| JP | 61210751 A | 9/1986 |
| JP | 2001333114 A | 11/2001 |
| JP | 2003009221 A | 1/2003 |
| JP | 2003179636 A | 6/2003 |

*Primary Examiner* — Mohammad Adhami
(74) *Attorney, Agent, or Firm* — Coats & Bennett, PLLC

(57) ABSTRACT

A communications system comprising a target node and at least one source node arranged for communication of messages there between; in which the target node comprises means for processing at least some of the messages received from the at least one source node and means for detecting the processing load of the target node; in which the target node comprises means for notifying the at least one source node when a specific processing load level has been reached or exceeded; and in which each source node comprises means for reducing, responsive to the notification, the rate at which messages are sent to the target node.

49 Claims, 47 Drawing Sheets

Message Sequence for Unsuccessful Call Initiation with Invention at Increasing Load
(Call Server Rejects Call)

(56) References Cited

U.S. PATENT DOCUMENTS

| | | |
|---|---|---|
| 7,301,903 B2 * | 11/2007 | Brady .......................... 370/230 |
| 7,391,765 B2 | 6/2008 | Tezuka et al. |
| 7,480,247 B2 * | 1/2009 | Shimojo et al. ............... 370/236 |
| 2002/0159576 A1 | 10/2002 | Adams |
| 2003/0099195 A1 | 5/2003 | Lee |
| 2004/0066743 A1 * | 4/2004 | Shimojo et al. ............... 370/229 |
| 2004/0165531 A1 * | 8/2004 | Brady .......................... 370/236 |
| 2010/0220715 A1 * | 9/2010 | Cherchali et al. ............. 370/352 |

* cited by examiner

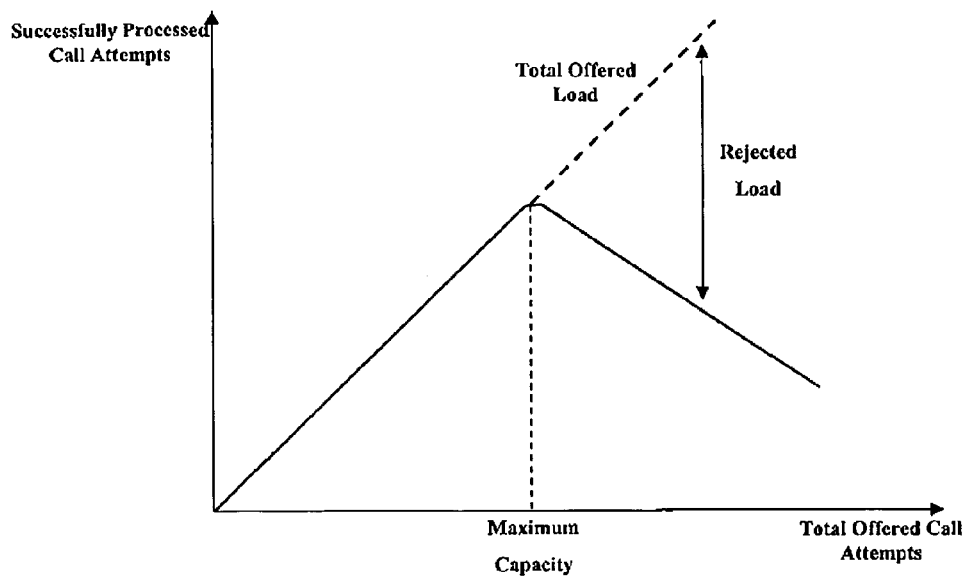
Figure 1: Typical overload behaviour of a Call Server without any other controls in place.
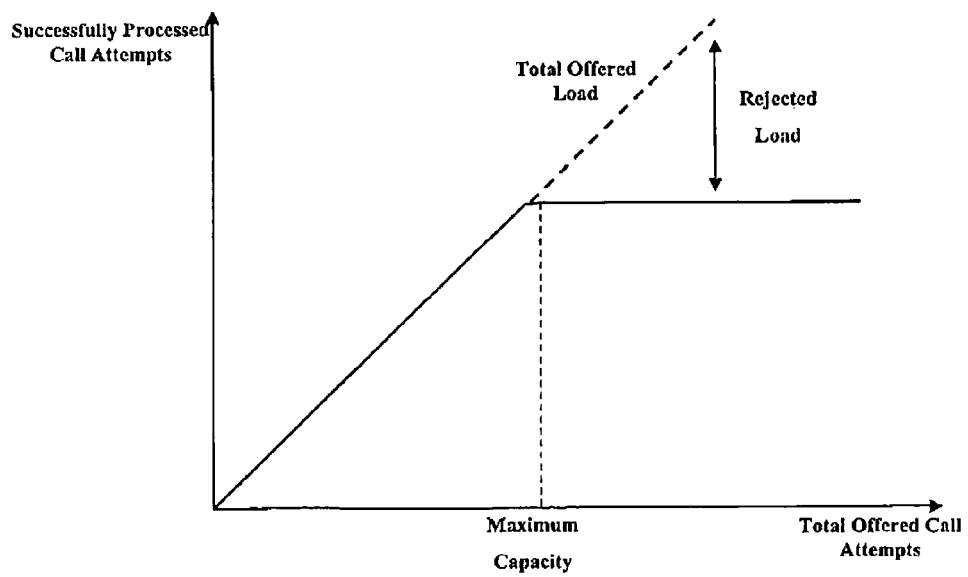
Figure 2: Typical overload behaviour of a Call Server without other controls in place.

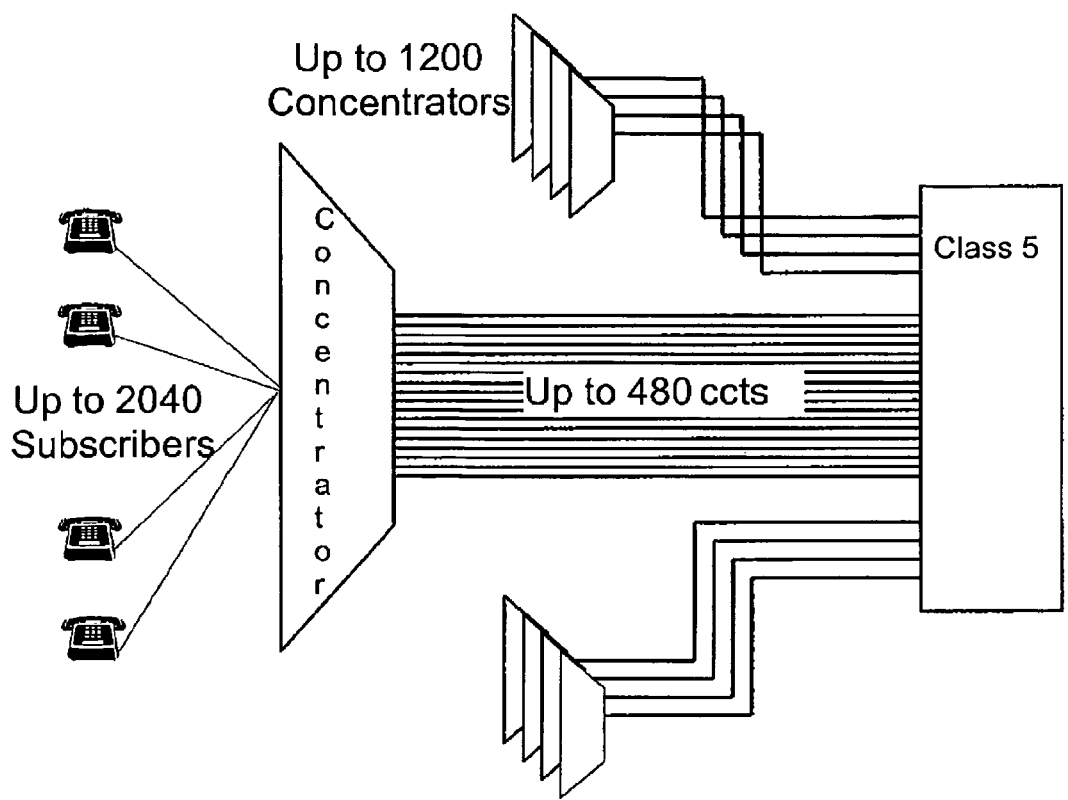
Figure 3: Access Concentrator – Class 5 relationship.

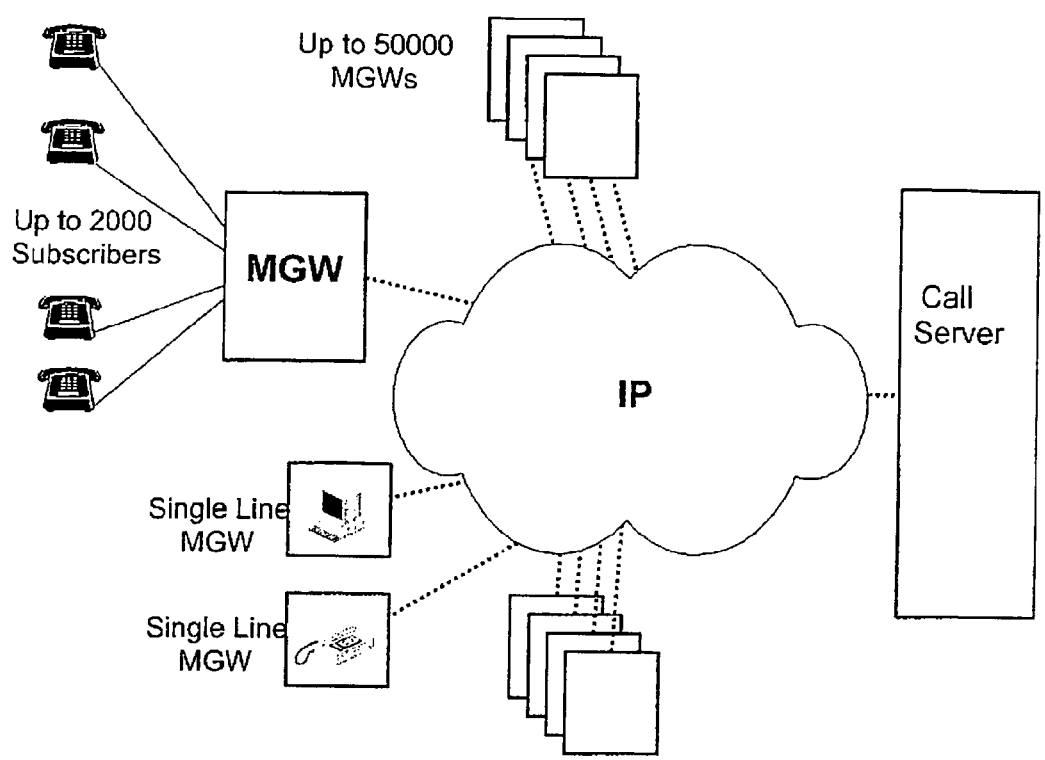
Figure 4: Media Gateway – Class 5 relationship.

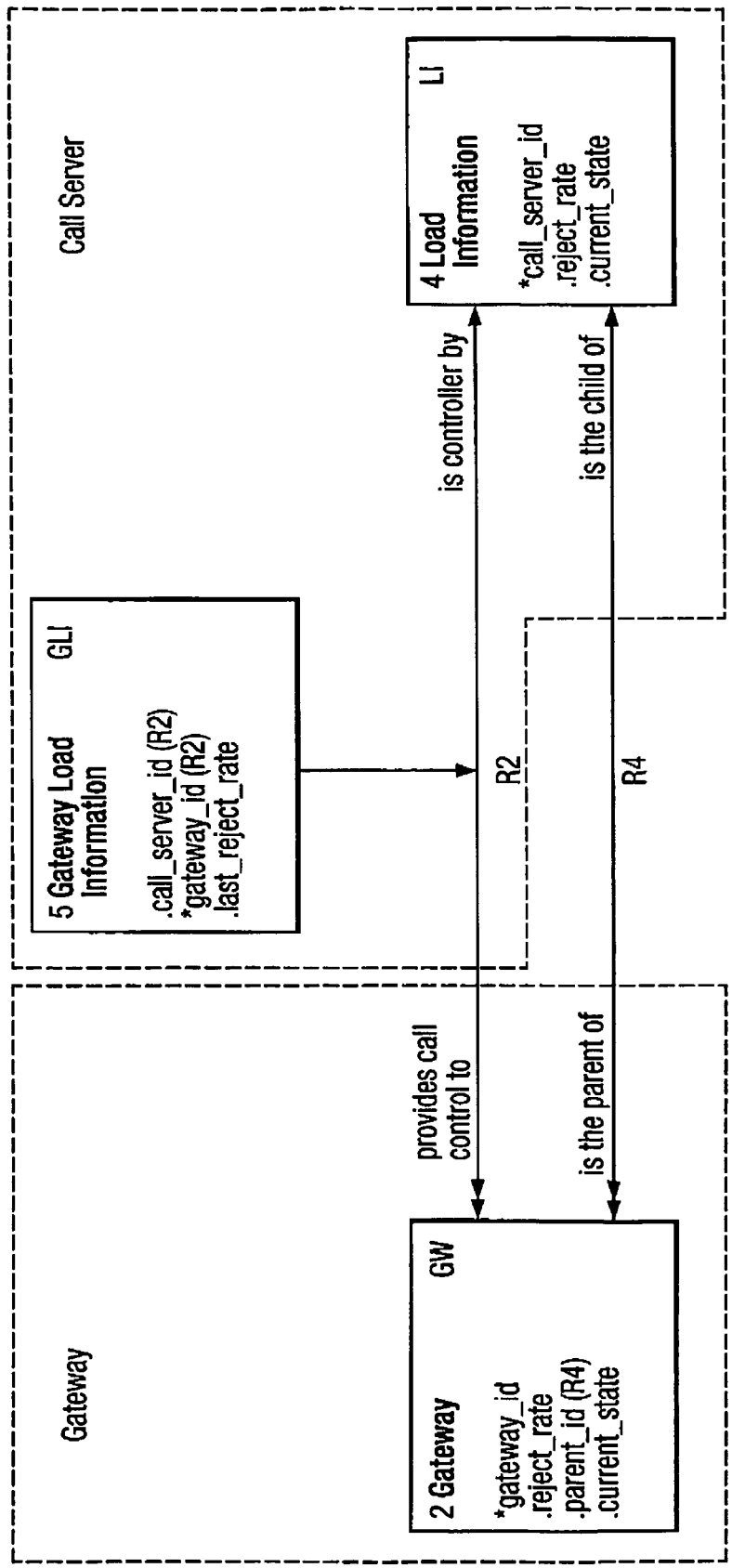

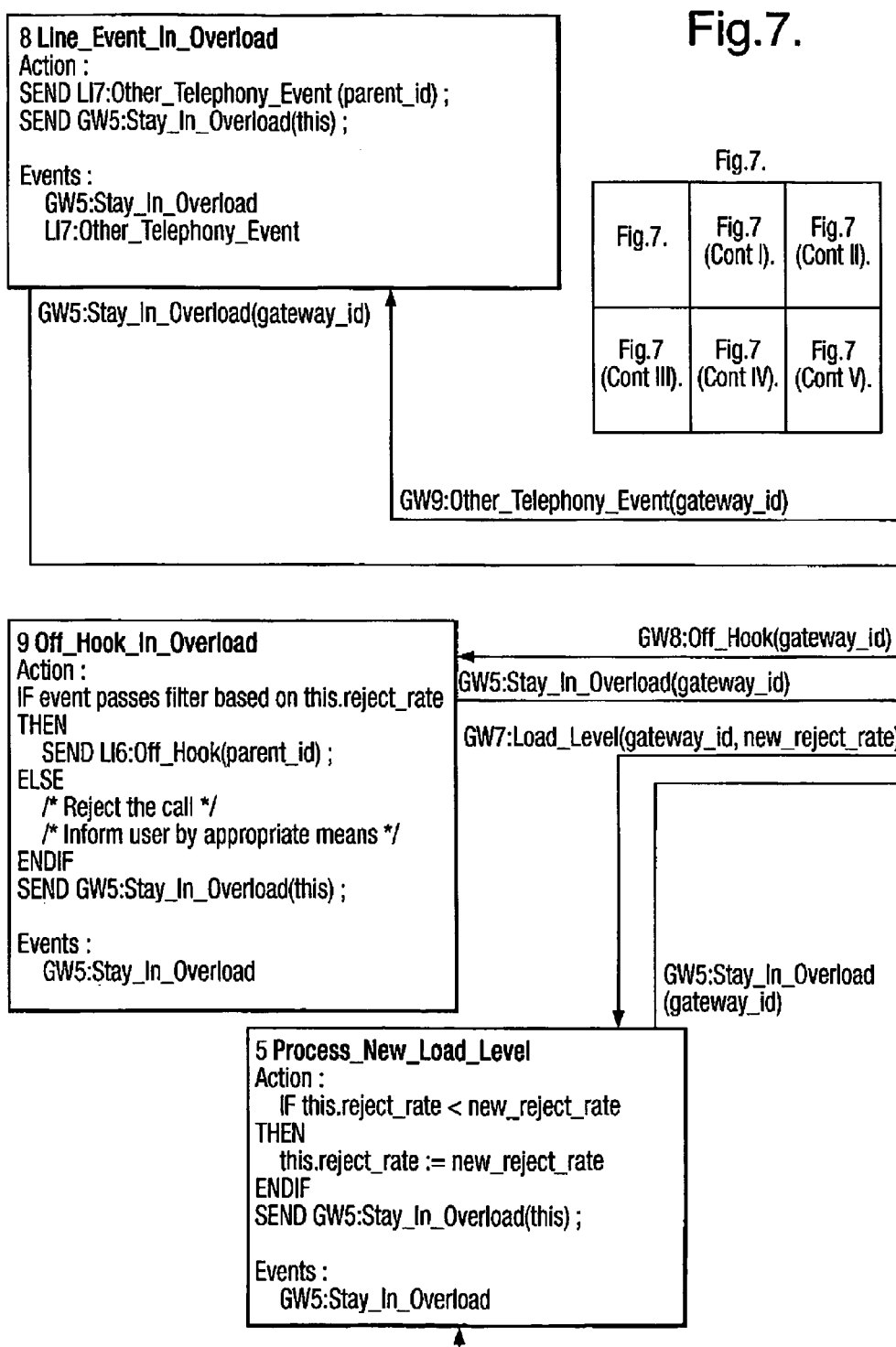

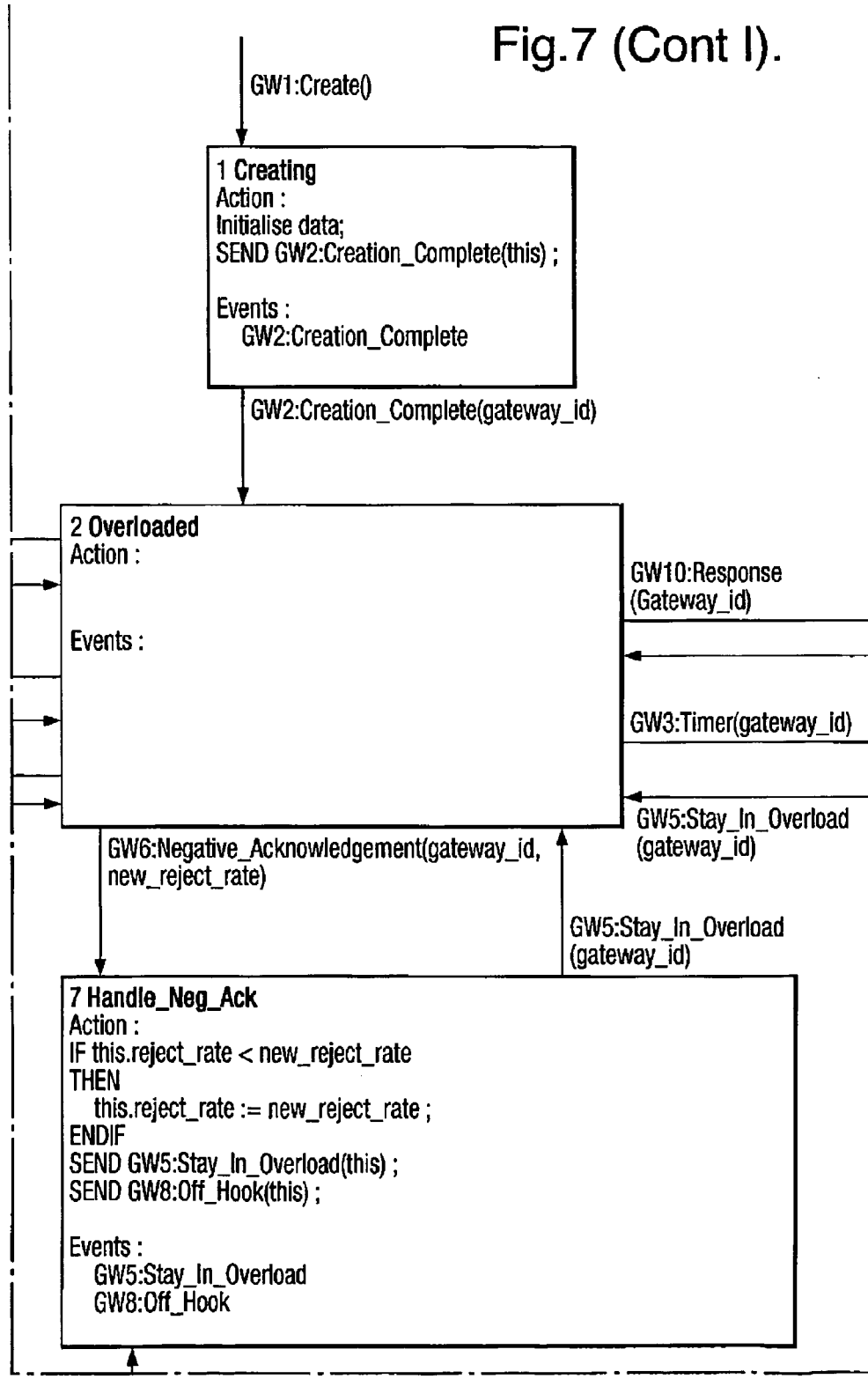

Fig.7 (Cont II).
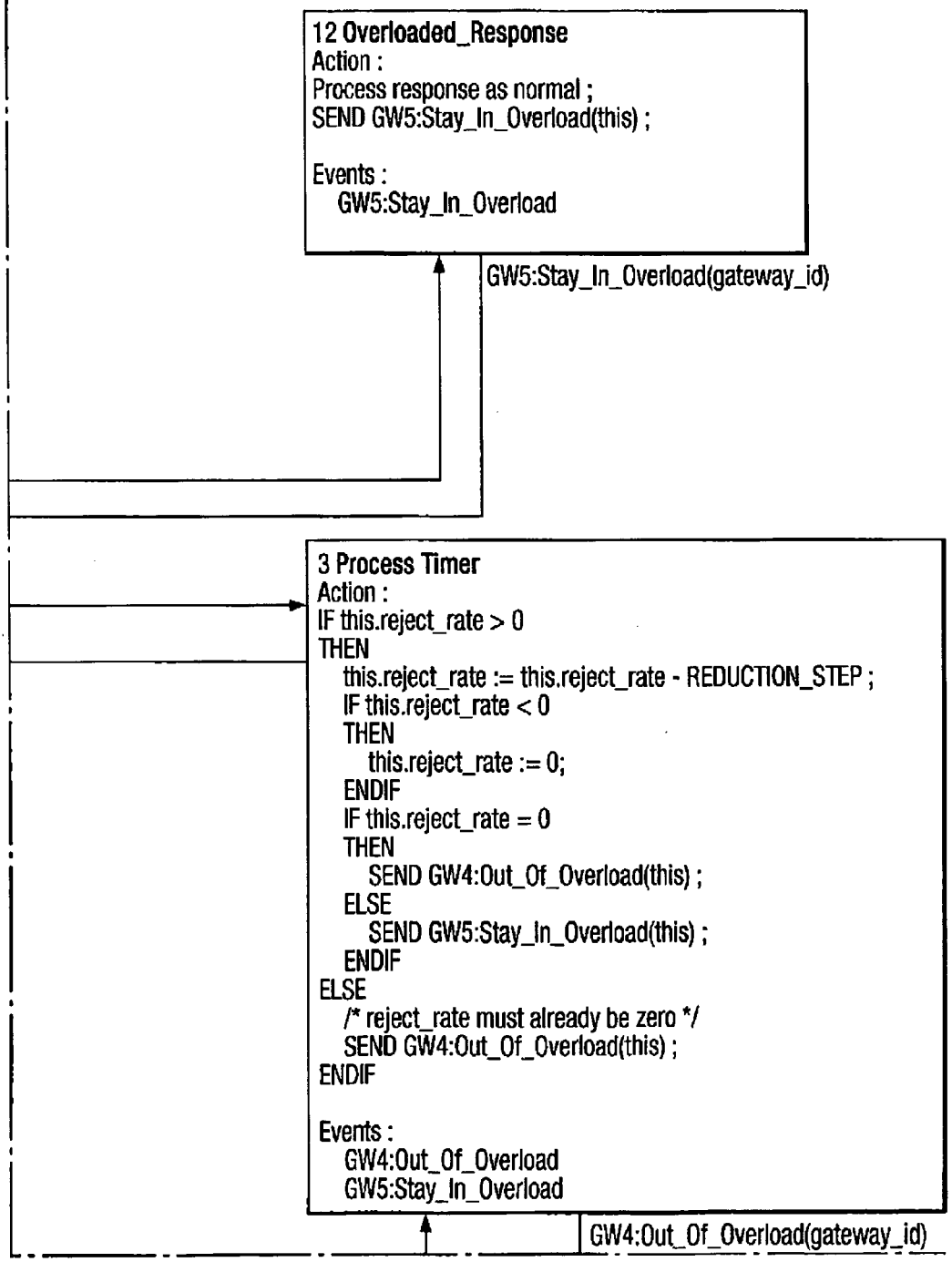

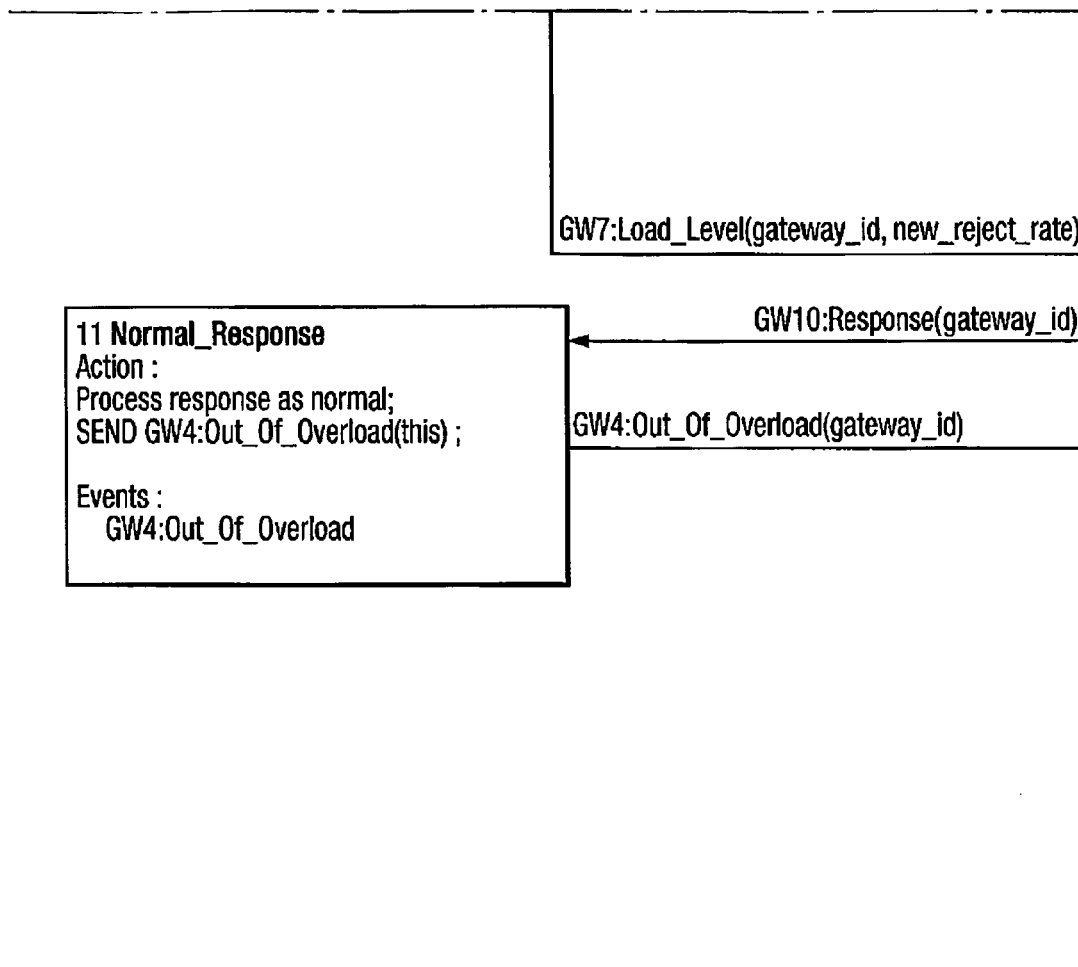
Fig.7 (Cont III).

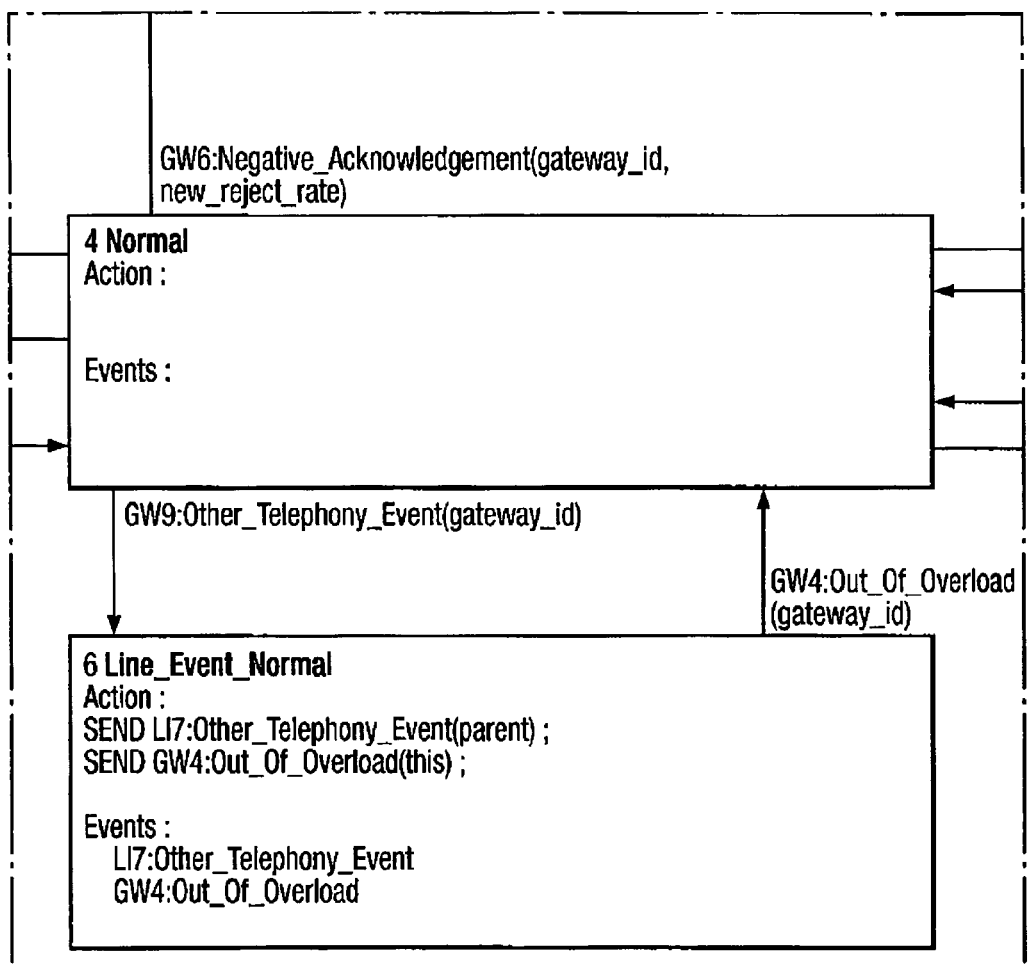
Fig.7 (Cont IV).

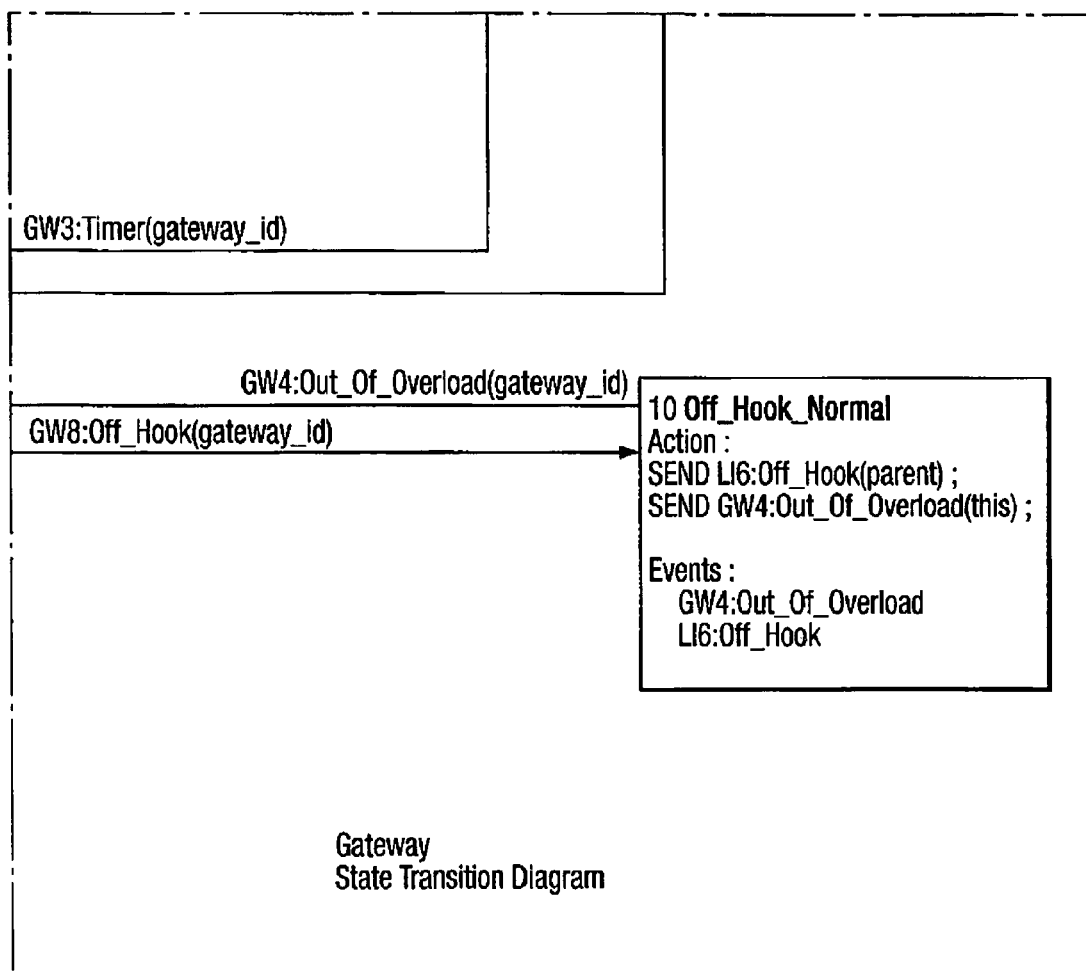
Fig.7 (Cont V).

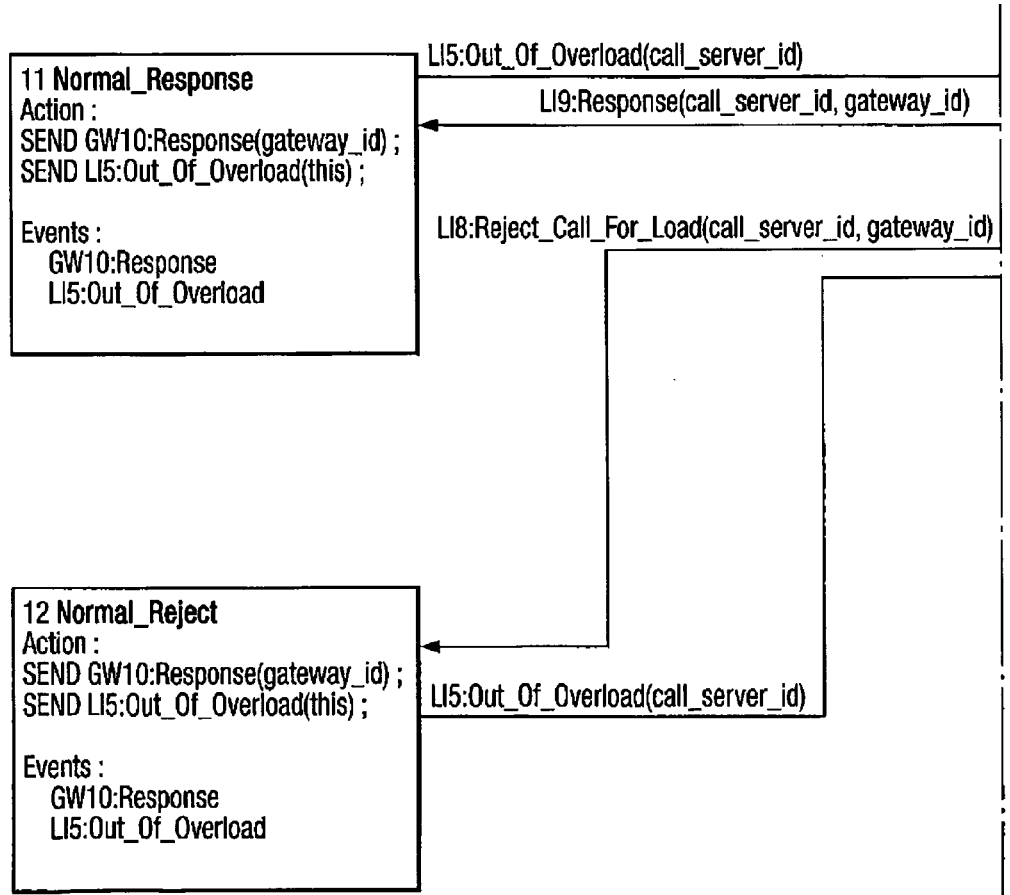

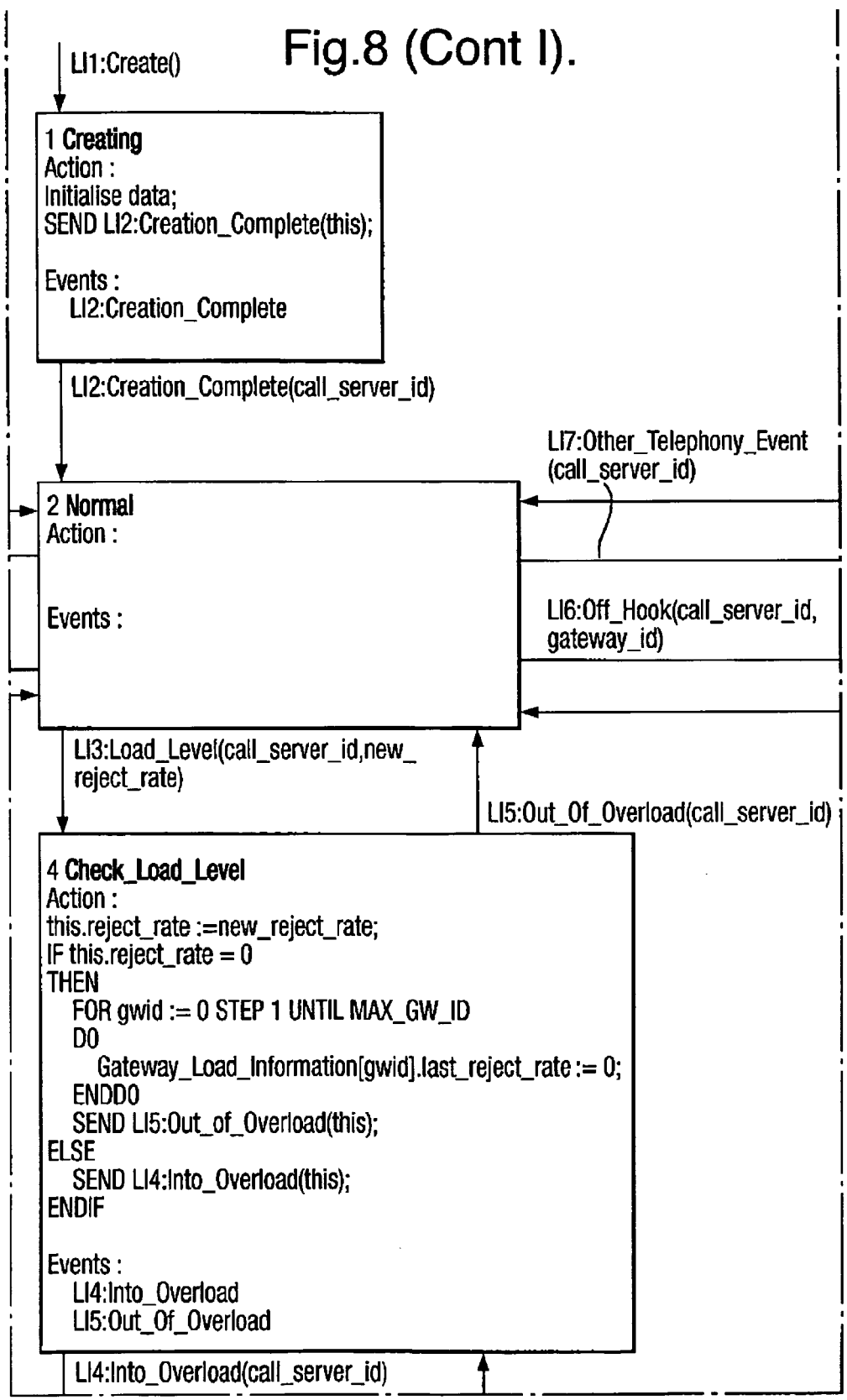
Fig.8 (Cont I).

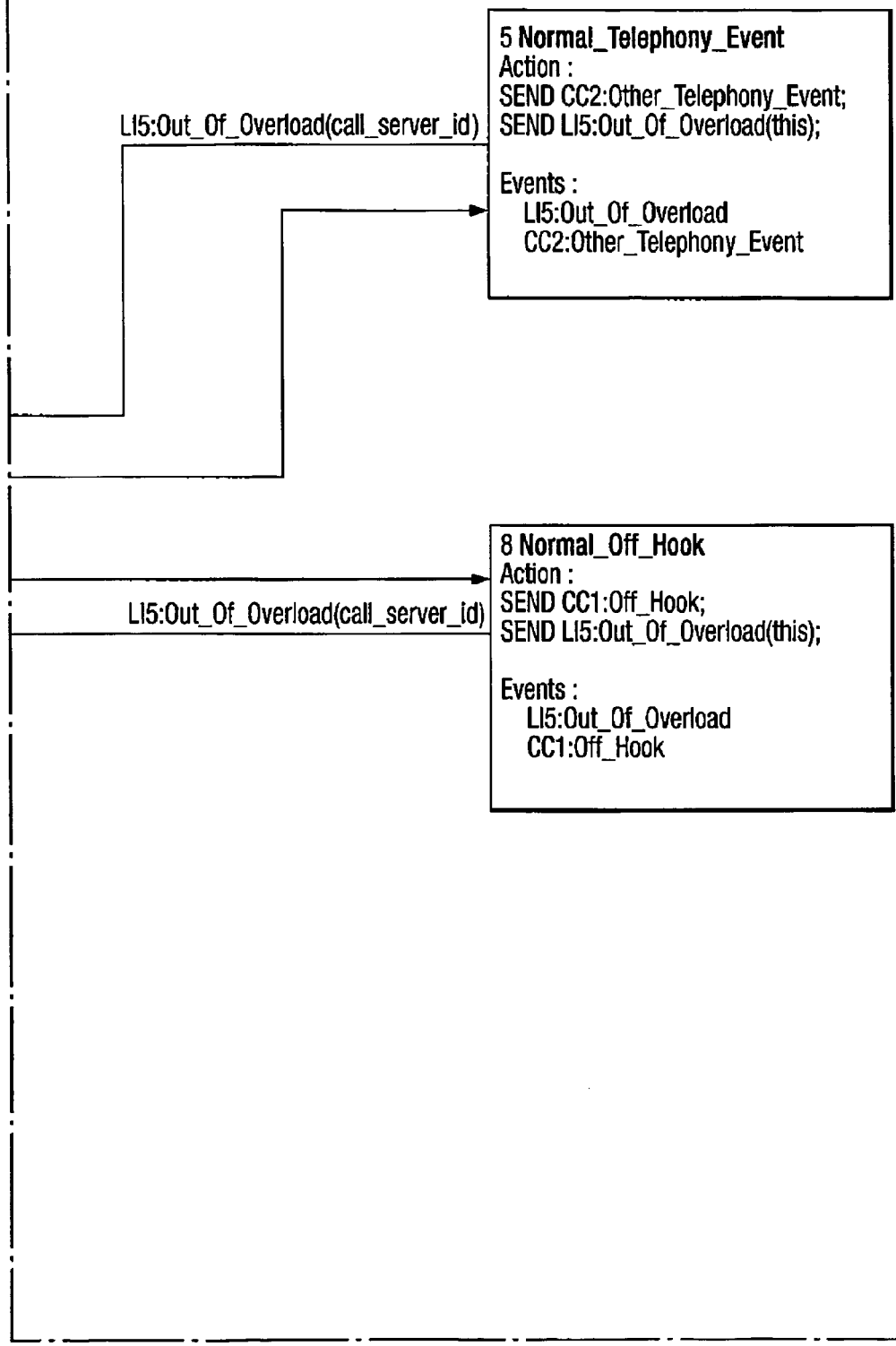

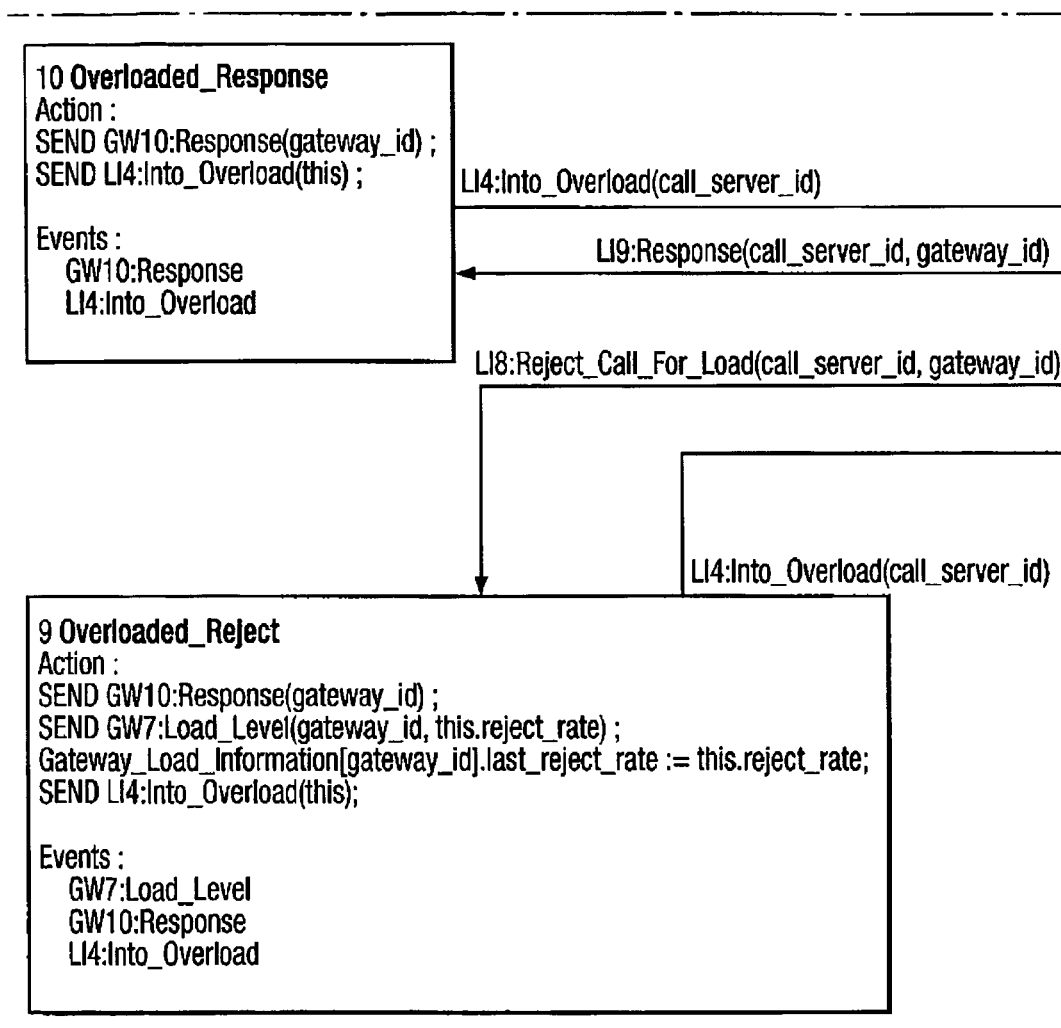
Fig.8 (Cont III).

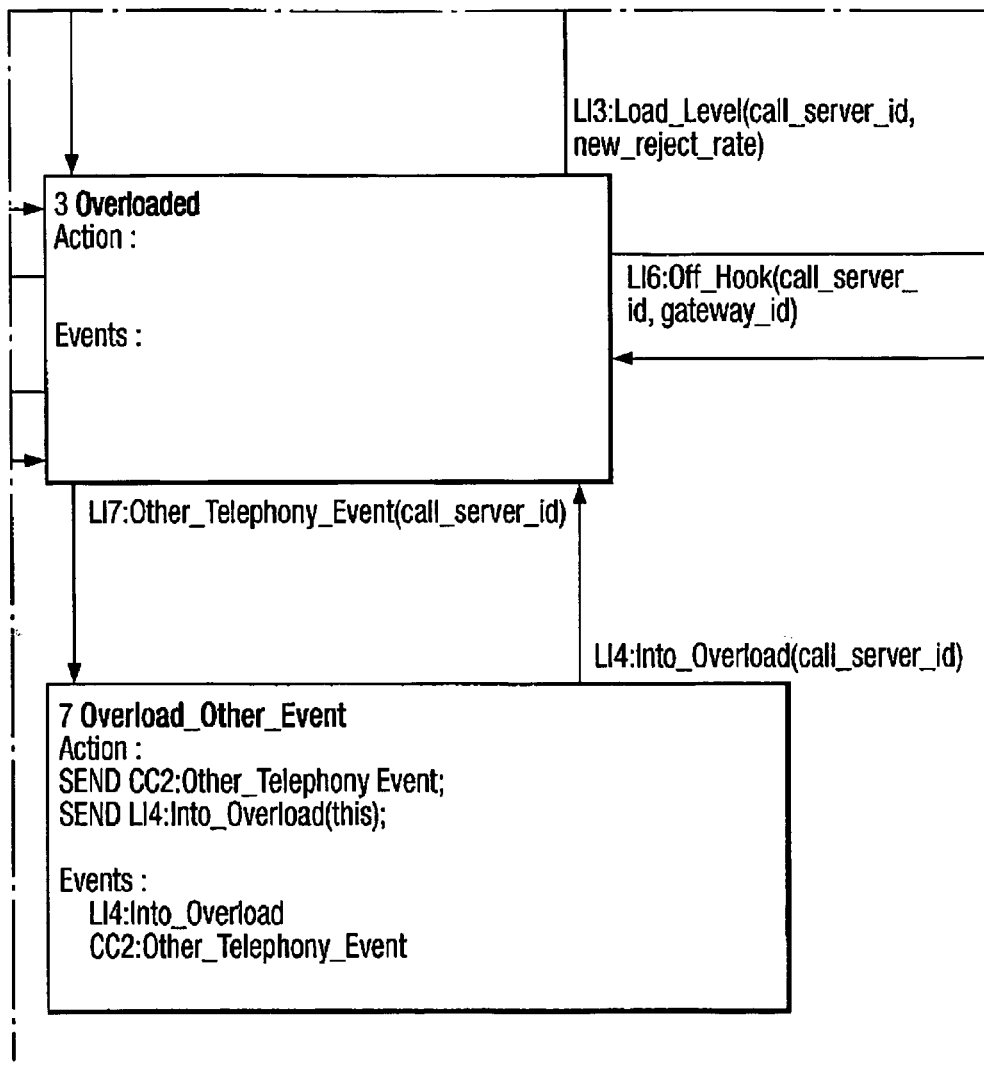
Fig.8 (Cont IV).

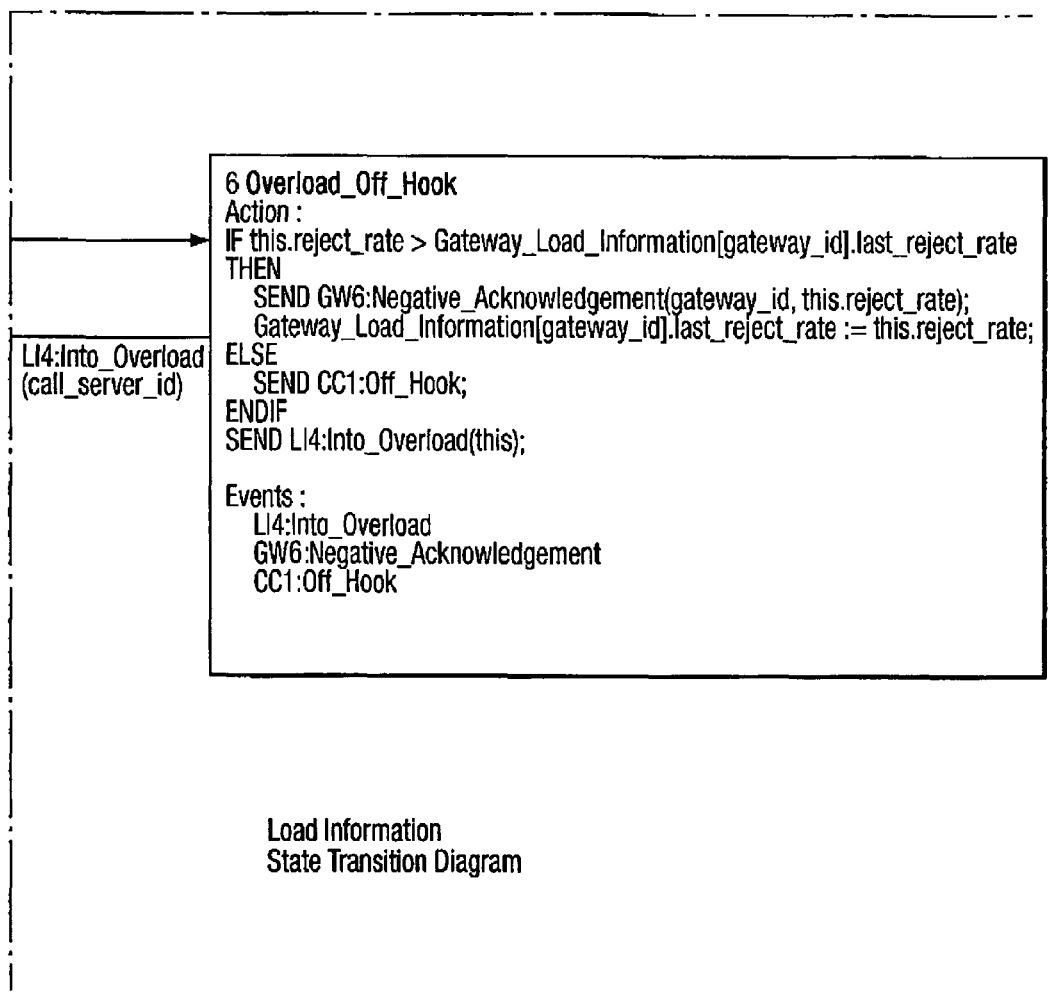
Fig.8 (Cont V).

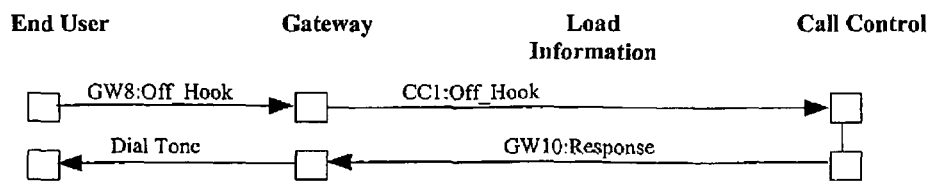
Figure 9: Message Sequence for Successful Call Initiation without Invention
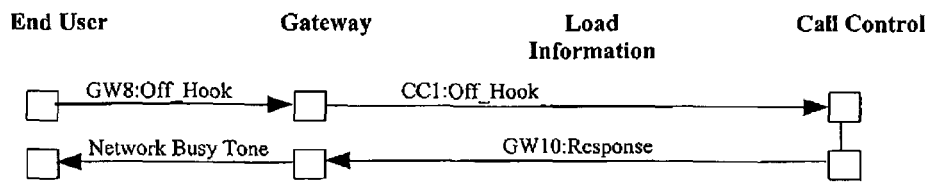
Figure 10: Message Sequence for Unsuccessful Call Initiation without Invention
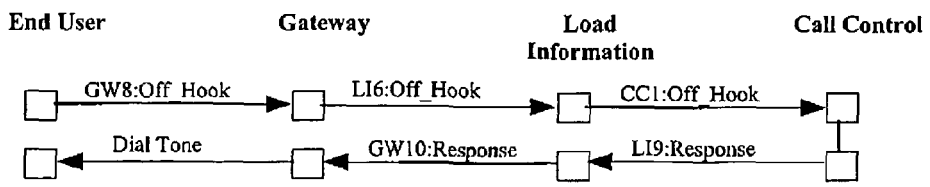
Figure 11: Message Sequence for Successful Call Initiation with Invention at Low Load

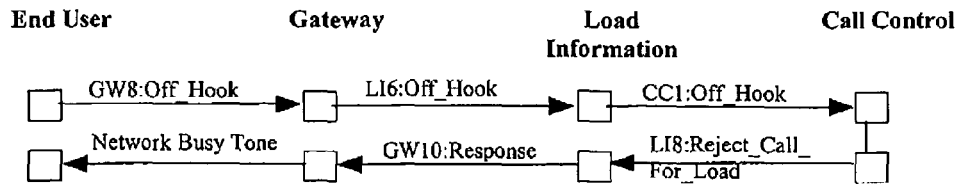
Figure 12: Message Sequence for Unsuccessful Call Initiation with Invention at Low Load
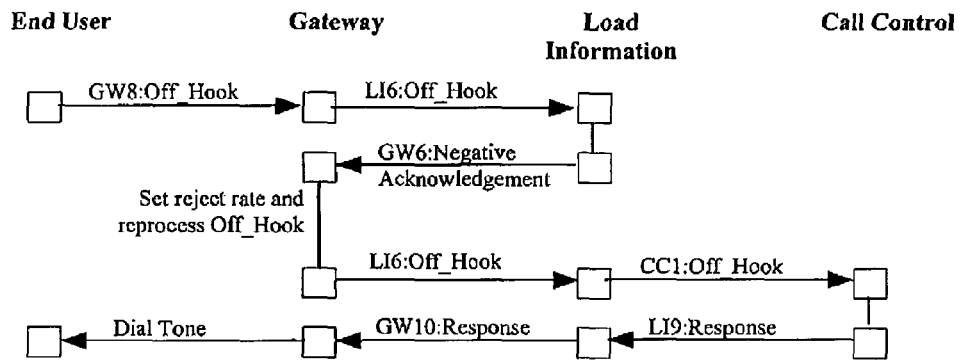
Figure 13: Message Sequence for Successful Call Initiation with Invention at Increasing Load
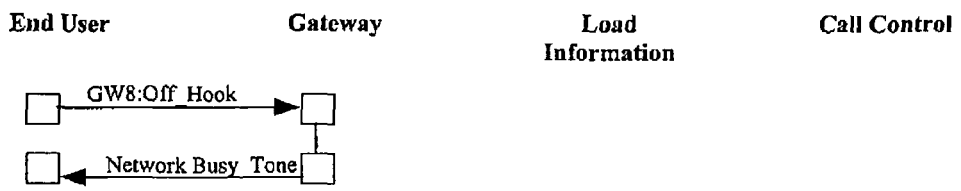
Figure 14: Message Sequence for Unsuccessful Call Initiation with Invention at Increasing Load (Gateway rejects call)

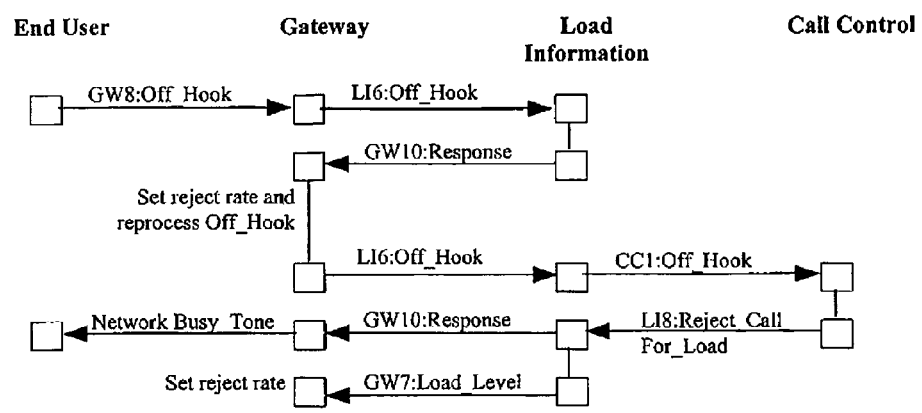
Figure 15: Message Sequence for Unsuccessful Call Initiation with Invention at Increasing Load
(Call Server Rejects Call)
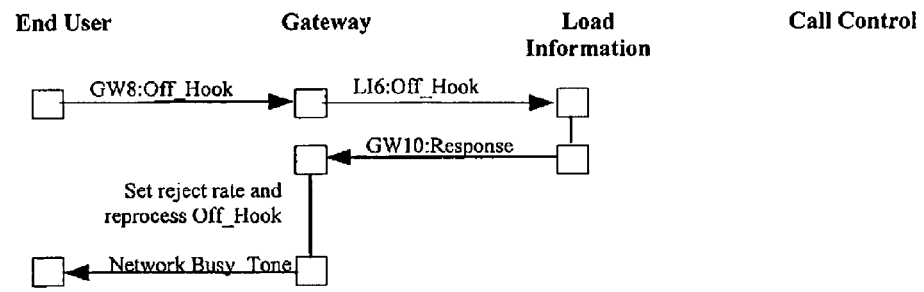
Figure 16: Message Sequence for Unsuccessful Call Initiation with Invention at Increasing Load

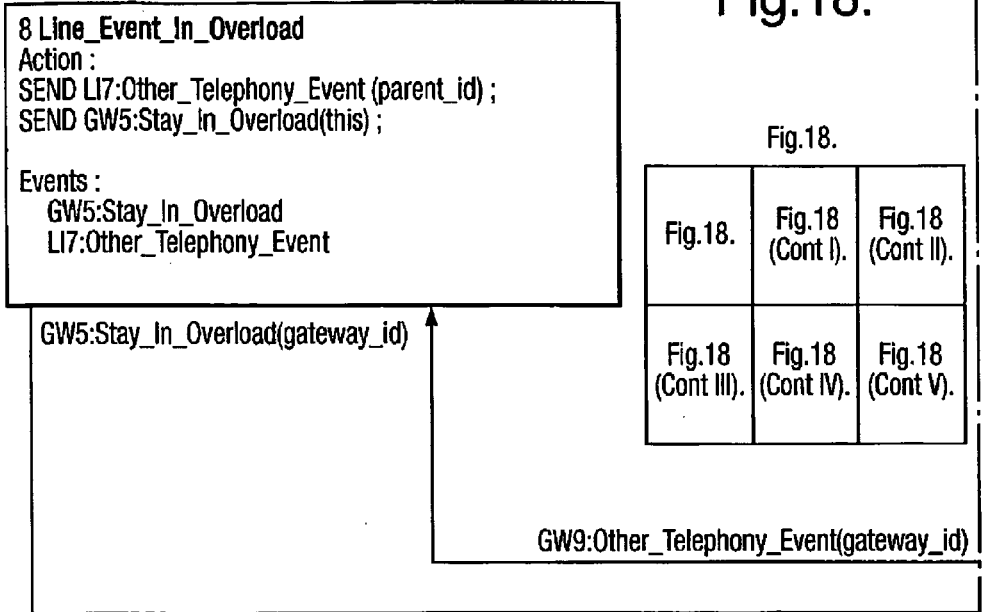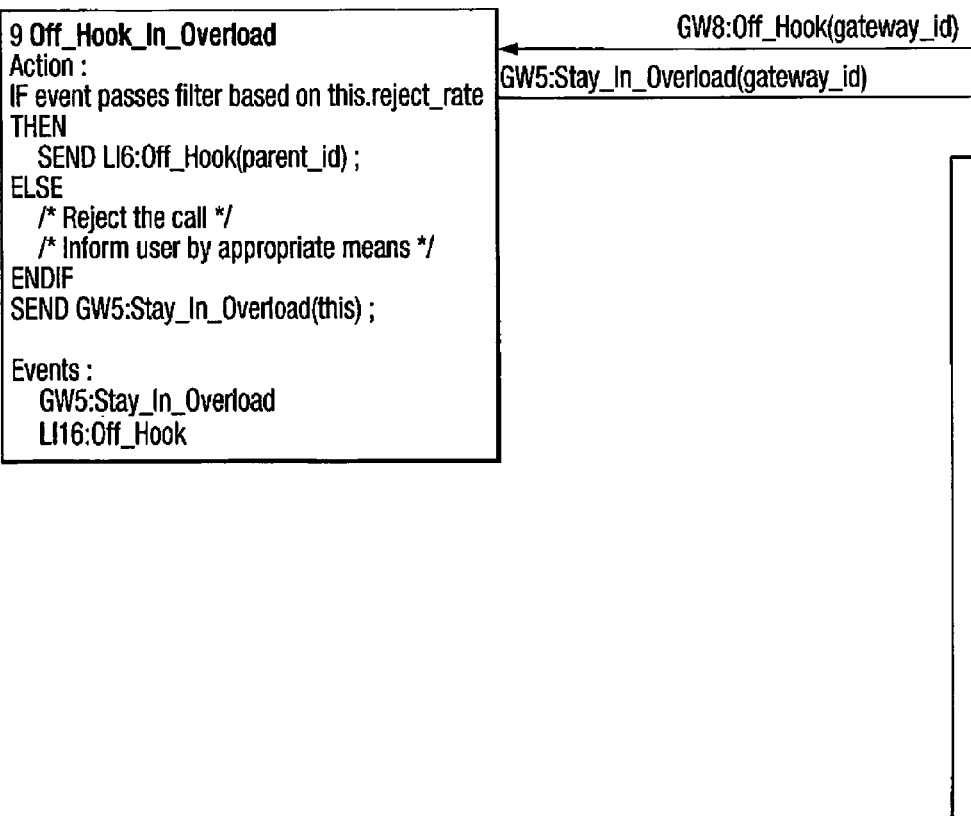
Fig. 18.

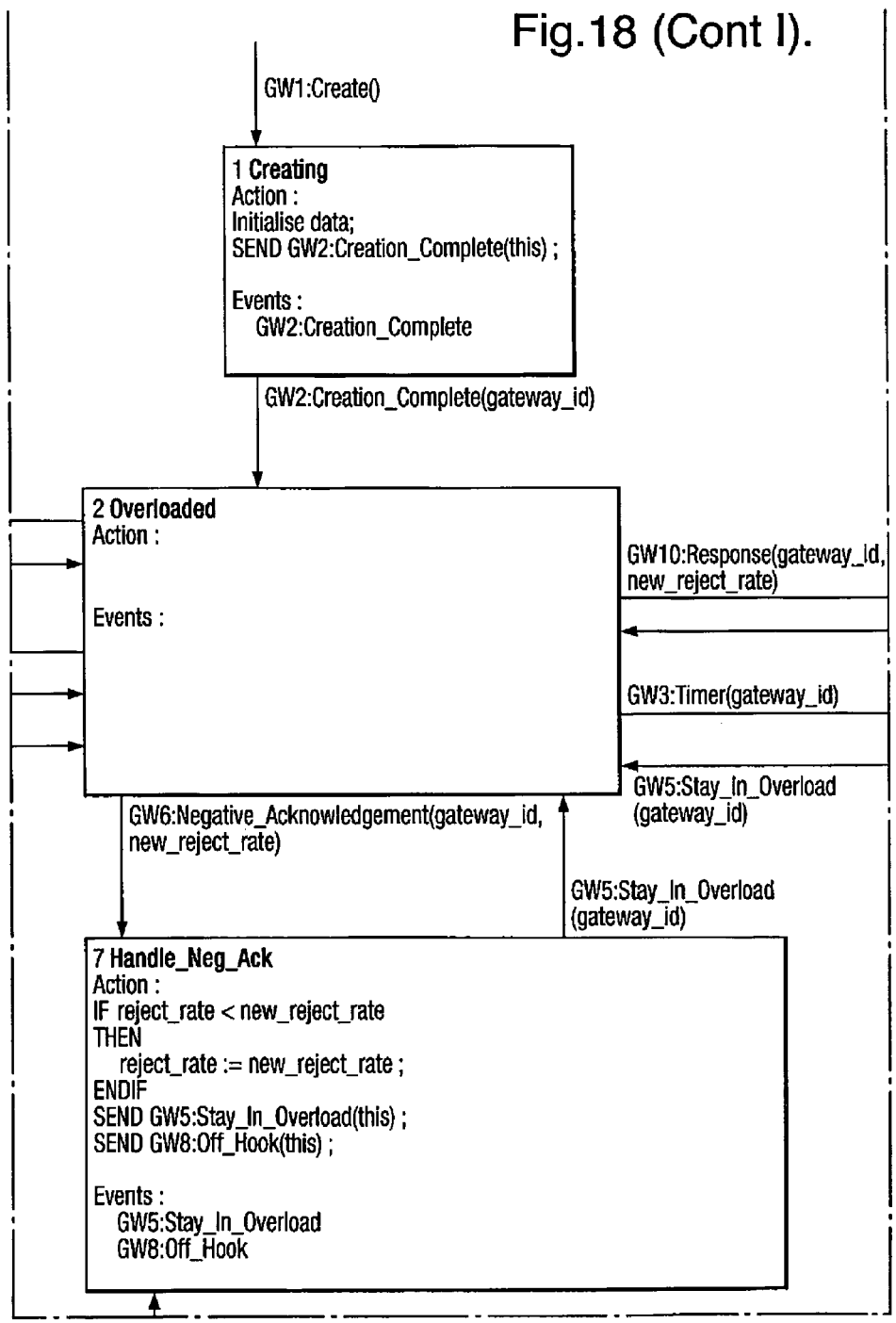
Fig.18 (Cont I).

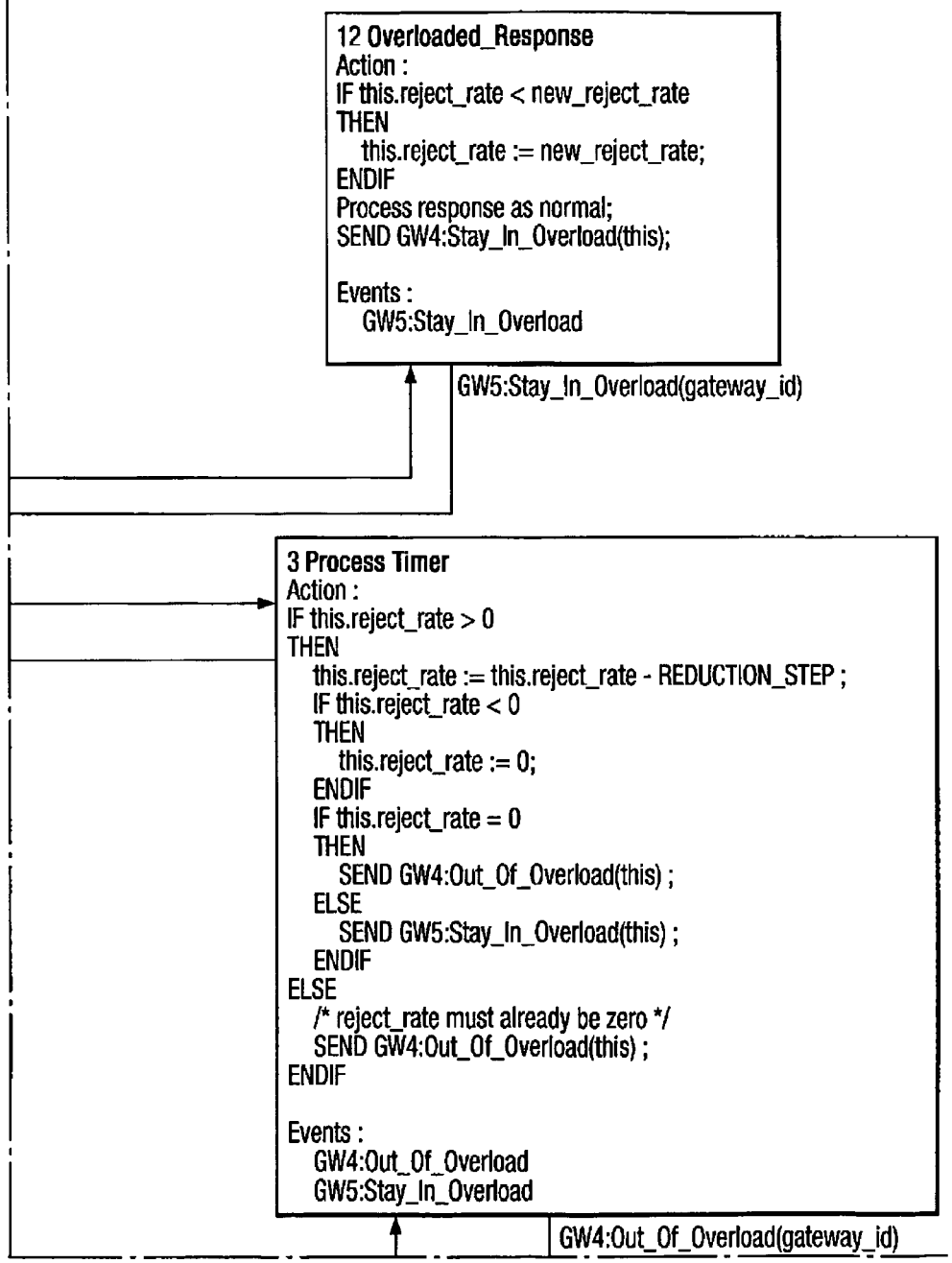
Fig.18 (Cont II).

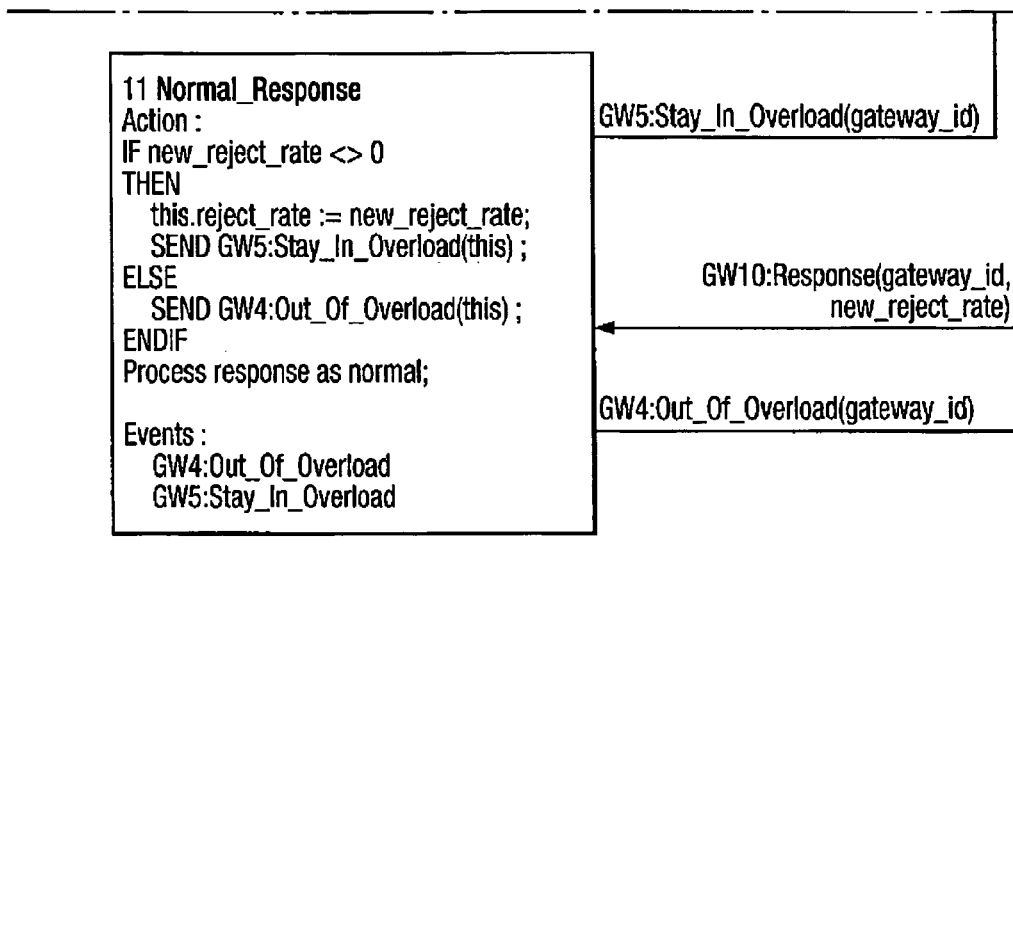
Fig.18 (Cont III).

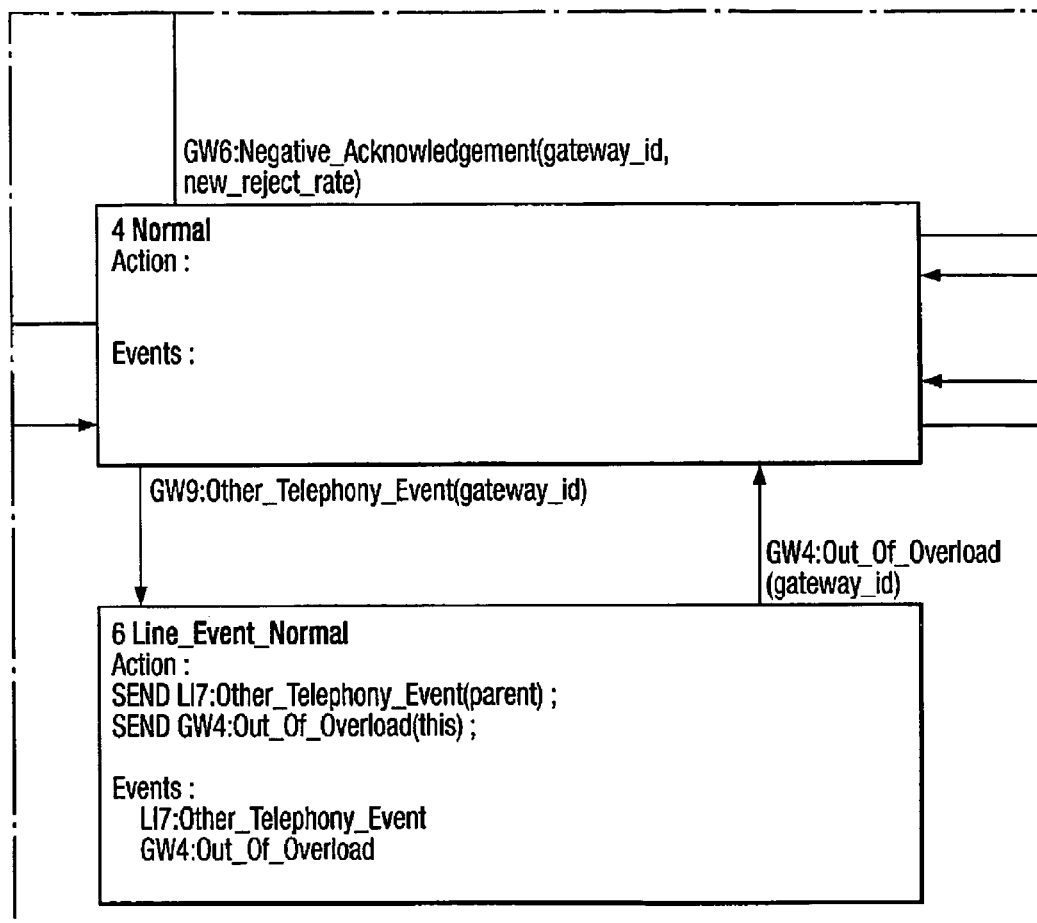
Fig.18 (Cont IV).

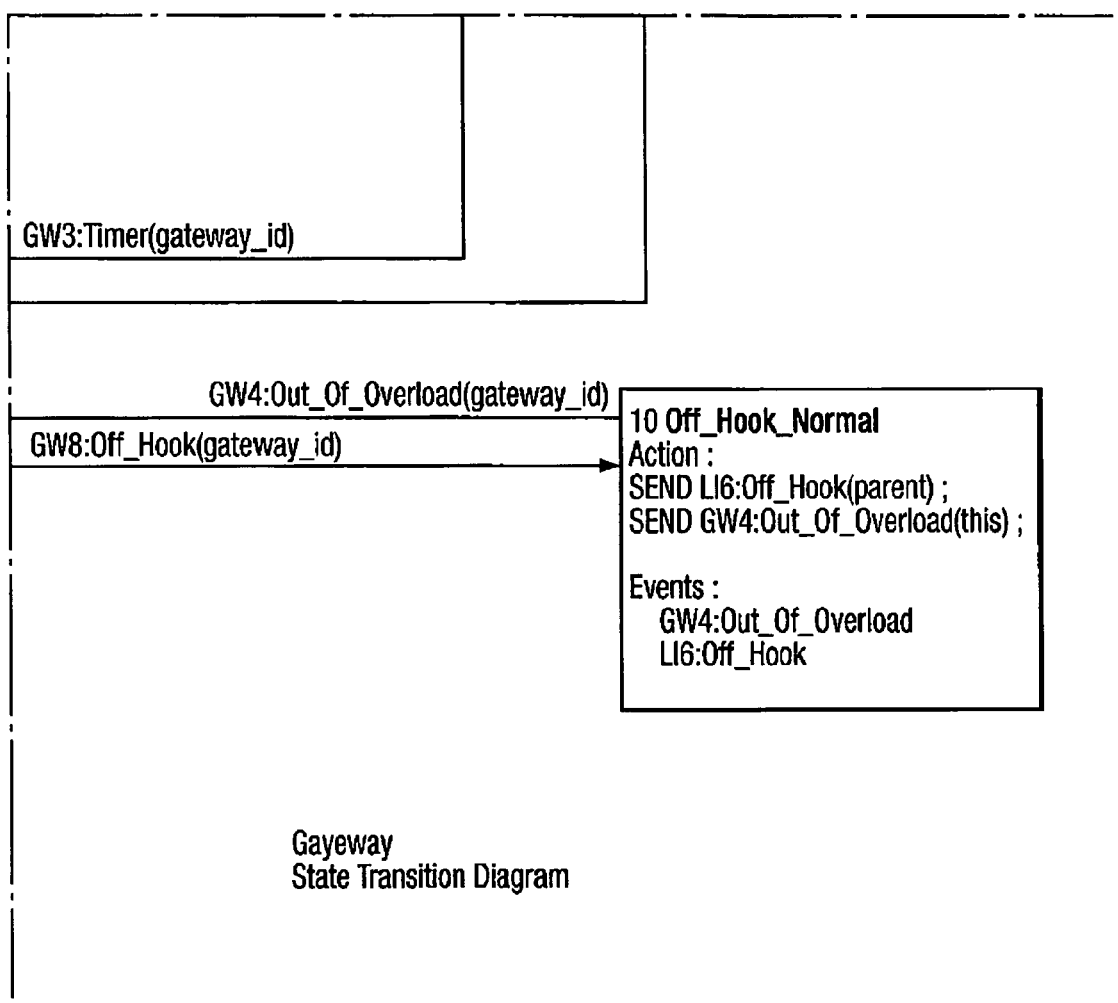
Fig.18 (Cont V).

Fig. 19.

```
11 Normal_Response
Action :
SEND GW10:Response(gateway_id, this.reject_rate);
Gateway_Load_Information[gateway_id].last_reject_rate := this.reject_rate;
SEND LI5:Out_Of_Overload(this);

Events :
   GW10:Response
   LI5:Out_Of_Overload
```

LI5:Out_Of_Overload(call_server_id)

LI9:Response(call_server_id, gateway_id)

Fig. 19.

| Fig.19. | Fig.19 (Cont I). | Fig.19 (Cont II). |
|---|---|---|
| Fig.19 (Cont III). | Fig.19 (Cont IV). | Fig.19 (Cont V). |

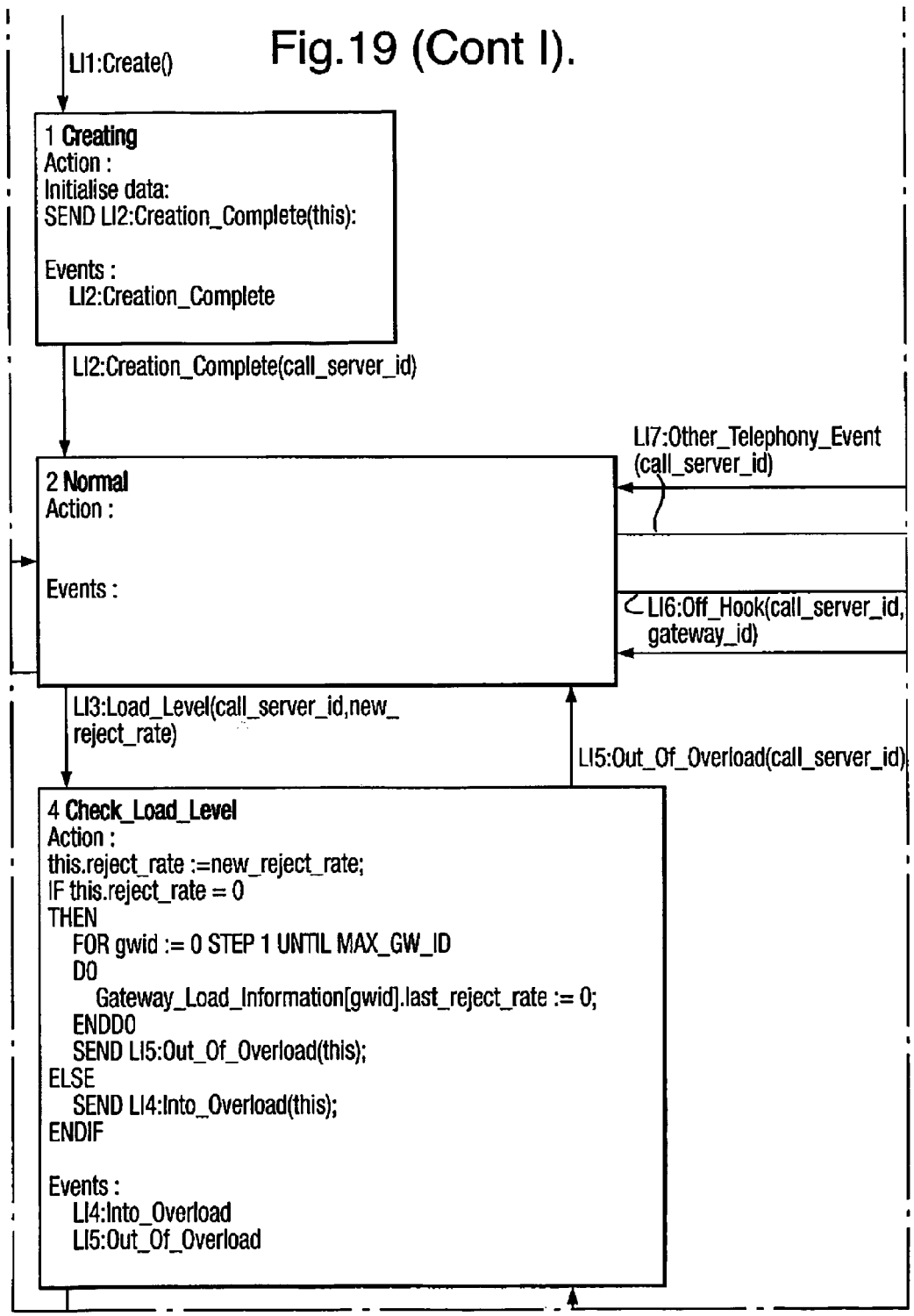
Fig. 19 (Cont I).

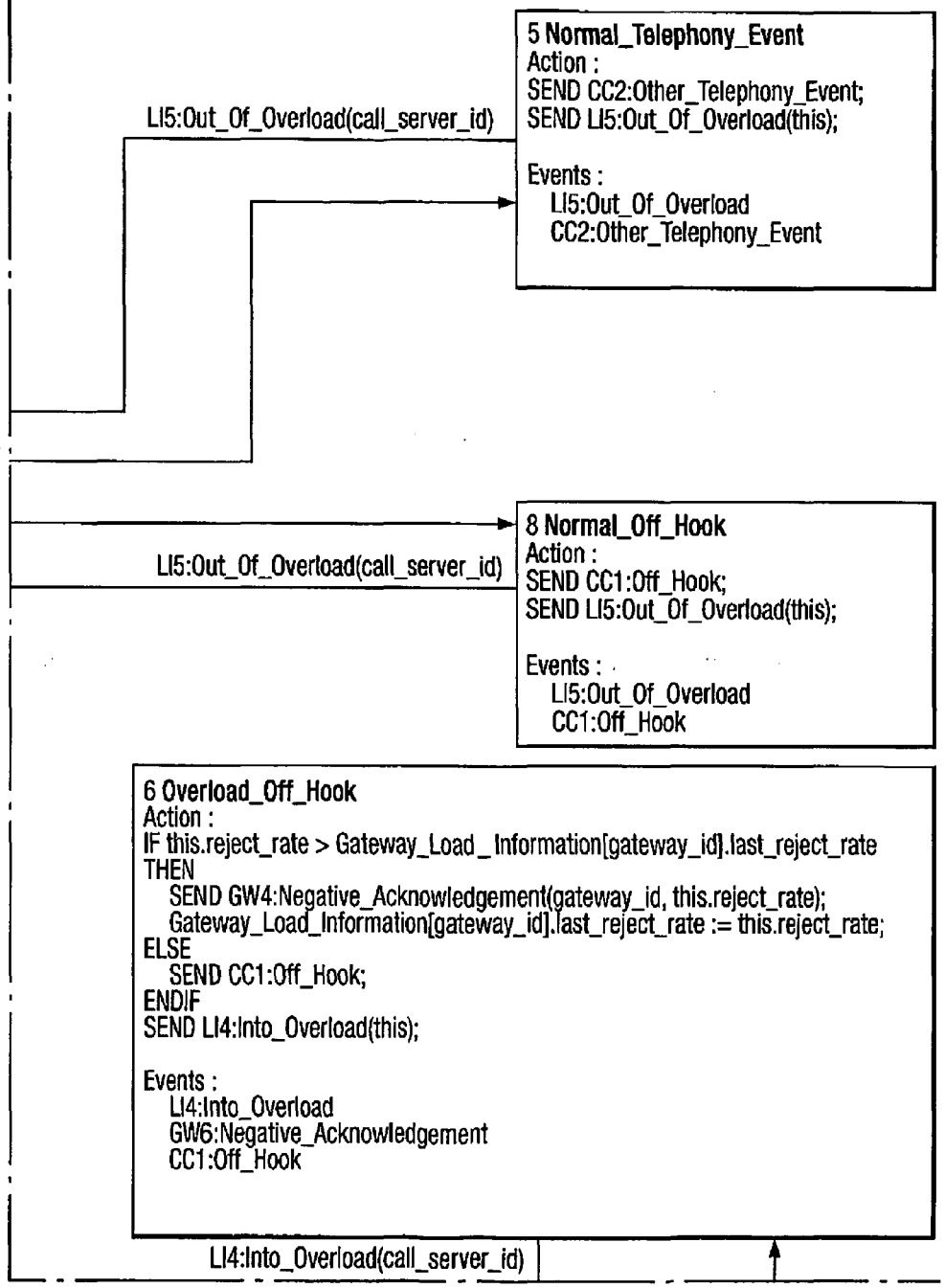
Fig. 19 (Cont II).

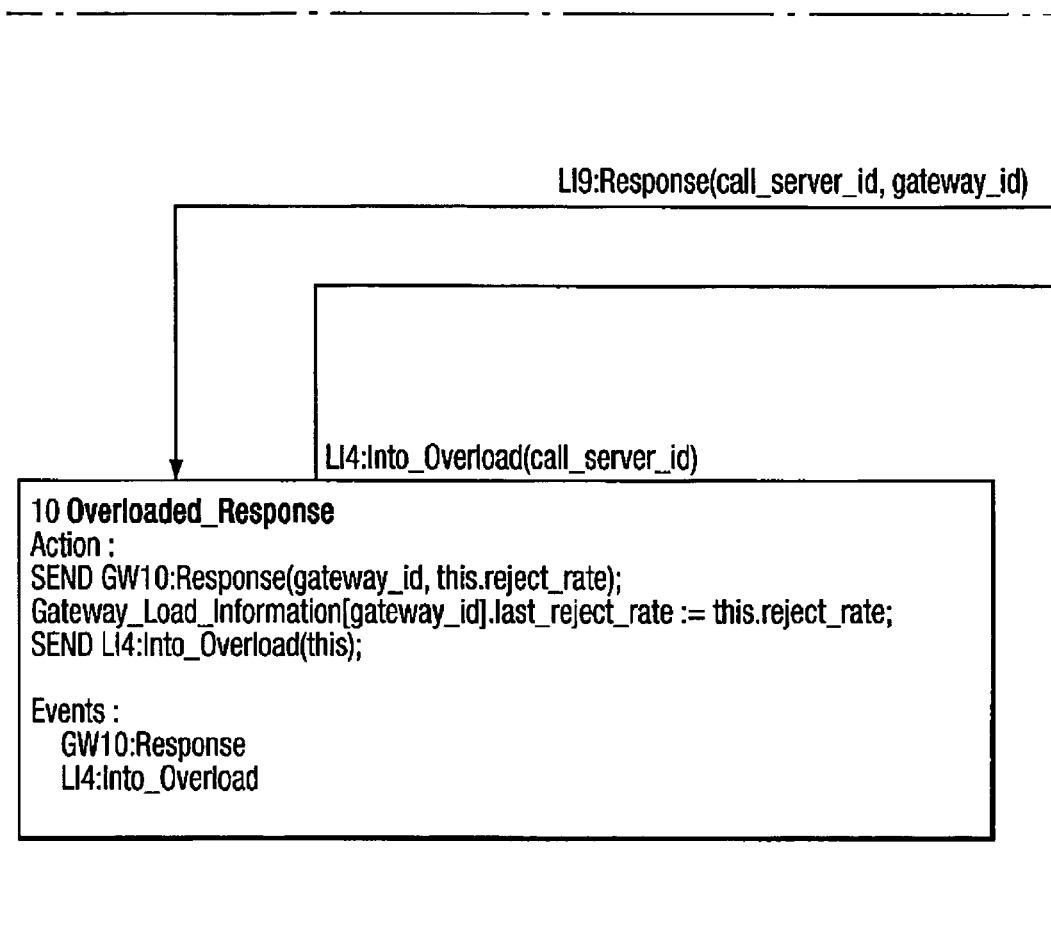
Fig.19 (Cont III).

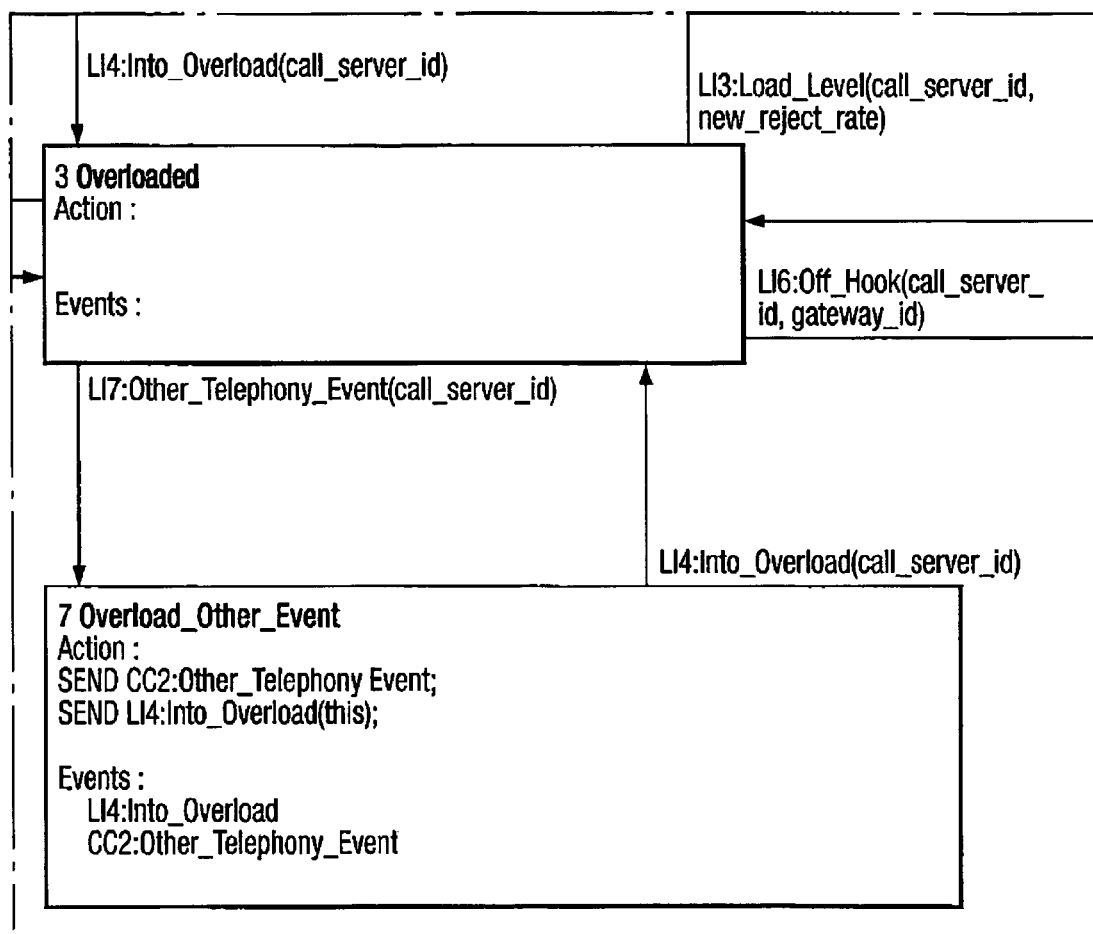
Fig.19 (Cont IV).

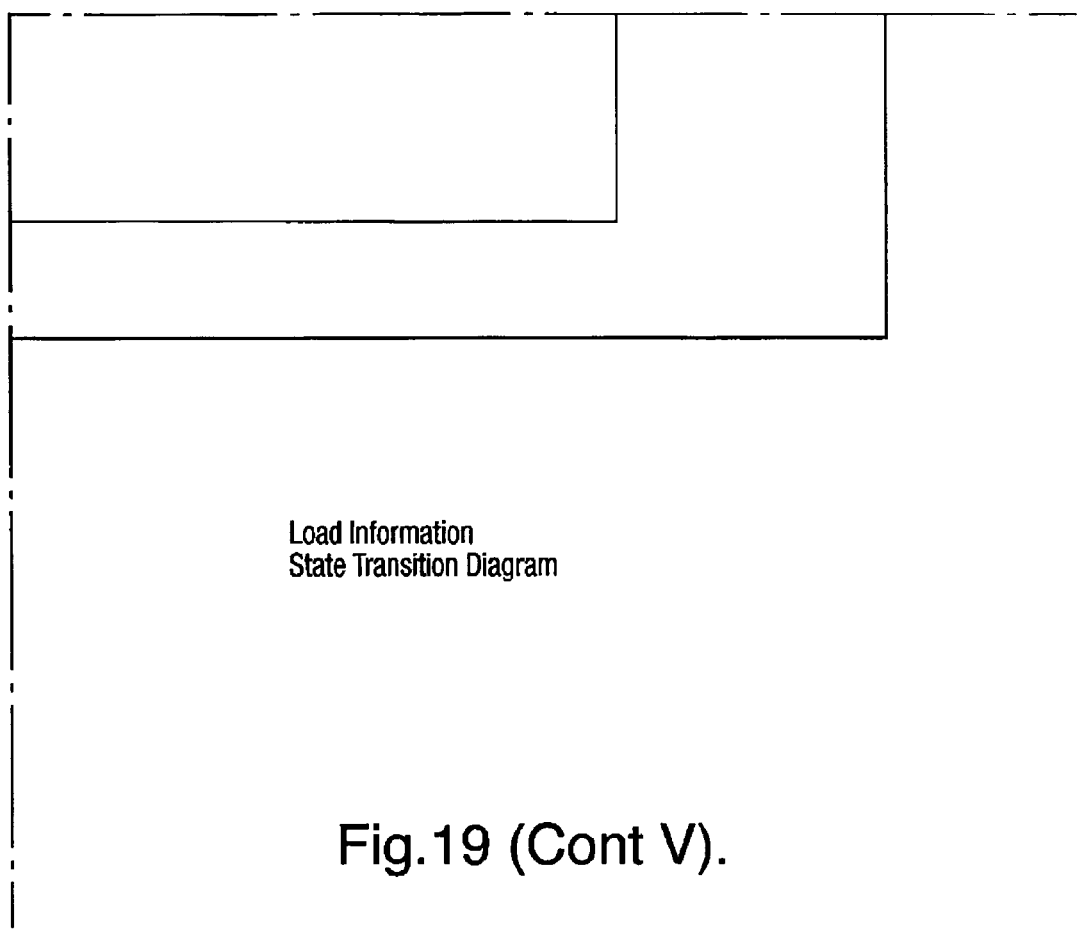
Fig.19 (Cont V).

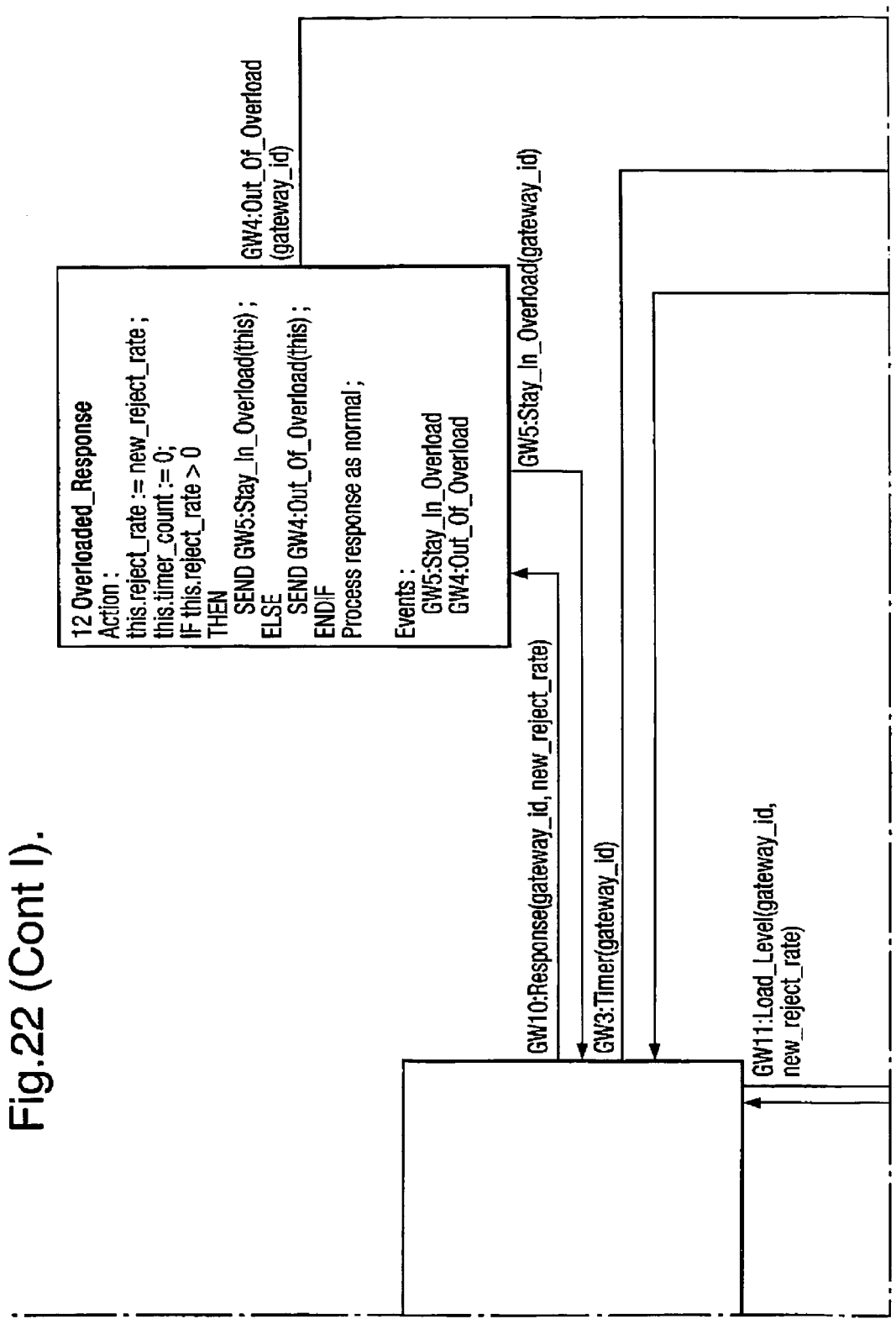
Fig.22 (Cont I).

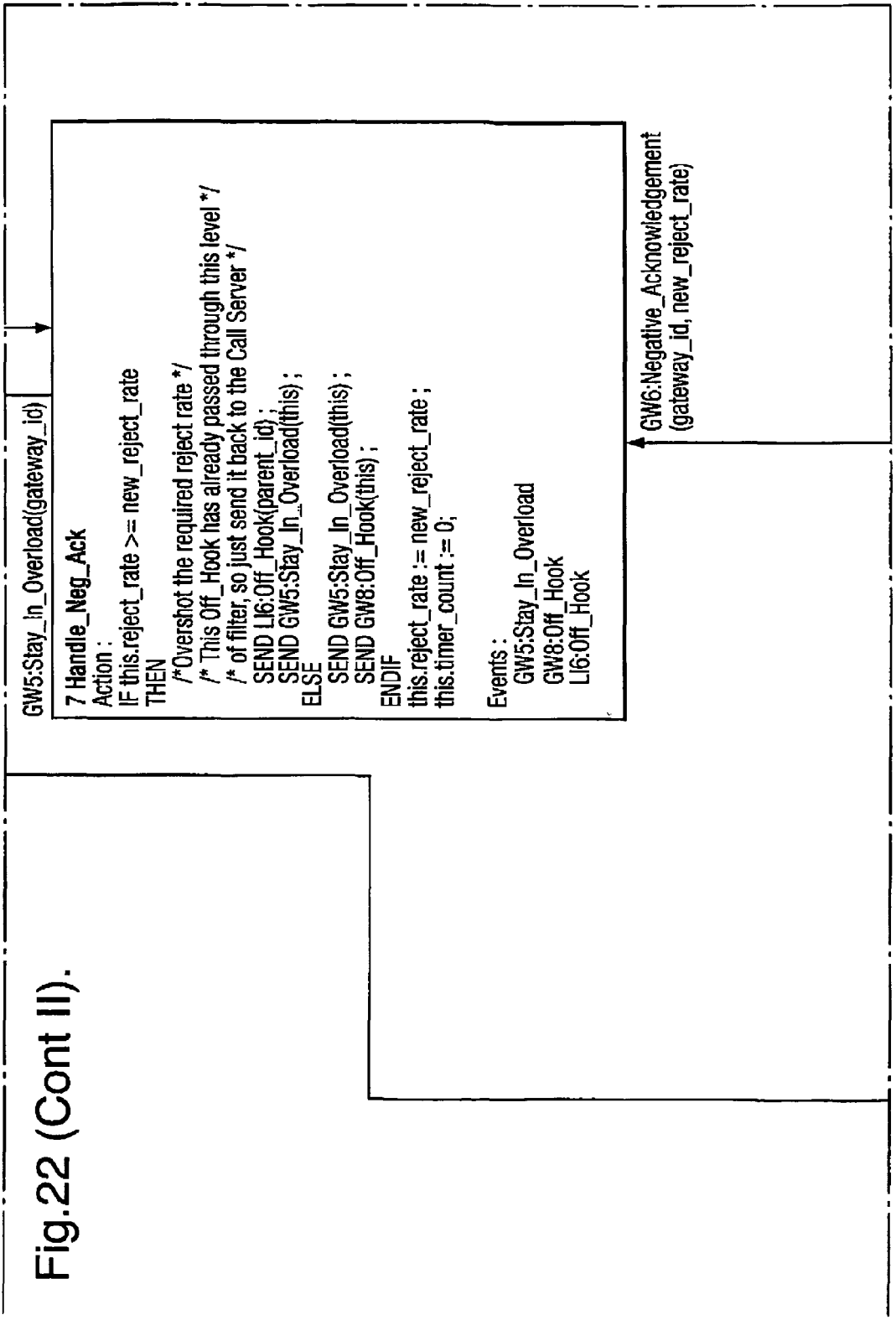
Fig.22 (Cont II).

Fig.22 (Cont III).

13 Process_New_Load_Level
Action :
this.reject_rate = new_reject_rate;
this.timer_count := 0;
IF this.reject_rate = 0
THEN
  /* Out of overload. Stop rejecting calls */
  SEND GW4:Out_Of_Overload(this) ;
ELSE
  SEND GW5:Stay_In_Overload(this) ;
ENDIF
Events :
  GW4:Out_Of_Overload
  GW5:Stay_In_Overload

3 Process Timer
Action :
IF this.timer_count < REFRESH_LIMIT
THEN
  this.timer_count := this.timer_count + 1
ELSE
  /* Lost contact with Call Server */
  /* Increase rate that calls are rejected, but no */
  /* need to change timer_count here */
  IF this.reject_rate < 1
  THEN
    this.reject_rate := this.reject_rate + INCREASE_STEP;
    IF this.reject_rate > 1
    THEN
      this.reject_rate := 1 ;
    ENDIF
  ENDIF
ENDIF
IF this.reject_rate = 0
THEN
  SEND GW4:Out_Of_Overload(this) ;
ELSE
  SEND GW5:Stay_In_Overload(this) ;
ENDIF
Events :
  GW4:Out_Of_Overload
  GW5:Stay_In_Overload Inputs/Outputs:
- GW5:Stay_In_Overload(gateway_id)
- GW11:Load_Level(gateway_id, new_reject_rate)
- GW4:Out_Of_Overload(gateway_id)

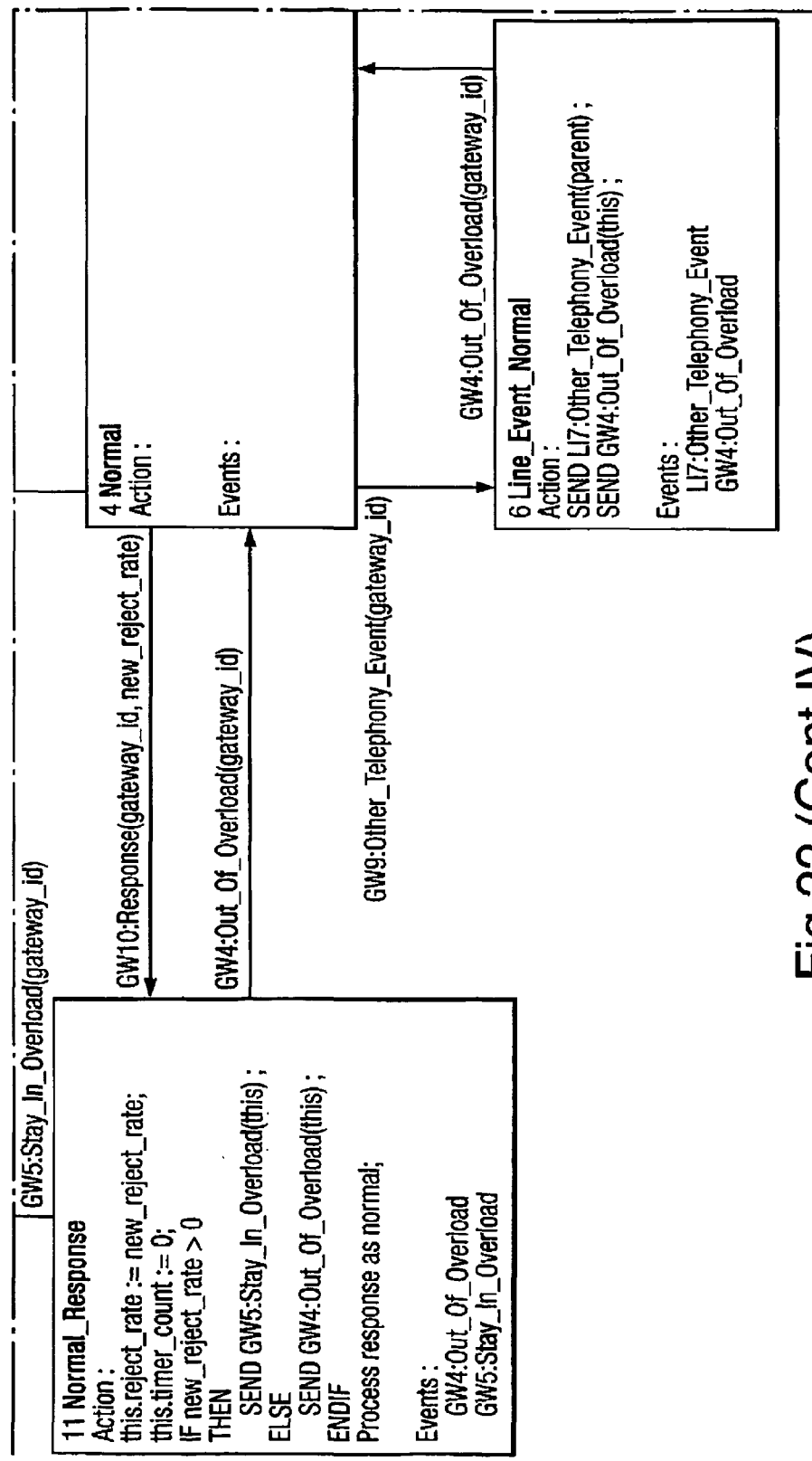
Fig.22 (Cont IV).

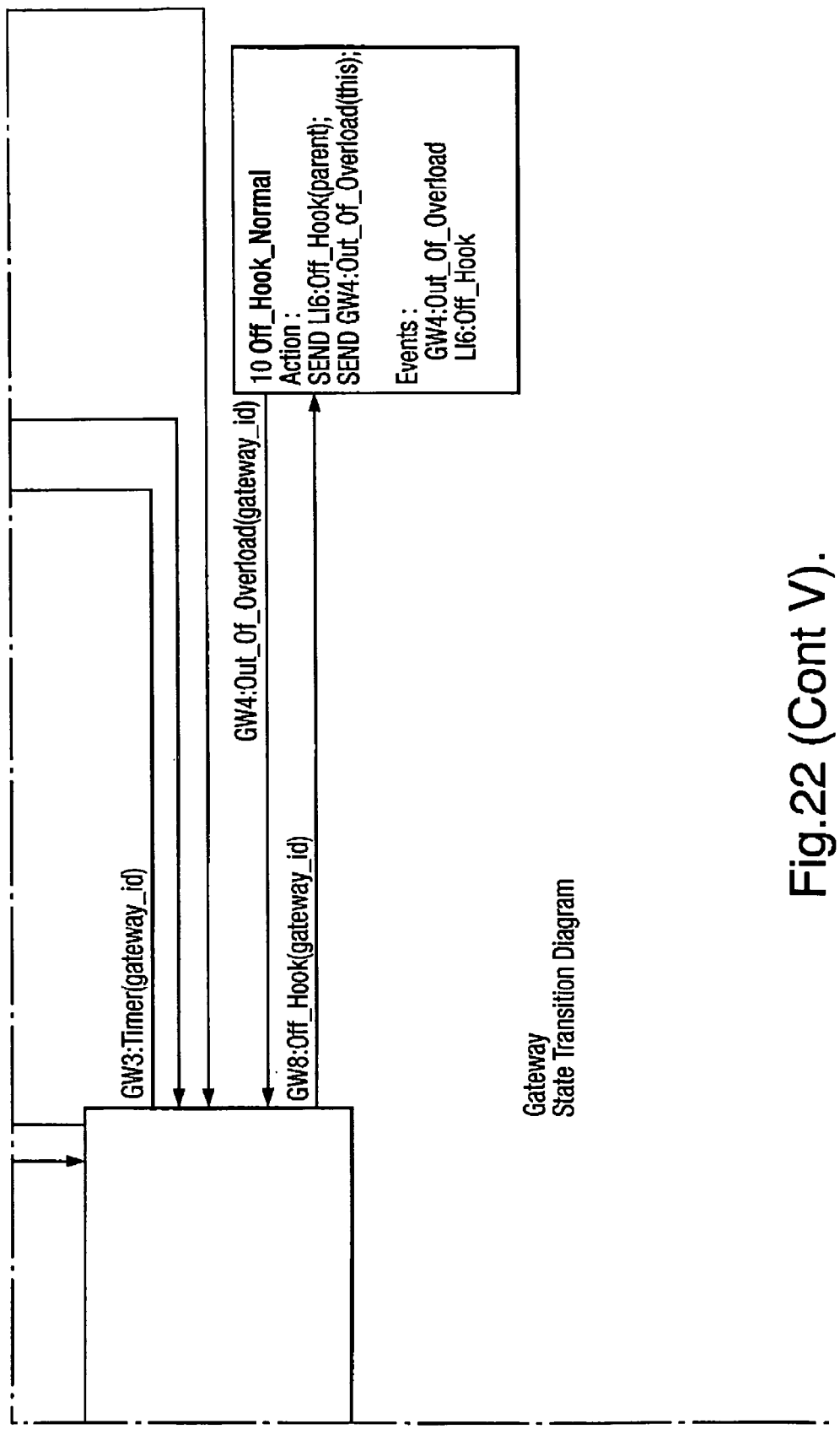
Fig.22 (Cont V).

Fig.23.

```
11 Normal_Response
Action :
SEND GW10:Response(gateway_id, this.reject_rate) ;
Gateway_Load_Information[gateway_id].recent := TRUE ;
Gateway_Load_Information[gateway_id].last_reject_rate := this.reject_rate ;
SEND LI5.Out_Of_Overload(this) ;

Events :
  GW10:Response
  LI5:Out_Of_Overload
```

LI5:Out_Of_Overload(call_server_id)

LI9:Response(call_server_id, gateway_id)

Fig.23.

| Fig.23. | Fig.23 (Cont I). | Fig.23 (Cont II). |
|---|---|---|
| Fig.23 (Cont III). | Fig.23 (Cont IV). | Fig.23 (Cont V). |

LI5:Out_Of_Overload(call_server_id)

```
4 Check_Load_Level
Action :
this.reject_rate :=new_reject_rate;
IF this.reject_rate = 0
THEN
    FOR gwid := 0 STEP 1 UNTIL MAX_GW_ID
    DO
        Gateway_Load_Information[gwid].last_reject_rate := 0;
    ENDDO
    SEND LI5:Out_of_Overload(this);
ELSE
    SEND LI4:Into_Overload(this);
ENDIF Events :
    LI4:Into_Overload
    LI5:Out_Of_Overload
```

LI4:Into_Overload(call_server_id)

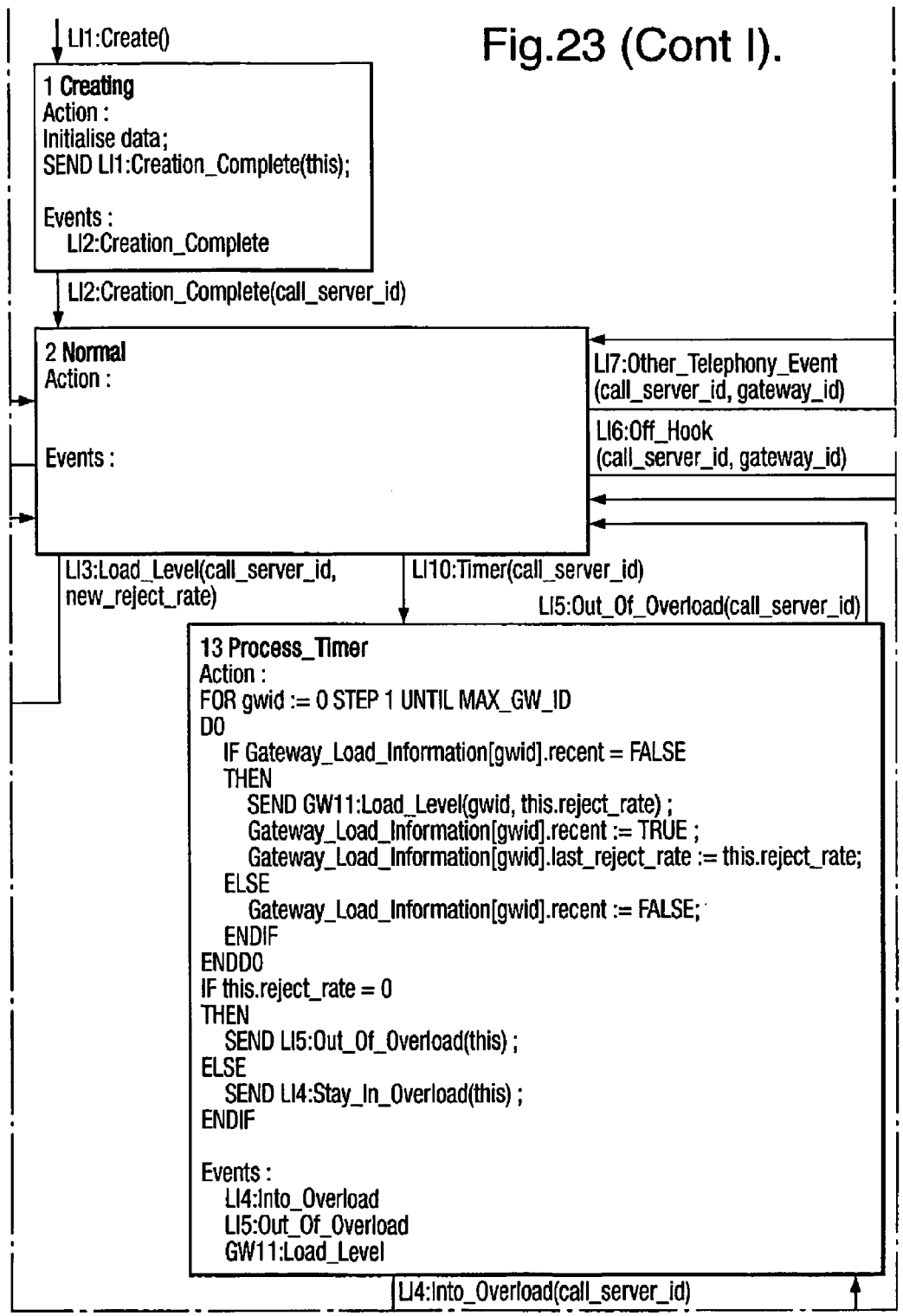
Fig.23 (Cont I).

**Fig.23
(Cont II).**

5 Normal_Telephony_Event
Action :
SEND CC2:Other_Telephony_Event;
SEND LI5:Out_Of_Overload(this);

Events :
　LI5:Out_Of_Overload
　　CC2:Other_Telephony_Event

LI5:Out_Of_Overload(call_server_id)

LI5:Out_Of_Overload(call_server_id)

8 Normal_Off_Hook
Action :
SEND CC1:Off_Hook;
SEND LI5:Out_Of_Overload(this);

Events :
　LI5:Out_Of_Overload
　　CC1:Off_Hook

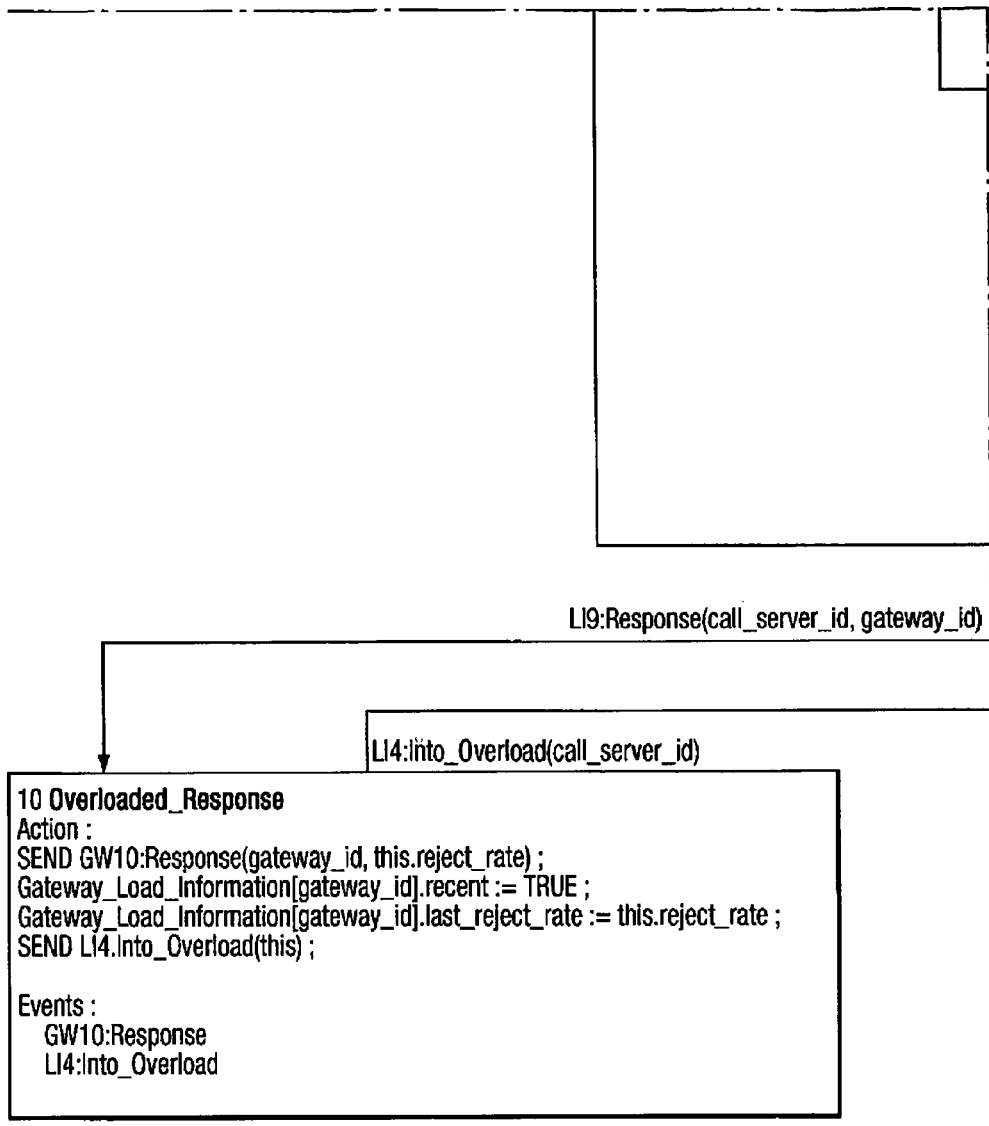
Fig.23 (Cont III).

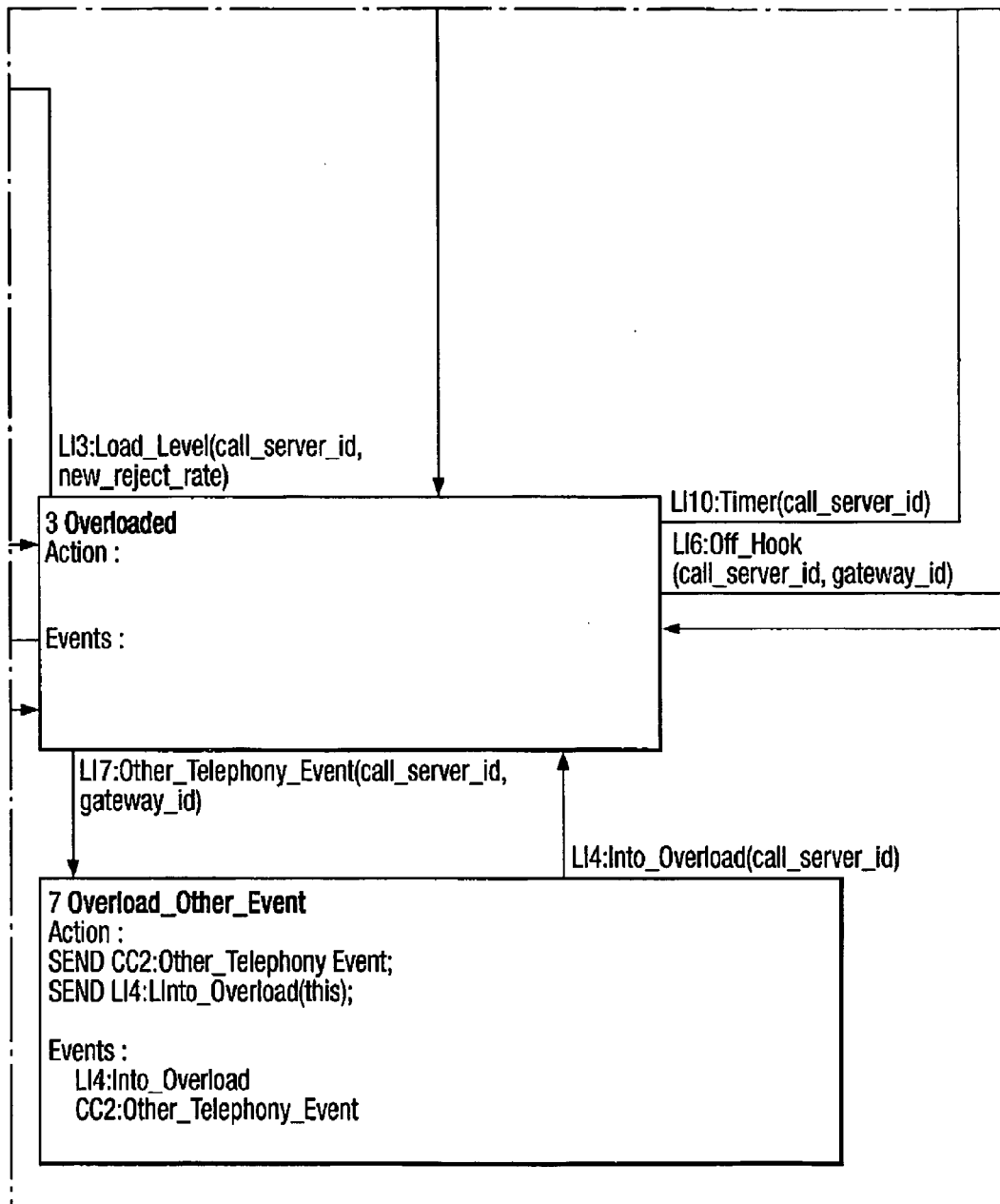
Fig.23 (Cont IV).

```
6 Overload_Off_Hook
Action :
IF this.reject_rate > Gateway_Load_Information[gateway_id].last_reject_rate
THEN
    SEND GW4:Negative_Acknowledgement(gateway_id, this.reject_rate);
    Gateway_Load_Information[gateway_id].last_reject_rate := this.reject_rate;
    Gateway_Load_Information[gateway_id].recent := TRUE ;
ELSE
    SEND CC1:Off_Hook;
ENDIF
SEND LI4:Into_Overload(this);

Events :
    LI4:Into_Overload
    GW6:Negative_Acknowledgement
    CC1:Off_Hook
```

LI4:Into_Overload(call_server_id)

Load Information
State Transition Diagram

Fig.23 (Cont V).

COMMUNICATIONS SYSTEM AND METHOD FOR LOAD MANAGEMENT

The present invention is directed towards the field of communications in general and to communication systems and associated methods for managing load.

In the existing telephony PSTN, much time and effort has been expended ensuring that the network is resilient during times of call attempt overload, i.e. when the number of call attempts presented to the network exceeds its processing capacity. This has been achieved by introducing load control schemes that operate on both the network as a whole, and on the individual switches within the network.

At the network level, the behaviour of such PSTN schemes is outlined by both the international standards bodies and various national standards bodies. These efforts are reflected in International standard ITU-T Recommendation Q.746, Signalling System No. 7 ISDN User Part Procedures and UK standard PNO-ISC/SPEC007, PNO-ISC Specification Number 007, ISDN User Part (ISUP). In general these network level controls are driven by responses from the switches within the PSTN network, and so it is essential that the switches within the network react in a reasonable way when they are in overload. To that effect the ITU-T has issued Recommendation Q.543 Digital Exchange Performance Design Objectives as to how switches should behave when in overload, although the exact mechanism as to how the recommended behaviour is achieved is not specified. The characteristics of an overloaded exchange are shown in the FIG. 1.

In essence, most of the network level schemes utilise 'back-off' mechanisms in response to overloaded switches. Once initiated the network based schemes restrict the amount of traffic offered to the overloaded exchange, so as to maintain a reasonable level of throughput on the exchange as shown in FIG. 2:

The majority of these network level schemes work best in the transit layer, i.e. Class 5 (a node or switch in the network to which subscribers are connected) to Class 4 (network nodes that are used to connect Class 5 switches); Class 4 to Class 4; or Class 4 to Class 5, where the level of concentration of calls and routes is very high. In the cases where the level of concentration is much less, or non-existent, then these mechanisms are not as effective. In some cases, manual operator-based schemes can be used (i.e. call gapping) but one area in the telephony PSTN that is particularly vulnerable is the Access Concentrator—Class 5 interface.

The dimensioning of links from the Access Concentrator to the Class 5 switch offers some level of protection when traffic levels are sufficiently high to introduce blocking on the circuits that have been provisioned.

In a Next Generation Network (NGN) architecture a very large number of subscriber lines (e.g. in excess of 30000) each characterised by low calling rates may first be concentrated in a single stage, such as a Call Server. In such a situation, only a small percentage increase in calling rates over such a large number of lines could cause a large increase in the processing load at the point of concentration. There exist issues with getting any mechanism to respond quickly enough so as to prevent the Call Servers becoming grossly overloaded due to such small increases in the overall calling rate.

The Access Concentrators, which provide a natural throttle in the conventional public switched telephone network or PSTN and go someway towards preventing this type of overload, may not exist in the NGN.

In the NGN network architecture it is expected that this vulnerability may worsen considerably. With this new architecture it is envisaged that subscriber lines will be connected to entities known as Media Gateways (MGWs). The MGWs will in turn be connected to Class 5 replacement switches known as Call Servers. Under this architecture MGWs can vary in size from those handling single lines to those handling groups of up to 2000 lines all of which are connected directly to the Call Servers via Internet Protcol (IP), i.e. the Concentrator functionality is removed from the network.

Thus it can be seen that under this architecture there can be many thousands of lines, and potentially thousands or even millions of MGWs connected, to a single Call Server, and as such it only requires a moderate increase in call attempt levels across all of the lines/MGWs to cause a Call Server to overload. In the case of media-stimulated events (e.g. tele-voting) or in the event of a disaster, there is often a large step change in the level of call attempts. In the NGN architecture, such an event is likely to overload the Call Servers to a level where service may cease completely. Clearly this is an undesirable position to be in, as when this occurs the ability to handle emergency, or priority, calls also ceases. There therefore exists the need for an efficient form of load control between the MGWs and the Call Servers to prevent this from happening.

In the conventional PSTN, the Access Concentrator only sends an off-hook notification (i.e. a request that new call be set up) to the Class 5 switch if it can allocate one of its circuits to the call. This means that calls are rejected at the Access Concentrator whenever all its circuits to the Class 5 switch are busy.

Some of the signalling standards proposed for use in the NGN (e.g. Media Gateway Control Protocol MGCP, H.248 and Session Initiation Protocol SIP) do not address these issues.

The dimensioning of the links from the Access Concentrator to the Class 5 switch offers some level of protection when traffic levels are sufficiently high to introduce blocking on the circuits that have been provisioned. In the conventional PSTN, the Access Concentrator only sends an off-hook notification to the Class 5 switch if the Access Concentrator can allocate one of its circuits to the call. This means that calls are rejected at the Access Concentrator whenever all of its circuits to the Class 5 switch are busy.

One potential solution is to provide a broadcast mechanism to more than 30000 lines. However, no suitable broadcast mechanism has yet been adopted by the industry and such a solution is rejected by the present inventors as potentially inefficient.

The present invention provides a communications system comprising a target node and at least one source node arranged for communication of messages there between; in which the target node comprises means for processing at least some of the messages received from the at least one source node and means for detecting the processing load of the target node; in which the target node comprises means for notifying the at least one source node when a specific processing load level has been reached or exceeded; and in which each source node comprises means for reducing, responsive to the notification, the rate at which messages are sent to the target node The present invention provides a method for the control of load at a target node receiving messages from at least one source node in which the target node processes at least some of the messages received from the at least one source node including the steps of detecting the processing load of the target node; notifying the at least one source node when a specific processing load level has been reached or exceeded;

and in which each source node reduces, responsive to the notification, the rate at which messages are sent to the target node.

Embodiments of the present invention will now be described, by way of example, with reference to the drawings in which:

FIGS. 1 and 2 show response characteristics of conventional Call servers;

FIG. 3 shows a schematic of a conventional PSTN;

FIG. 4 shows a schematic of a suggested NGN;

FIGS. 5 and 6, 17, 20 and 21 show schematics for information flow according to the present invention;

Figure 6:
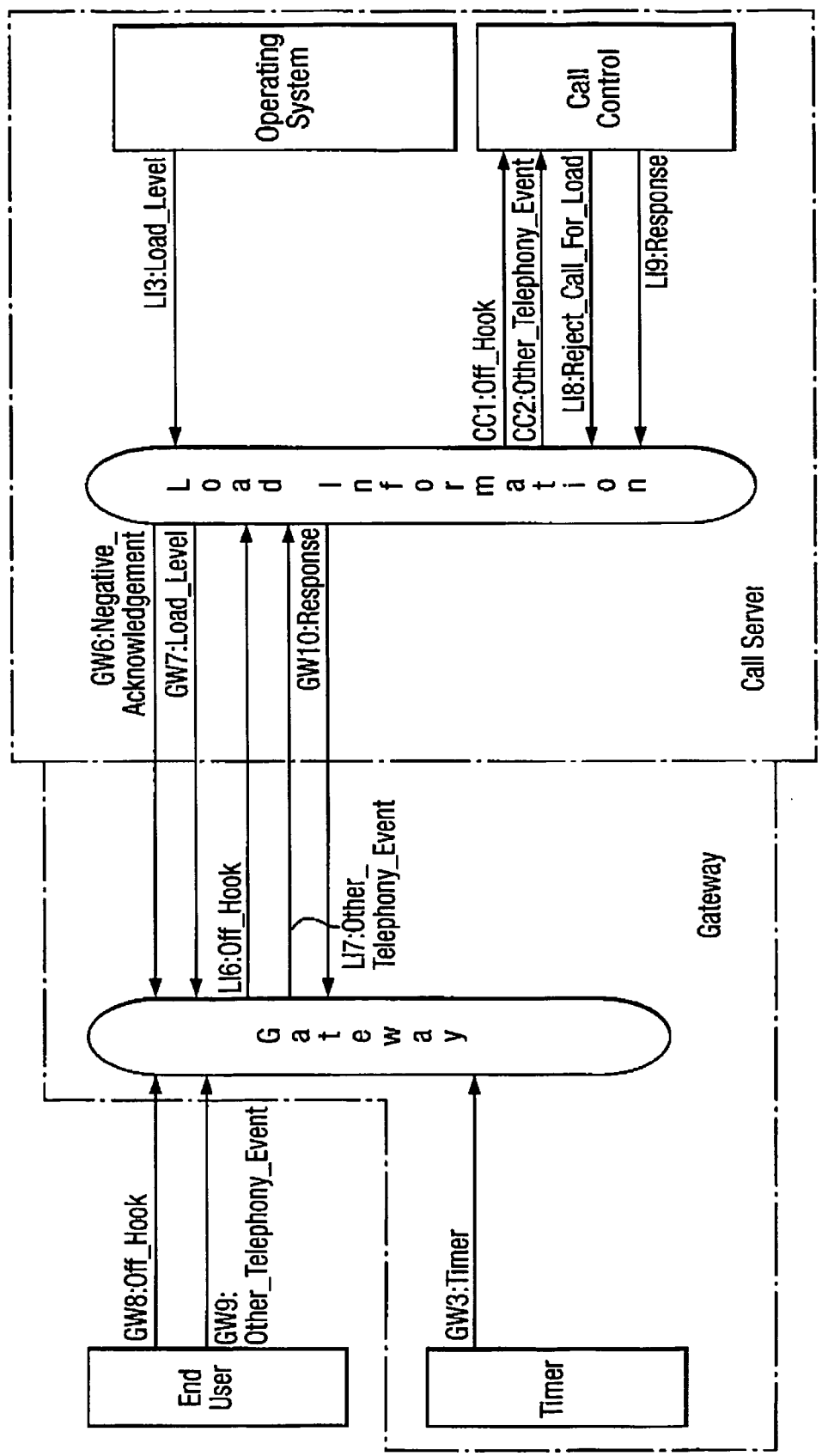

FIGS. 7 and 8, 18 and 19, 22 and 23 show schematics for state transitions according to the present invention;

FIGS. 9 and 10 show schematic message flow according to the prior art;

FIGS. 11 to 16 shows schematic message flow according to the present invention.

The basic premise of the load control scheme that will be outlined here is that the Call Server is able to reject calls when in overload (i.e. a period of time when the number of call attempts presented to the node exceeds its processing capacity, excluding momentary peaks) with a message that is recognised by the MGW as being an overload message, and that the overload level of the Call Server can be communicated back to the MGW (either independently or as part of the overload message) so that the MGW can act upon it accordingly, and start restricting the number of new calls that the MGW offers to the Call Server.

As the level of call attempts offered to the Call Server increases, the processing load of the Call Server also steadily increases in response to this increase in the level of call attempts. Eventually the maximum processing capacity of the Call Server is reached (i.e. all of its resources are in use). Receipt on any further new call attempts will cause the Call Server to go into overload and start rejecting calls (FIG. 1).

The signalling message that the Call Server receives in association with new call attempts is known as an 'off-hook' notification. The overloaded Call Server will start to reject 'off-hook' notifications as follows. Instead of processing the off hook message and accepting or rejecting the call in the usual manner, and subsequently responding to the MGW with the usual response/acknowledgement message, the Call Server will start responding to each off hook message from a MGW with an automatic NAK, which contains the overload level of the Call Server. The production of the NAK message should be very efficient, in processing terms, when compared to the normal processing of the message, as all that is required is to check the identity of the incoming messages and identify new call requests. This can be simply achieved with little processing overhead giving rise to immediate processing relief on the Call Server whilst quickly propagating the overload level of the Call Sever back the MGW so that it can also take preventative action.

Upon receipt of the NAK message from Call Server, the MGW will respond as follows. If the rejection mechanism on the MGW is currently inactive, it will be activated and it will start rejecting calls at the level that was indicated by the Call Server. If the mechanism is already active, the MGW will modify the rejection level (i.e. the proportion of calls offered to the MGW that are rejected by the MGW's filter mechanism) appropriately. The MGW's filter mechanism may now decide to accept or reject this message. If the message is accepted by the MGW's filter mechanism then it is transmitted back to the Call Server, where it is now processed normally by the Call Server's load control mechanism that may, itself, decide to accept or reject it.

Any subsequent increase in the overload level of the Call Server may be communicated to the MGWs in a similar way leading the MGW to modify its call filtering mechanism appropriately. The receipt of an overload message at a MGW whose filter mechanism is inactive will cause the filter mechanism to be invoked. In this case the message is not re-offered to the Call Server as it already been rejected by the Call Server due to there being insufficient resources available to process it.

FIG. 4 shows an example of how a typical NGN might appear. As shown in FIG. 4, with this new architecture it is envisaged that subscriber lines will be connected to entities known as Media Gateways (MGWs). The MGWs will in turn be connected to Class 5 replacement switches known as Call Servers. With the NGN architecture, MGWs can vary in size from those handling single lines to groups of up to 2000 lines or more, all of which lines connect directly to the Call Servers via Internet Protocol (IP), i.e. the Concentrator functionality is removed from the network.

Thus it can be seen that, with this new architecture, there can be many thousands of lines, and potentially many thousands of MGWs connected to a single Call Server and, as such, it only requires a moderate increase in call attempt levels across all of the lines/MGWs to overload a Call Server. In the case of media-stimulated events (e.g. tele-voting) or disasters, there is often a large step change in the level of call attempts. In the NGN architecture, such an event is likely to overload the Call Servers handling telephony traffic to a level where service may cease completely. Clearly this is an undesirable outcome as, when this occurs, the ability to handle emergency, or priority, calls also ceases. There is therefore a need for some form of load control between the MGWs and the Call Servers to prevent this loss of service.

Signalling standards that may be used in the NGN (e.g. MGCP, H.248, SIP) are not fully developed and have no provision to address this area.

Overload of a node occurs when the number of call attempts presented to the node exceeds its processing capacity for a significant period of time, i.e. excluding momentary peaks. The basic premise of the load control scheme that will be outlined here is that the Call Server is able to reject calls when in overload with a special message that is recognised by the MGW as being an overload message, and that the overload level of the Call Server can be communicated back to the MGW (either independently or as part of the overload message). Advantageously, the MGW can act upon the information provided by the Call Server accordingly and start restricting the number of new calls that the MGW offers to the Call Server. The overload level of the Call Server may be defined as the proportion of calls that it has rejected in a set period of time.

As the level of call attempts offered to the Call Server increases, the processing load of the Call Server also steadily increases in response to this increase in the level of call attempts. Eventually the maximum processing capacity of the Call Server is reached (i.e. all of its resources are in use). Receipt of any further new call attempts will cause the Call Server to go into overload and start rejecting calls (as illustrated in FIG. 1).

The signalling message that the Call Server receives in association with new call attempts is known as an 'off-hook' notification as they are conventionally initiated by a telephone subscriber picking up their handset. An overloaded Call Server according to a first preferred embodiment will start to reject 'off-hook' notifications associated with new calls as follows. Instead of accepting or rejecting the call in the usual manner, and subsequently responding to the MGW with the usual response/acknowledgement message, the Call Server will start responding with NAKs, which contain the reject level (as determined by the Call Server), back to the MGW. The reject level will comprise an instruction to the MGW to reject a certain proportion of new call requests without passing them onto the Call Server. The production of the NAK message should be very efficient, in processing terms, when compared to the processing that messages normally undergo in the Call Server, giving rise to immediate processing relief on the Call Server whilst quickly propagating the reject level of the Call Sever back the MGW so that it can also take preventative action as well.

Upon receipt of the NAK message from Call Server, the MGW will respond as follows. If the rejection mechanism on the MGW is currently inactive, it will be activated and it will start rejecting calls at the level that was indicated by the Call Server. If the mechanism is already active, the MGW will modify the reject level appropriately. The MGWs rejection mechanism may now choose to accept or reject this message. If the message is accepted by the MGWs overload control mechanism then it is transmitted back to the Call Server, where it is now processed normally by the Call Server's load control mechanism. A second NAK is not generated by the Call Server for this retransmitted message as the Call Server remembers that is has already sent a NAK in relation to the same message.

There are two ways of notifying the reject level. The first is a NAK, which is sent as an immediate response to an Off Hook message; the second is an "overload message", which is sent much later in the sequence. Any subsequent messages offered to the Call Server from the MGW that are rejected by the Call Server due to overload will cause the reject level of the MGW's call rejection mechanism to be modified appropriately. The receipt of an overload message at a MGW whose load control mechanism is inactive will cause the load control mechanism to be invoked. In this case the message is not re-offered to the Call Server as it already been rejected by the Call Server due to there being insufficient resources available to process it.

When the overload has abated on the Call Server, that is, the proportion of new call requests received and then rejected by a Call Server has reached zero, the communication of overload messages (e.g. NAKs) from the Call Server to the MGWs will cease. The cessation of these messages will result in the MGWs gradually decreasing the proportion of new calls that are rejected over time.

Advantageously, the Call Server keeps a record of the MGWs to which it has sent NAKs so as to avoid sending unnecessary messages. This record is preferably updated (i.e. cleared) every time the overload level of the Call Server increases, so as to allow effective communication of the Call Servers current overload level back to the MGWs, including those previously notified of a lower overload level.

The effect of the scheme is that the level of call attempts being offered to the Call Server is significantly reduced during the period of overload. This will increase the ability of the Call Server to cope with calls correctly and, in particular to retain the capacity to adequately support emergency, or priority, calls.

A first preferred embodiment of the present invention is now described with reference to FIGS. 5, 6, 7 and 8.

FIG. 5 is an Information Model, sometimes known as an Entity Relationship Diagram, showing the data items necessary for this implementation, and the relationships between them. Object 2 Gateway represents a MGW. Each Gateway has an identity consisting of a single attribute, gateway_id.

Each Gateway contains two further attributes: reject_rate, containing the proportion of calls which should be rejected by this Gateway; and parent_id: the identity of the Call Server controlling this Gateway. In addition, each Gateway contains a state variable, current_state, which identifies the Gateway's place in its state machine.

Object 4 Load Information represents new functionality added to the Call Server. As there is one instance of Load Information on each Call Server, irrespective of how many MGWs it controls, it can use the Call Server identity as its identity. The Load Information object contains a single attribute, reject_rate, containing the proportion of calls that should be rejected by all its Gateways. In addition, Load Information contains a state variable, current_state, which identifies the Load Information's place in its state machine.

Object 5 Gateway Load Information represents the data held on the Call Server about each Gateway controlled by it to support the functionality in Load Information. Each Gateway Load Information contains a single attribute per MGW, last_reject_rate, containing the proportion of calls to be rejected last notified to the Gateway. Gateway Load Information is implemented on the Call Server.

FIG. 6 is an Object Communication Model, showing the messages that pass between the objects. These messages will be discussed in detail below with reference to FIGS. 7 and 8. In addition to the two state machines (Gateway and Load Information) identified on the Information Model, FIG. 6 shows four terminators:

End User, representing the network termination equipment (e.g. telephone set) and the person using it;
Timer, representing the Timing function on the Gateway,
Call Control, representing the existing call connection functionality of the Call Server; and
Operating System, representing the existing software infrastructure of the Call Server.

FIGS. 7, 8, 18, 19, 22 and 23 are State Transition Diagrams. In these state transition diagrams, each state is represented by a box containing the action associated with that state. The action associated with a state is performed each time the state is entered. To keep the state machine simple, the object (Gateway or Load Information) can send messages to itself; the state machine processes these messages before messages from any other object. To initialise these state machines, the following pattern is used: a special message, Create, is used to enter a special state, Creating. The action associated with Creating is to initialise the object's data and send a Creation_Complete message to this object. In addition to the description of the actions associated with a state, each state box contains an unordered list of messages generated by the state's action.

FIG. 7 is the State Transition Diagram for the Gateway according to the first embodiment. Operation of the Gateway will now be described with reference to FIG. 7.

As indicated in FIG. 7, from the Creating state, the Gateway enters state 2 Overloaded, with an appropriate default value of attribute reject_rate. Gateway will remain in state 2 Overloaded until it receives a message. In state 2 Overloaded, Gateway can receive any of the following six messages:

GW3:Timer from the Timer object causes Gateway to transition to state 3 Process Timer. If the current value of attribute reject_rate is greater than zero, reject_rate is decremented. If reject_rate is now less than zero, reject_rate is set to zero. If reject_rate is now equal to zero, Gateway sends message GW4:Out_Of_Overload to itself, which causes Gateway to transition to state 4 Normal; otherwise, Gateway sends message GW5: Stay_In_Overload to itself, which causes Gateway to transition back to state 2 Overloaded. If the value of attribute reject_rate on entry to the state 3 Process Timer was not greater than zero, Gateway sends message GW4:Out_Of_Overload to itself, which causes Gateway to transition back to state 4 Normal.

GW6:Negative_Acknowledgement from the Load Information object causes Gateway to transition to state 7 Handle_Neg_Ack. If the current value of attribute reject_rate is less than the value of the parameter new_reject_rate received in the message, attribute reject_rate is set to the value of new_reject_rate. Gateway sends message GW5:Stay_In_Overload to itself, which will cause it to transition to state 2 Overloaded at the end of the action. Gateway then sends message GW8:Off_Hook to itself, so that the off hook message that prompted the negative acknowledgement is filtered by the action of state 9 Off_Hook_In_Overload (see under GW8:Off_Hook, below).

GW7:Load Level from the Load Information object causes Gateway to transition to state 5 Process_New_Load_Level. If the current value of attribute reject_rate is less than the value of the parameter new_reject_rate received in the message, reject_rate is set to new_reject_rate. Gateway sends GW5:Stay_In_Overload to itself, which causes Gateway to transition to state 2 Overloaded.

GW8:Off_Hook from the End User object causes Gateway to transition to state 9 Off_Hook_In_Overload. Gateway decides whether this off hook message should be sent to the Call Server, given the current value of attribute reject_rate. If the decision is to send the off hook message, Gateway passes the event to its parent Call Server, by sending LI6:Off_Hook to the Call Server. If the decision is not to send the off hook message, Gateway informs the end user. Whatever, the decision, Gateway sends message GW5:Stay_In_Overload to itself, which causes Gateway to transition back to state 2 Overloaded.

GW9:Other_Telephony_Event from the End User object causes Gateway to transition to state 8 Line_Event_In_Overload. Gateway passes the event to its parent Call Server, by sending message LI7:Other_Telephony_Event to the Call Server. Gateway then sends message GW5:Stay_In_Overload to itself, which causes Gateway to transition back to state 2 Overloaded.

GW10:Response from the Load Information object causes Gateway to transition to state 12 Overloaded_Response. Gateway processes the response as normal. Gateway then sends message GW5:Stay_In_Overload to itself, which causes Gateway to transition back to state 2 Overloaded.

When Gateway has received sufficient GW3:Timer messages, the reject_rate will have been reduced to zero, and Gateway will have transited to state 4 Normal. Gateway will remain in state 4 Normal until it receives a message. Gateway can receive any of the following six messages in this state:

GW3:Timer from the Timer object causes Gateway to transition to state 3 Process Timer. As the value of reject_rate on entry to state 3 Process Timer is not greater than zero, Gateway sends message GW4:Out_Of_Overload to itself, which causes Gateway to transition back to state 4 Normal.

GW6:Negative_Acknowledgement from the Load Information object causes Gateway to transition to state 7 Handle_Neg_Ack. As the current value of attribute reject_rate is zero, it will be less than the value of the parameter new_reject_rate received in the message, and reject_rate is set to the value of new_reject_rate. Gateway sends message GW5:Stay_In_Overload to itself, which will cause it to transition to state 2 Overloaded at the end of the action. Gateway then sends message GW8:Off_Hook to itself, so that the off hook message that prompted the negative acknowledgement is filtered by the action of state 9 Off_Hook_In_Overload (see under GW8:Off_Hook, above).

GW7:Load Level from the Load Information object causes Gateway to transition to state 5 Process_New_Load_Level. As the current value of attribute reject_rate is zero, it will be less than the value of the parameter new reject_rate received in the message, and reject_rate is set to the value of new_reject_rate. Gateway sends message GW5:Stay_In_Overload to itself, which causes Gateway to transition to state 2 Overloaded.

GW8:Off_Hook from the End User object causes Gateway to transition to state 10 Off_Hook_Normal. Gateway passes event to its parent Call Server, by sending message LI6:Off_Hook to the Call Server. Gateway then sends message GW4:Out_Of_Overload to itself, which causes Gateway to transition back to state 4 Normal.

GW9:Other_Telephony_Event from the End User object causes Gateway to transition to state 6 Line_Event_Normal. Gateway passes the event to its parent Call Server, by sending message LI7:Other_Telephony_Event to the Call Server. Gateway then send message GW4:Out_Of_Overload to itself, which causes Gateway to transition back to state 4 Normal.

GW10:Response from the Load Information object causes Gateway to transition to state 11 Normal_Response. Gateway processes the response as normal. Gateway then sends message GW4:Out_Of_Overload to itself, which causes Gateway to transition back to state 4 Normal.

FIG. 8 is the state transition diagram for the Load Information. Operation of the Load Information will now be described with reference to FIG. 8.

As indicated in FIG. 8, from the Creating state, the Load Information enters state 2 Normal, with attribute reject_rate set to zero. Load Information will remain in state 2 Normal until it receives a message. Load Information can receive any of the following five messages in this state:

LI3:Load_Level from the Operating System object causes Load Information to transition to state 4 Check_Load_Level. Attribute reject_rate is set to the value of the parameter new_reject_rate received in the Load_Level message. If attribute reject_rate is now zero, for each Gateway controlled by this Call Server, Load Information sets the value of attribute last_reject_rate associated with the Gateway to zero, then Load Information sends message LI5:Out_Of_Overload to itself, which will cause it to transition to state 2 Normal. If reject_rate is now non-zero, Load Information sends message LI4:Into_Overload to itself, which will cause it to transition to state 3 Overloaded (see below).

LI6:Off_Hook from the Gateway object causes Load Information to transition to state 8 Normal_Off_Hook. Load Information passes the event to Call Control, by sending message CC1:Off_Hook to its call control. Load Information then sends message LI5:Out_Of_Overload to itself, which causes it to transition back to state 2 Normal.

LI7:Other_Telephony_Event from the Gateway object causes Load_Information to transition to state 5 Normal_Telephony_Event. Load Information passes the event to Call Control, by sending message CC2:Other_Telephony_Event to its call control. Load Information then sends message LI5:Out_Of_Overload to itself, which causes it to transition back to state 2 Normal.

LI8:Reject_Call_For_Load from the Call Control object causes Load Information to transition to state 12 Normal_Reject. Message LI8:Reject_Call_For_Load is a special response, indicating that Call Control is too busy to handle this call. LI8:Reject_Call_For_Load can arrive when Load Information is in state 2 Normal because Call Control's rejection mechanism is independent of the mechanism of Load Information and Call Control can reject calls when all calls are being accepted by the Gateways (i.e. no Gateway filtering). Load Information passes the event to the Gateway, by sending message GW10:Response to the Gateway identified by the parameter gateway_id received in the Reject_Call_For_Load message. Load Information then sends message LI5:Out_Of_Overload to itself, which will cause it to transition back to state 2 Normal.

LI9:Response from the Call Control object causes Load Information to transition to state 11 Normal_Response. Load Information passes the event to the Gateway, by sending message GW10:Response to the Gateway identified by the parameter gateway_id received in the LI9:Response message. Load Information then sends message LI5:Out_Of_Overload to itself, which will cause it to transition back to state 2 Normal.

When Load Information has received an LI3:Load_Level message from the Operating System with parameter new_reject_rate greater than zero, it will have transitioned to state 3 Overloaded. Load Information will remain in state 3 Overloaded until it receives a message. Load Information can receive any of the following five messages in this state:

LI3:Load_Level from the Operating System object causes Load Information to transition to state 4 Check_Load_Level. Attribute reject_rate is set to the value of the parameter new_reject_rate received in the Load_Level message. If attribute reject_rate is now zero, for each Gateway controlled by this Call Server, Load Information sets the value of attribute last_reject_rate associated with the Gateway to zero, then Load Information sends message LI5:Out_Of_Overload to itself, which will cause it to transition to state 2 Normal. If attribute reject_rate is now non-zero, Load Information sends message LI4:Into_Overload to itself, which will cause it to transition to state 3 Overloaded.

LI6:Off_Hook from the Gateway object causes Load Information to transition to state 6 Overload_Off_Hook. If the current value of attribute reject_rate is greater than the value of attribute last_reject_rate associated with the Gateway identified by gateway_id received in the LI6:Off_Hook message, Load Information sends message GW6:Negative_Acknowledgement, with the current value of reject_rate as a parameter, to the identified Gateway, and sets the value of attribute last_reject_rate associated with the identified Gateway to the current value of reject_rate. Otherwise, Load Information passes the event to Call Control, by sending message CC1:Off_Hook to its call control. Load Information then sends message LI4:Into_Overload to itself, which causes it to transition back to state 3 Overloaded.

LI7:Other_Telephony_Event from the Gateway object causes Load_information to transition to state 7 Overload_Other_Event. Load Information passes the event to Call Control, by sending message CC2:Other_Telephony_Event to its call control. Load Information then sends message LI4:Into_Overload to itself, which causes it to transition back to state 3 Overloaded.

LI8:Reject_Call_For_Load from Call control object causes Load_Information to transition to state 9 Overloaded_Reject. Load Information passes the event to the Gateway, by sending message GW10:Response to the Gateway identified by the parameter gateway_id received in the LI8:Reject_Call_For_Load message. Load Information then informs the Gateway of the rejection rate it should be using by sending message GW7:Load_Level, with the current value of attribute reject_rate as a parameter, to the identified Gateway, and sets the value of last_reject_rate associated with the identified Gateway to the current value of reject_rate. Load Information then send message LI4:Into_Overload, which causes it to transition back to state 3 Overloaded.

LI9:Response from the Call Control object causes Load Information to transition to state 10 Overloaded_Response. Load Information passes the event to the Gateway identified by the parameter gateway_id received in the LI9:Response message, by sending message GW10:Response to the identified Gateway. Load Information then sends message LI4:Into_Overload to itself, which will cause it to transition back to state 3 Overloaded.

According to a further embodiment, emergency or of Lifeline Service, currently accessed by 999 in the UK, 112 in Europe, and 911 in North America is supported by collecting sufficient digits in the MGW to determine if the Lifeline Service is required. Such calls bypass the reject_rate filter in the MGW and are always offered to the Call Server. Advantageously, similar support would be provided to preference working, where a small subset of end users is guaranteed service, even when the system is overloaded. According to this embodiment, the Call Server informs the MGW of any lines connected to the MGW that support such a preferred end user and the MGW arranges that calls from any such line bypass the reject rate filter and are always offered to the Call Server. According to a further embodiment, priority calls are taken to a second, less strict filter that increases their chance of a successful connection. Advantageously, filtering is achieved in a statistical manner by arranging a table with a set of random numbers. The filtering decision is based on comparison of the next number in the table with the current reject rate. Only if the number is higher than the current value of reject rate is the message passed to the Call server.

According to a further embodiment, detection of very high levels of Call Agent overload could result in reject levels of >100, i.e. no calls being passed by the filter in the relevant MGWs and the relevant MGWs being instructed to reject all calls when used with digit collection, i.e. including lifeline and priority calls.

A second preferred embodiment is now described with reference to FIGS. 5 and 17 to 19. According to the second embodiment, the rejection rate is sent in every response message to the Gateways. Advantageously, this second embodiment ensures rapid response to changes in Call Sever load. The Information Model for the second embodiment is the same as for the first embodiment, as shown in FIG. 5 and will not be described further here.

Figure 17:
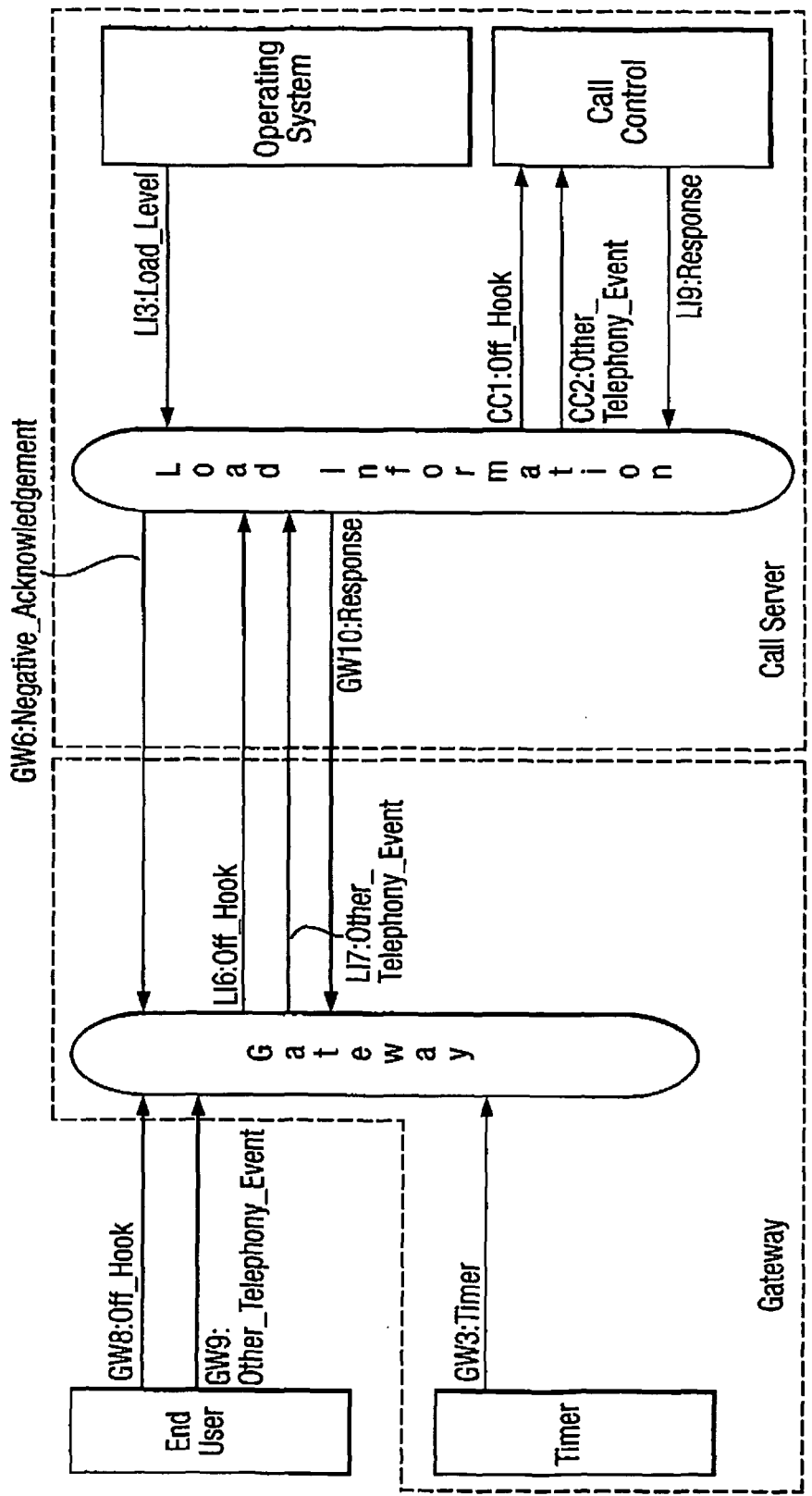

The Object Communication Model for the second preferred embodiment, as shown in FIG. 17, contains the same set of state machines and terminators as for the first embodiment and these will not be described further here. The messages are not the same as for the first embodiment and will be described below.

FIG. 18 shows the State Transition Diagram for the Gateway of the second preferred embodiment. Operation of the Gateway will now be described with reference to FIG. 18.

From the Creating state, the Gateway enters state 2 Overloaded, with an appropriate default value of attribute reject_rate. Gateway will remain in state 2 Overloaded until it receives a message. Gateway can receive any of the following five messages in this state:

GW3:Timer from the Timer object causes Gateway to transition to state 3 Process Timer. If the current value of attribute reject_rate is greater than zero, attribute reject_rate is decremented. If attribute reject_rate is now less than zero, reject_rate is set to zero. If attribute reject_rate is now equal to zero, Gateway sends message GW4:Out_Of_Overload to itself, which causes Gateway to transition to state 4 Normal; otherwise, Gateway sends message GW5:Stay_In_Overload to itself, which causes Gateway to transition back to state 2 Overloaded. If the value of attribute reject_rate on entry to the state 3 Process Timer was not greater than zero, Gateway sends message GW4:Out_Of_Overload to itself, which causes Gateway to transition back to state 4 Normal.

GW6:Negative_Acknowledgement from the Load Information object causes Gateway to transition to state 7 Handle_Neg_Ack. If the current value of attribute reject_rate is less than the value of the parameter new_reject_rate received in the Negative_Acknowledgement message, reject_rate is set to the value of new_reject_rate. Gateway sends message GW5:Stay_In_Overload to itself, which will cause it to transition to state 2 Overloaded at the end of the action. Gateway then sends message GW8:Off_Hook to itself, so that the off hook message is filtered by the action of state 9 Off_Hook_In_Overload (see under GW8:Off_Hook, below).

GW8:Off_Hook from the End User object causes Gateway to transition to state 9 Off_Hook_In_Overload. Gateway decides whether this off hook message should be sent to the Call Server, given the current value of attribute reject_rate. If the decision is to send the off hook message, Gateway passes the event to its parent Call Server, by sending message LI6:Off_Hook to the Call Server. If the decision is not to send the off hook message, Gateway informs the end user. Whatever, the decision, Gateway sends message GW5:Stay_In_Overload to itself, which causes Gateway to transition back to state 2 Overloaded.

GW9:Other_Telephony_Event from the End User object causes Gateway to transition to state 8 Line_Event_In_Overload. Gateway passes the event to its parent Call Server, by sending message LI7:Other_Telephony_Event to the Call Server. Gateway then sends message GW5:Stay_In_Overload to itself, which causes Gateway to transition back to state 2 Overloaded.

GW10:Response from the Load Information object causes Gateway to transition to state 12 Overloaded_Response. If the current value of attribute reject_rate is less than the value of the parameter new_reject_rate received in the Response message, reject_rate is set to the value of new_reject_rate. Gateway processes the response as normal, then sends message GW5:Stay_In_Overload to itself, which causes Gateway to transition back to state 2 Overloaded.

When Gateway has received sufficient GW3:Timer messages, the attribute reject_rate will have been reduced to zero, and Gateway will have transited to state 4 Normal. Gateway will remain in state 4 Normal until it receives a message. Gateway can receive any of the following five messages in this state:

GW3:Timer from the Timer object causes Gateway to transition to state 3 Process Timer. As the value of attribute reject_rate on entry to state 3 Process Timer is not greater than zero, Gateway sends message GW4:Out_Of_Overload to itself, which causes Gateway to transition back to state 4 Normal.

GW6:Negative_Acknowledgement from the Load Information object causes Gateway to transition to state 7 Handle_Neg_Ack. If the current value of attribute reject_rate is less than the value of the parameter new_reject_rate received in the Negative_Acknowledgement message, reject_rate is set to the value of new_reject_rate. Gateway sends message GW5:Stay_In_Overload to itself, which will cause it to transition to state 2 Overloaded at the end of the action. Gateway then sends message GW8:Off_Hook to itself, so that the off hook message is filtered by the action of state 9 Off_Hook_In_Overload (see under GW8:Off_Hook, above).

GW8:Off_Hook from the End User object causes Gateway to transition to state 10 Off_Hook_Normal. Gateway passes the event to its parent Call Server, by sending message LI6:Off_Hook to the Call Server. Gateway then sends message GW4:Out_Of_Overload to itself, which causes Gateway to transition back to state 4 Normal.

GW9:Other_Telephony_Event from the End User object causes Gateway to transition to state 6 Line_Event_Normal. Gateway passes the event to its parent Call Server, by sending message LI7:Other_Telephony_Event to the Call Server. Gateway then sends message GW4:Out_Of_Overload to itself, which causes Gateway to transition back to state 4 Normal.

GW10:Response from the Load Information object causes Gateway to transition to state 11 Normal_Response. If the value of the parameter new_reject_rate received in the Response message is not zero, attribute reject_rate is set to the value of new_reject_rate, and Gateway sends message GW5:Stay_In_Overload to itself, which will cause Gateway to transition to state 2 Overloaded at the end of the action. Otherwise, Gateway sends message GW4:Out_Of_Overload to itself, which will cause Gateway to transition back to state 4 Normal at the end of the action. Gateway then processes the response as normal.

FIG. 19 shows the state transition diagram for the Load Information of the second preferred embodiment. Operation of the Load Information will now be described with reference to FIG. 19.

From the creating state, the Load Information enters state 2 Normal, with attribute reject_rate set to zero. Load Information will remain in state 2 Normal until it receives a message. Load Information can receive any of the following four messages in this state:

LI3:Load_Level from the Operating System object causes Load Information to transition to state 4 Check_Load_Level. Attribute reject_rate is set to the value of the parameter new_reject_rate received in the Load_Level message. If attribute reject_rate is now zero, for each Gateway controlled by this Call Server, Load Information sets the value of attribute last_reject_rate associated with the Gateway to zero, then Load Information sends message LI5:Out_Of_Overload to itself, which will cause it to transition to state 2 Normal. If attribute reject_rate is now non-zero, Load Information sends message LI4:Into_Overload to itself, which will cause it to transition to state 3 Overloaded.

LI6:Off_Hook from the Gateway object causes Load Information to transition to state 8 Normal_Off_Hook. Load Information passes the event to Call Control, by sending message CC1:Off_Hook to its call control. Load Information then sends message LI5:Out_Of_Overload to itself, which causes it to transition back to state 2 Normal.

LI7:Other_Telephony_Event from the Gateway object causes Load_Information to transition to state 5 Normal_Telephony_Event. Load Information passes the event to Call Control, by sending message CC2:Other_Telephony_Event to its call control. Load Information then sends message LI5:Out_Of_Overload to itself, which causes it to transition back to state 2 Normal.

LI9:Response from the Gateway object causes Load Information to transition to state 11 Normal_Response. Load Information passes the event to the Gateway, by sending message GW10:Response, with the current value of attribute reject_rate as a parameter, to the Gateway identified by the parameter gateway_id received in the LI9:Response message. Load Information sets the value of attribute last_reject_rate associated with the identified Gateway to the current value of attribute reject_rate. Load Information then sends message LI5:Out_Of_Overload to itself, which will cause it to transition back to state 2 Normal.

When Load Information has received an LI3:Load_Level message with parameter new_reject_rate greater than zero, it will have transitioned to state 3 Overloaded. Load Information will remain in state 3 Overloaded until it receives a message. Load Information can receive any of the following four messages in this state:

LI3:Load_Level from the Operating System object causes Load Information to transition to state 4 Check_Load_Level. Attribute reject_rate is set to the value of the parameter new_reject_rate received in the LI3:Load_Level message. If attribute reject_rate is now zero, for each Gateway controlled by this Call Server, Load Information sets the value of attribute last_reject_rate associated with the Gateway to zero, then Load Information sends message LI5:Out_Of_Overload to itself, which will cause it to transition to state 2 Normal. If attribute reject_rate is now non-zero, Load Information sends message LI4:Into_Overload to itself, which will cause it to transition to state 3 Overloaded.

LI6:Off_Hook from the Gateway object causes Load Information to transition to state 6 Overload_Off_Hook. If the current value of attribute reject_rate is greater than the value of last_reject_rate associated with the Gateway identified by gateway_id received in the LI6:Off_Hook message, Load Information sends message GW6:Negative_Acknowledgement, with the current value of reject_rate as a parameter, to the identified Gateway, and sets the value of attribute last_reject_rate associated with the identified Gateway to the current value of attribute reject_rate. Otherwise, Load Information passes the event to Call Control, by sending message CC1:Off_Hook to its call control. Load Information then sends message LI4:Into_Overload to itself, which causes it to transition back to state 3 Overloaded.

LI7:Other_Telephony_Event from the Gateway object causes Load_Information to transition to state 7 Overload_Other_Event. Load Information passes the event to Call Control, by sending message CC2:Other_Telephony_Event to its call control. Load Information then sends message LI4:Into_Overload to itself, which causes it to transition back to state 3 Overloaded.

LI9:Response from the Gateway object causes Load Information to transition to state 10 Overloaded_Response. Load Information passes the event to the Gateway, by sending message GW10:Response, with the current value of attribute reject_rate as a parameter, to the Gateway identified by the parameter gateway_id received in the LI9:Response message. Load Information sets the value of attribute last_reject_rate associated with the identified Gateway to the current value of attribute reject_rate. Load Information then sends message LI4:Into_Overload to itself, which will cause it to transition back to state 3 Overloaded.

Figure 20:
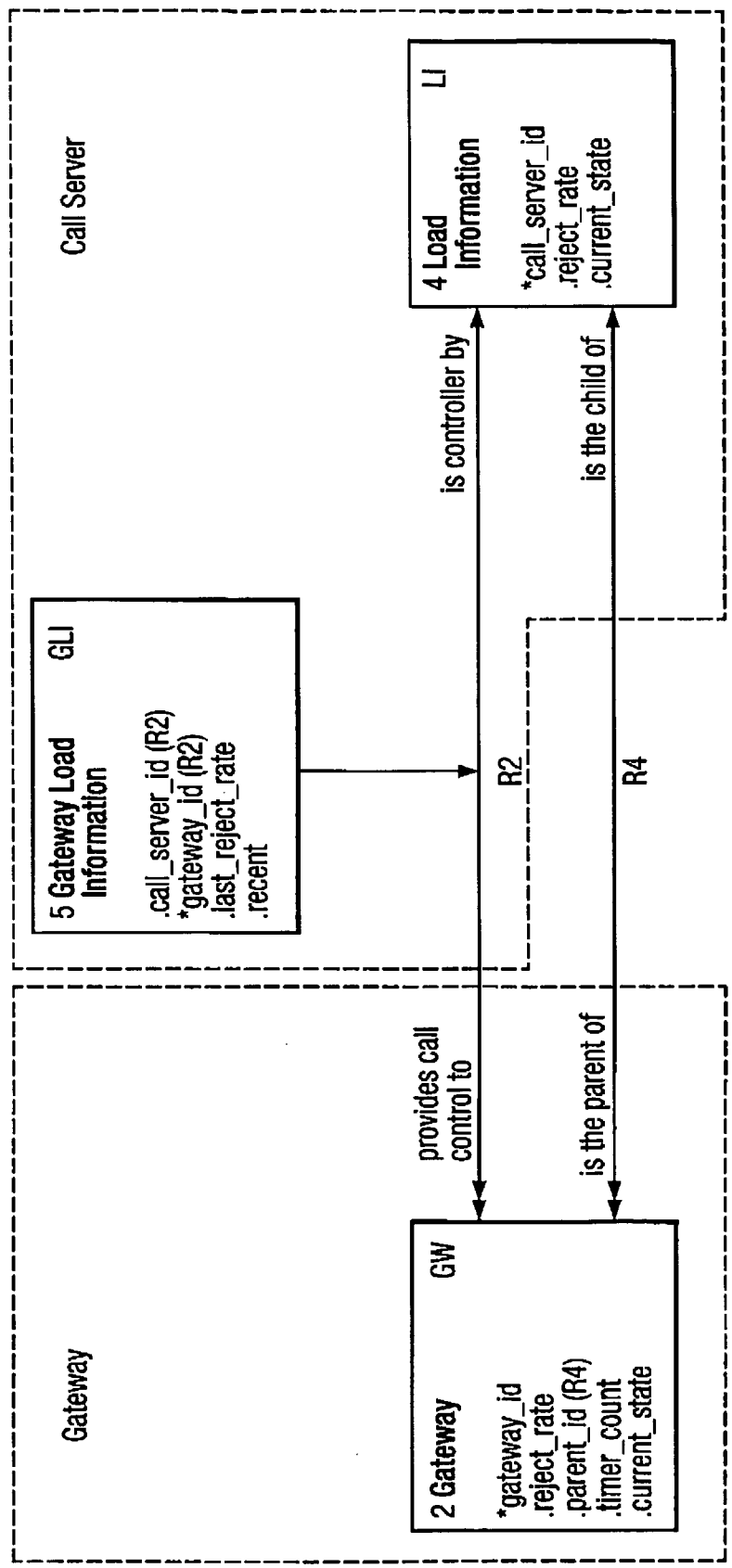

A third preferred embodiment is now described with reference to FIGS. 20 to 23. According to the third embodiment, a Gateway increases its reject rate if it doesn't get a message from the Call Server. Advantageously, this third embodiment maintains correct operation in the event that communication between the MGW and the Call Server is lost or disrupted. The Information Model for the third embodiment, as shown in FIG. 20, is extended from those for the first and second embodiments by the addition of an attribute, recent, to Object 5 Gateway Load Information, and an attribute, timer_count, to Object 2 Gateway. The new attribute, recent, is a Boolean, indicating whether the Call Server has recently sent the attribute reject_rate to the Gateway, with TRUE indicating that a message has recently been sent. The new attribute, timer_count, is an integer count of the number of timers messages received since reject_rate was last written to in this Gateway.

Figure 21:
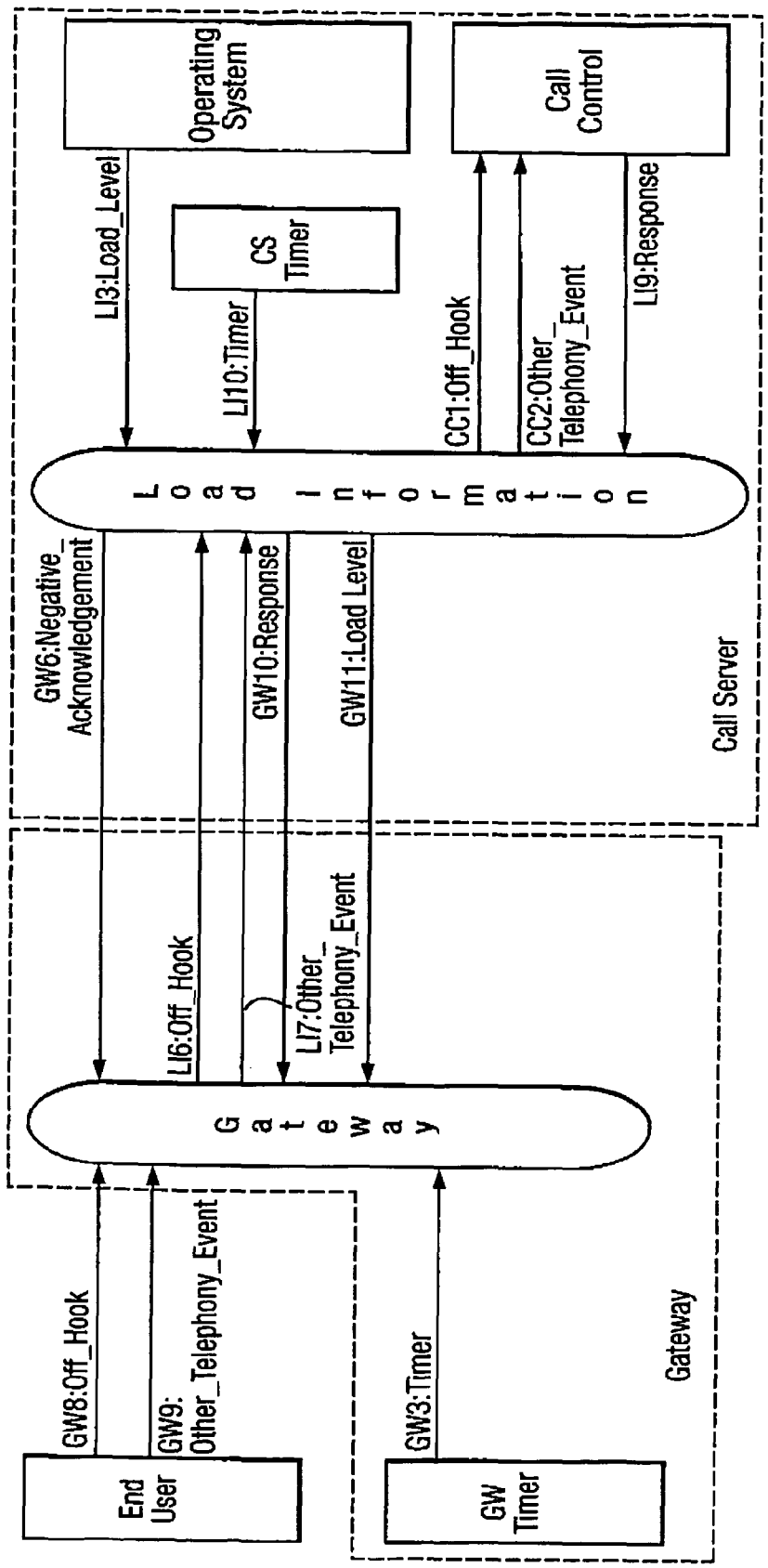

The Object Communication Model for the third preferred embodiment as shown in FIG. 21 shares some of the same state machines and terminators as for the first and second embodiments and these will not be described further here. The model is extended from that for the first and second embodiments by the addition of a new terminator, CS Timer, which represents the timing function on the Call Server The messages are basically the same as for the first embodiment except that message LI8:Reject_Call_For_Load is deleted from the basic case.

Figure 22:
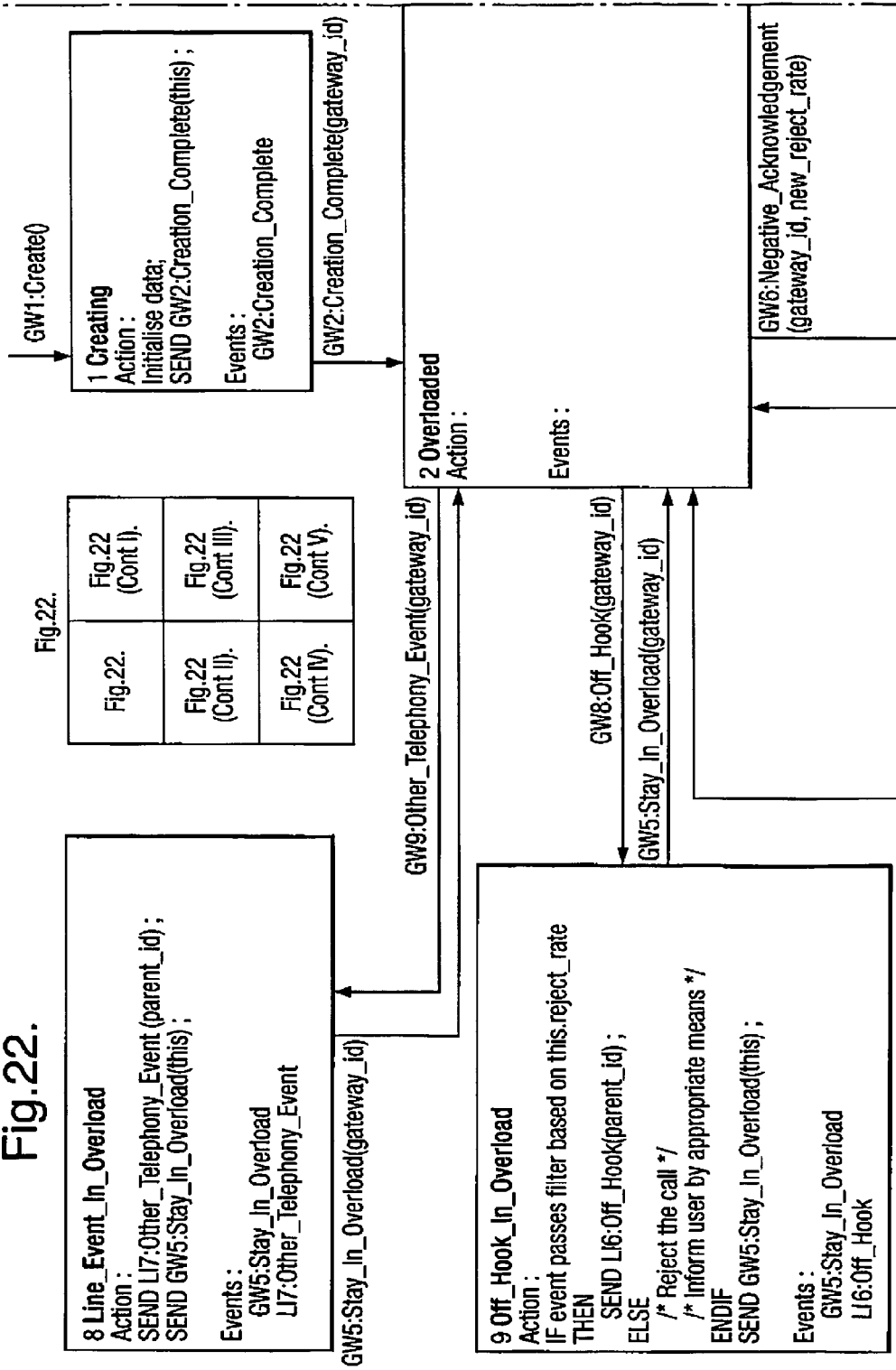

FIG. 22 shows the State Transition Diagram for the Gateway according to the third preferred embodiment. Operation of the Gateway will now be described with reference to FIG. 22.

From the Creating state, the Gateway enters state 2 Overloaded, with appropriate default values of attributes reject_rate and timer_count . . . Gateway will remain in state 2 Overloaded until it receives a message. Gateway can receive any of the following six messages in this state:

GW3:Timer from the GW Timer object causes Gateway to transition to state 3 Process Timer. If the current value of attribute timer_count is less than a predefined limit (REFRESH_LIMIT), timer_count is incremented by one. If attribute timer_count has already reached REFRESH_LIMIT, then if attribute reject_rate is less than one, reject_rate is increased. If attribute reject_rate is now greater than one, reject_rate is set to one. Whatever the value of attribute timer_count on entry to state 3 Process Timer, if reject_rate is now zero, Gateway sends message GW4:Out_Of_Overload to itself, which causes it to transition to state 4 Normal. If attribute reject_rate is now not zero, Gateway sends message GW5:Stay_In_Overload to itself, which causes it to transition to state 2 Overloaded.

GW6:Negative_Acknowledgement from the Load Information object causes Gateway to transition to state 7 Handle_Neg_Ack. If the current value of attribute reject_rate is greater than or equal to the value of the parameter new_reject_rate received in the GW6:Negative_Acknowledgement message, Gateway resends the event to the Call Server, by sending message LI6:Off_Hook to its parent Call Server. Gateway then sends message GW5:

Stay_In_Overload to itself, which will cause Gateway to transition to state 2 Overloaded at the end of the action. If the current value of attribute reject_rate is less than the value of the parameter new_reject_rate received in the GW6:Negative_Acknowledgement message, Gateway sends message GW5:Stay_In_Overload to itself, which will cause it to transition to state 2 Overloaded at the end of the action. Gateway then sends message GW8:Off_Hook to itself, so that the off hook message is filtered by the action of state 9 Off_Hook_In_Overload (see under GW8:Off_Hook, below). Gateway now sets attribute reject_rate to the value of the parameter new_reject_rate received in the Negative_Acknowledgement message, then sets attribute timer_count to zero.

GW8:Off_Hook from the End User object causes Gateway to transition to state 9 Off_Hook_In_Overload. Gateway decides whether this off hook message should be sent to the Call Server, given the current value of reject_rate. If the decision is to send the off hook message, Gateway passes the event to its parent Call Server, by sending message LI6:Off_Hook to the Call Server. If the decision is not to send the off hook message, Gateway informs the end user. Whatever, the decision, Gateway sends message GW5:Stay_In_Overload to itself, which causes Gateway to transition back to state 2 Overloaded.

GW9:Other_Telephony_Event from the End User object causes Gateway to transition to state 8 Line_Event_In_Overload. Gateway passes the event to the Call Server, by sending message LI7:Other_Telephony_Event to its parent Call Server. Gateway then sends message GW5:Stay_In_Overload to itself, which causes Gateway to transition back to state 2 Overloaded.

GW10:Response from the Load Information Object causes Gateway to transition to state 12 Overloaded_Response. Gateway sets attribute reject_rate to the value of the parameter new_reject_rate received in the GW10:Response message, and sets timer_count to 0. If attribute reject_rate is now greater than zero, Gateway sends message GW5:Stay_In_Overload to itself, which will cause it to transition to state 2 Overloaded at the end of the action. If attribute reject_rate is now equal to zero, Gateway sends message GW4:Out_Of_Overload to itself, which will cause it to transition to state 4 Normal at the end of the action. Gateway now processes the Response as normal.

GW11:Load_Level from the Load Information Object causes Gateway to transition to state 13 Process_New_Load_Level. Gateway sets attribute reject_rate to the value of the parameter new_reject_rate received in the message, and sets attribute timer_count to 0. If attribute reject_rate is now equal to zero, Gateway sends message GW4:Out_Of_Overload to itself, which will cause it to transition to state 4 Normal at the end of the action. If attribute reject_rate is now greater than zero, Gateway sends message GW5:Stay_In_Overload to itself, which will cause it to transition to state 2 Overloaded at the end of the action.

When Gateway has received a GW11:Load_Level message containing a new_reject_rate of zero, it will have transitioned to state 4 Normal . . . Gateway will remain in state 4 Normal until it receives a message Gateway can receive any of the following five messages in this state:

GW3:Timer from the GW Timer object causes Gateway to transition to state 3 Process Timer. If the current value of attribute timer_count is less than a predefined limit (REFRESH_LIMIT), timer_count is incremented by one. If attribute timer_count has already reached REFRESH_LIMIT, then if attribute reject_rate is less than 1, reject_rate is increased. If attribute reject_rate is now greater than one, reject_rate is set to one. Whatever the value of attribute timer_count on entry, if reject_rate is now zero, Gateway sends message GW4:Out_Of_Overload to itself, which causes it to transition to state 4 Normal. If attribute reject_rate is now not zero, Gateway sends message GW5:Stay_In_Overload to itself, which causes it to transition to state 2 Overloaded.

GW6:Negative_Acknowledgement from the Load Information object causes Gateway to transition to state 7 Handle_Neg_Ack. If the current value of attribute reject_rate is greater than or equal to the value of the parameter new_reject_rate received in the Negative_Acknowledgement message, Gateway resends the event to the Call Server, by sending message LI6:Off_Hook to its parent Call Server. Gateway then sends message GW5:Stay_In_Overload to itself, which will cause Gateway to transition to state 2 Overloaded at the end of the action. If the current value of attribute reject_rate is less than the value of the parameter new_reject_rate received in the Negative_Acknowledgement message, Gateway sends message GW5:Stay_In_Overload to itself, which will cause it to transition to state 2 Overloaded at the end of the action. Gateway then sends message GW8:Off_Hook to itself, so that the off hook message is filtered by the action of state 9 Off_Hook_In_Overload (see under GW8:Off_Hook, above). Gateway now sets attribute reject_rate to the value of the parameter new reject_rate received in the GW6:Negative_Acknowledgement message, then sets attribute timer_count to zero.

GW8:Off_Hook from the End User object causes Gateway to transition to state 10 Off_Hook_Normal. Gateway passes the event to the Call Server, by sending message LI6:Off_Hook to its parent Call Server. Gateway then sends message GW4:Out_Of_Overload to itself, which causes Gateway to transition back to state 4 Normal.

GW9:Other_Telephony_Event from the End User object causes Gateway to transition to state 6 Line_Event_Normal. Gateway passes the event to the Call Server, by sending message LI7:Other_Telephony_Event to its parent Call Server. Gateway then sends message GW4:Out_Of_Overload to itself, which causes Gateway to transition back to state 4 Normal.

GW10:Response from the Load Information Object causes Gateway to transition to state 11 Normal_Response. Gateway sets attribute reject_rate to the value of the parameter new_reject_rate received in the Response message, and sets attribute timer_count to 0. If attribute reject_rate is now greater than zero, Gateway sends message GW5:Stay_In_Overload to itself, which will cause it to transition to state 2 Overloaded at the end of the action. If attribute reject_rate is now equal to zero, Gateway sends message GW4:Out_Of_Overload to itself, which will cause it to transition to state 4 Normal at the end of the action. Gateway now processes the Response as normal.

GW11:Load_Level from the Load Information Object causes Gateway to transition to state 13 Process_New_Load_Level. Gateway sets attribute reject_rate to the value of the parameter new_reject_rate received in the GW11:Load_Level message, and sets attribute timer_count to 0. If attribute reject_rate is now equal to zero, Gateway sends message GW4:Out_Of_Overload to itself, which will cause it to transition to state 4 Normal at the end of the action. If attribute reject_rate is now greater than zero, Gateway sends message GW5:Stay_I- n_Overload to itself, which will cause it to transition to state 2 Overloaded at the end of the action.

FIG. 23 shows the state transition diagram for the Load Information according to the third preferred embodiment. Operation of the Load Information will now be described with reference to FIG. 23.

From the creating state, the Load Information enters state 2 Normal, with attribute reject_rate set to zero. Load Information will remain in state 2 Normal until it receives a message Load Information can receive any of the following five messages in this state:

LI3:Load_Level from the Operating System object causes Load Information to transition to state 4 Check_Load_Level. Attribute reject_rate is set to the value of the parameter new_reject_rate received in the LI13:Load_Level message. If reject_rate is now zero, for each Gateway controlled by this Call Server, Load Information sets the value of attribute last_reject_rate associated with the Gateway to zero, then Load Information sends message LI5:Out_Of_Overload to itself, which will cause it to transition to state 2 Normal. If reject_rate is now non-zero, Load Information sends message LI4:Into_Overload to itself, which will cause it to transition to state 3 Overloaded.

LI6:Off_Hook from the Gateway object causes Load Information to transition to state 8 Normal_Off_Hook. Load Information passes the event to Call Control, by sending message CC1:Off_Hook to its call control. Load Information then sends message LI5:Out_Of_Overload to itself, which causes it to transition back to state 2 Normal.

LI7:Other_Telephony_Event from the Gateway object causes Load_Information to transition to state 5 Normal_Telephony_Event. Load Information passes the event to Call Control, by sending message CC2:Other_Telephony_Event to its call control. Load Information then sends message LI5:Out_Of_Overload to itself, which causes it to transition back to state 2 Normal.

LI9:Response from the Call Control object causes Load Information to transition to state 11 Normal_Response. Load Information passes the event to the Gateway, by sending message GW10:Response, with the current value of attribute reject_rate as a parameter, to the Gateway identified by the parameter gateway_id received in the LI9:Response message. Load Information now sets the values of attributes recent and last_reject_rate associated with the identified Gateway to TRUE and the current value of attribute reject_rate respectively. Load Information then sends message LI5:Out_Of_Overload to itself, which will cause it to transition back to state 2 Normal.

LI10:Timer from the CS Timer object causes Load Information to transition to state 13 Process_Timer. For each Gateway controlled by this Call Server, if the value of attribute recent associated with the Gateway is FALSE, Load Information sends message GW11:Load_Level to the Gateway, with the current value of attribute reject_rate as the parameter, and sets the value of attribute recent associated with the Gateway to TRUE; otherwise, Load Information sets the value of attribute recent associated with the Gateway to FALSE. If reject_rate is zero, Load Information sends message LI5:Out_Of_Overload to itself, which will cause it to transition to state 2 Normal at the end of the action. If reject_rate is non-zero, Load Information sends message LI4:Into_Overload to itself, which will cause it to transition to state 3 Overloaded at the end of the action.

When Load Information has received an LI3:Load_Level message with parameter new_reject_rate greater than zero, it will have transitioned to state 3 Overloaded. Load Information will remain in state 3 Overloaded until it receives a message. Load Information can receive any of the following four messages in this state:

LI3:Load_Level from the Operating System object causes Load Information to transition to state 4 Check_Load_Level. Attribute reject_rate is set to the value of the parameter new_reject_rate received in the LI3:Load_Level message. If reject_rate is now zero, for each Gateway controlled by this Call Server, Load Information sets the value of attribute last_reject_rate associated with the Gateway to zero, then Load Information sends message LI5:Out_Of_Overload to itself, which will cause it to transition to state 2 Normal. If reject_rate is now non-zero, Load Information sends message LI4:Into_Overload to itself, which will cause it to transition to state 3 Overloaded.

LI6:Off_Hook from the Gateway object causes Load Information to transition to state 6 Overload_Off_Hook. If the current value of attribute reject_rate is greater than the value of attribute last_reject_rate associated with the Gateway identified by gateway_id received in the Off_Hook message, Load Information sends message GW6:Negative_Acknowledgement, with the current value of reject_rate as a parameter, to the identified Gateway, and sets the values of attributes recent and last_reject_rate associated with the identified Gateway to TRUE and the current value of attribute reject_rate respectively. Otherwise, Load Information passes the event to Call Control, by sending message CC1:Off_ Hook to its call control. Load Information then sends message LI4:Into_Overload to itself, which causes it to transition back to state 3 Overloaded.

LI7:Other_Telephony_Event from the Gateway object causes Load_Information to transition to state 7 Overload_Other_Event. Load Information passes the event to Call Control, by sending message CC2:Other_Telephony_Event to its call control. Load Information then sends message LI4:Into_Overload to itself, which causes it to transition back to state 3 Overloaded.

LI9:Response from the Call Control object causes Load Information to transition to state 10 Overloaded_Response. Load Information passes the event to the Gateway, by sending message GW10:Response, with the current value of attribute reject_rate as a parameter, to the Gateway identified by the parameter gateway_id received in the LI9:Response message. Load Information sets the values of attributes recent and last_reject_rate associated with the identified Gateway to TRUE and the current value of attribute reject_rate respectively. Load Information then sends message LI4:Into_Overload to itself, which causes it to transition back to state 3 Overloaded.

LI10:Timer from the CS Timer object causes Load Information to transition to state 13 Process_Timer. For each Gateway controlled by this Call Server, if the value of attribute recent associated with the Gateway is FALSE, Load Information sends message GW11:Load_Level to the Gateway, with the current value of attribute reject_rate as the parameter, and sets the value of attribute recent associated with the Gateway to TRUE; otherwise, Load Information sets the value of attribute recent associated with the Gateway to FALSE. If reject_rate is zero, Load Information sends message LI5:Out_Of_Overload to itself, which will cause it to transition to state 2

Normal at the end of the action. If reject_rate is non-zero, Load Information sends message LI4:Into_Overload to itself, which will cause it to transition to state 3 Overloaded at the end of the action.

The message sequences will now be described with reference to FIGS. 9 to 16.

FIGS. 9 and 10 show typical behaviour in conventional networks, using the message names in FIGS. 6, 7, and 8 where appropriate. It is noted that the novel Load Information function is not present in these figures. The Gateway is informed that the End User wishes to make a call by the receipt of a GW8:Off_Hook message. The Gateway passes this on to its parent Call Server by sending a CC1:Off_Hook message.

FIG. 9 shows the case where the Call Server accepts the call initiation, and requests the Gateway to continue by sending GW10:Response message containing appropriate parameters. The Gateway reacts by supplying Dial Tone to the End User, to prompt the input of digits.

FIG. 10 shows the case where the Call Server rejects the call initiation, and tells the Gateway to stop by sending a GW10:Response message containing appropriate parameters. The Gateway reacts by supplying Network Busy Tone to the End User.

FIGS. 11 to 16 show typical behaviour according to the embodiments of the present invention, as previously described with reference to FIGS. 6, 7, and 8.

FIG. 11 shows the case where the Call Server accepts the call initiation. The Gateway is informed that the End User wishes to make a call by the receipt of a GW8:Off_Hook message. The Gateway passes this on to its parent Call Server by sending a LI6:Off_Hook message. Load Information passes this on to its Call Control by sending a CC1:Off_Hook message. Call Control accepts the call initiation, and requests the Gateway to continue by sending a LI9:Response to Load Information. Load Information passes this on to the Gateway by sending a GW10:Response containing appropriate parameters. The Gateway reacts by supplying Dial Tone to the End User, to prompt the input of digits.

FIG. 12 shows the case where the Call Server rejects the call initiation while it is at low levels of load. The Gateway is informed that the End User wishes to make a call by the receipt of a GW8:Off_Hook message. The Gateway passes this on to its parent Call Server by sending a LI6:Off_Hook message. Load Information passes this on to its Call Control by sending a CC1:Off_Hook message. Call Control rejects the call initiation, and tells the Gateway to stop by sending a LI8:Reject_Call_For Load. Load Information passes this on to the Gateway by sending a GW10:Response message containing appropriate parameters. The Gateway reacts by supplying Network Busy tone to the End User.

FIGS. 13, 15, and 16 show the case where the load on the Call Server has increased since the Gateway was last informed of the required proportion of calls to be rejected. The Gateway is informed that the End User wishes to make a call by the receipt of a GW8:Off_Hook message. The Gateway passes this on to its parent Call Server by sending a LI6:Off_Hook message. Load Information reacts by sending a GW6:Negative_Acknowledgement to the Gateway. The Gateway stores the value of new_reject_rate supplied in the message, then reprocesses the Off_Hook message.

FIG. 13 shows the case where the Gateway decides to pass on the Off_Hook, by resending a LI6:Off_Hook message. Load Information knows that the sending Gateway is rejecting the required proportion of new calls, so passes this on to its Call Control by sending a CC1:Off_Hook message. Call Control accepts the call initiation, and requests the Gateway to continue by sending a LI9:Response to Load Information. Load Information passes this on to the Gateway by sending a GW10:Response containing appropriate parameters. The Gateway reacts by supplying Dial Tone to the End User, to prompt the input of digits.

FIG. 14 shows the case where the Gateway decides to reject the Off_Hook request on the initial filtering. The Gateway informs the End User by supplying Network Busy Tone, the Call Server is unaware of the call.

FIG. 15 shows the case where the Gateway decides to pass on the Off_Hook, but the Call Server then rejects the call. The Gateway sends a LI6:Off_Hook message. Load Information knows that the overload level has increased since it last notified the Gateway and so rejects the Off_Hook with a Response containing a new notification. The Gateway filters the Off_Hook again, this time with higher reject_rate, and again decides to submit it to the Call Server. Load Information knows that the sending Gateway is rejecting the required proportion of new calls, so passes this on to its Call Control by sending a CC1:Off_Hook message. Call Control rejects the call initiation, and tells the Gateway to stop by sending a LI8:Reject_Call_For Load. Load Information passes this on to the Gateway by sending a GW10:Response message containing appropriate parameters. The Gateway reacts by supplying Network Busy tone to the End User.

FIG. 16 shows the case where the Gateway decides to reject the Off_Hook rejected by the Call Server. The Gateway informs the End User by supplying Network Busy Tone.

The present invention is not limited to any of the specific embodiments described above that are given by way of example only. It will be appreciated that modifications may be introduced to the specific embodiments described here without departing from the scope of the invention. For example, various message formats and protocols may be used to implement the present invention. The invention advantageously allows for improved performance in communications systems, such as those based on IP, by providing source nodes with indications of processing loads further "downstream" wherein the source nodes are able to provide control of messages in a prompt and efficient manner based on the indications received.

The invention claimed is:

1. A communications system comprising:
   a source node configured to communicate messages with a target node;
   the target node comprising:
      processing logic configured to process at least some of the messages received from the source node;
      load detection logic configured to detect a processing load of the target node;
      load control logic configured to notify the source node when a predetermined processing load level has been reached or exceeded, and to instruct the source node to reject a portion of the messages received at the source node without forwarding the messages to the target node by responding to each off-hook notification forwarded by the source node with a Negative Acknowledgment (NAK) and an overload level of the target node; and
   the source node comprising:
      message filtering logic configured to reduce a rate at which messages are sent to the target node responsive to receiving the instruction from the target node by rejecting messages at the level indicated by the target node, and wherein a message that is not rejected is re-transmitted to the target node for processing.

2. The communications system of claim 1 wherein the target node comprises a call server.

3. The communications system of claim 1 wherein the source node is configured to function as a media gateway.

4. The communications system as claimed in claim 1 wherein the source node is configured to reject subsequent off-hook requests.

5. The communications system of claim 1 wherein the source node is configured to send messages of more than one type to the target node, and wherein the target node is configured to identify the type of message received, and send a notification to the source node responsive to identifying a new connection request.

6. The communications system of claim 1 wherein the messages are categorized as being one of a low priority message and a high priority message, and wherein the source node is configured to only reduce the rate of the low priority messages.

7. The communications system of claim 6 wherein the source node is configured to:
process the high priority messages using less restrictive filtering logic to increase the chance of the high priority messages being successfully sent to the target node.

8. The communications system of claim 1 wherein a subset of end users is guaranteed service when the system is overloaded.

9. The communications system of claim 1 wherein the source node is configured such that a message to an emergency service bypasses the message filtering logic.

10. The communications system of claim 1 wherein the message filtering logic is configured to decrease the rate at which messages are sent to the target node if the source node does not receive additional notifications for a predetermined time.

11. The communications system of claim 1 wherein the message filtering logic is configured to increase the rate at which messages are sent to the target node if the source node does not receive additional notifications for a predetermined time.

12. The communications system of claim 1 wherein the source node further comprises network termination equipment that provides media gateway functionality.

13. The communications system of claim 1 wherein the target node further comprises recording logic to record notification information sent to the source node.

14. The communications system of claim 1 wherein the target node is configured to communicate messages with one or more source nodes, and wherein the target node is configured to notify only those source nodes that send a message to the target node during a time period in which the processing load reaches or exceeds the predetermined processing load level.

15. The communications system of claim 14 wherein the target node is configured to notify any of the source nodes responsive to receiving another message from the one or more source nodes following an increase in the processing load.

16. The communications system of claim 14 wherein the target node is configured to notify any of the source nodes only once for a selected processing load level.

17. The communications system of claim 14 wherein the target node is configured to include a notification in one or more additional messages sent to the one or more source nodes independently of whether the processing load reaches or exceeds the predetermined processing load level.

18. The communications system of claim 14 wherein the target node is configured to notify one or more of the source nodes in periodic non-call related messages independently of whether the processing load reaches or exceeds the predetermined processing load level.

19. The communications system of claim 14 wherein the target node is configured to send another notification to those source nodes that have already received a previous notification if the processing load reaches or exceeds the predetermined processing load level, and an overload level has increased.

20. The communications system of claim 1 wherein the processing load comprises the rate at which messages are received from one or more source nodes.

21. The communications system of claim 20 wherein the received messages comprise new connection requests.

22. The communication system of claim 1 wherein the messages comprise Internet Protocol messages.

23. A method of controlling a load at a target node comprising:
receiving messages from a source node;
processing at least some of the received messages at a target node by:
detecting a processing load of the target node;
notifying the source node when the processing load reaches or exceeds a predefined processing load level; and
instructing the source node to reject a portion of messages received at the source node without passing the messages on to the target node by responding to each off-hook notification forwarded by the source node with a Negative Acknowledgment (NAK) and an overload level of the target node; and
reducing, at the source node, a rate at which messages are sent to the target node responsive to the instruction by rejecting messages at the level indicated by the target node, and wherein a message that is not rejected is re-transmitted to the target node for processing.

24. The method of claim 23 wherein the target node is a call server.

25. The method of claim 23 wherein the source node is configured to function as a media gateway.

26. The method of claim 23 wherein the source node rejects subsequent off-hook requests.

27. The method of claim 23 wherein the source node is configured to send messages of more than one type to the target node, and further comprising the target node:
identifying a type of message received from the source node;
sending a notification to the source node responsive to identifying a new connection request.

28. The method of claim 27 further comprising:
characterizing the messages as one of a low priority message or a high priority message at the source node; and
reducing only the rate of the low priority messages at the source node.

29. The method as claimed in claim 28 further comprising processing the high priority messages using less restrictive logic to increase the chance of the high priority messages being successfully sent to the target node.

30. The method of claim 23 further comprising guaranteeing service to a subset of end users when the system is overloaded.

31. The method of claim 23 further comprising:
receiving, at the source node, a message to an emergency service; and
allowing the emergency message to bypass logic that reduces the rate at which messages are sent to the target node.

32. The method of claim 23 further comprising the source node decreasing the rate at which it sends messages to the target node if the source node does not receive additional notifications for a predetermined time.

33. The method of claim 23 further comprising the source node increasing the rate at which it sends messages to the target node if the source node does not receive additional notifications for a predetermined time.

34. The method of claim 23 the source node comprises network termination equipment that provides media gateway functionality.

35. The method of claim 23 further comprising recording information associated with notifying the source node.

36. The method of claim 23 wherein the target node is configured to communicate messages with one or more source nodes, and further comprising notifying only those source nodes that provide a message to the target node during a time period when the predetermined processing load has been reached or exceeded.

37. The method of claim 36 further comprising sending a new notification to the one or more of the source nodes responsive to receiving another message from any of the source nodes following an increase in the processing load.

38. The method of claim 36 further comprising the target node notifying any one of the source nodes only once for a selected processing load level.

39. The method of claim 36 further comprising the target node including a notification in every message sent to a source node independently of whether the processing load reaches or exceeds the predefined processing load level.

40. The method of claim 36 further comprising the target node notifying the one or more of the source nodes in periodic non-call related messages independently of whether the processing load reaches or exceeds the predefined processing load level.

41. The method of claim 36 further comprising the target node sending another notification to one or more source nodes that have already received a previous notification if the processing load reaches or exceeds the predefined processing load level, and the overload level has increased.

42. The method of claim 23 wherein detecting a processing load of the target node comprises detecting the rate at which messages are received from the source node.

43. The method of claim 42 wherein detecting the rate at which messages are received from the source node comprises detecting the rate at which new connection requests are received from the source node.

44. The method of claim 23 wherein the messages comprise Internet protocol messages.

45. A node for a communications system comprising:
processing logic, that when executed by the node, configures the node to process messages received from a remote communication node;
load detection logic, that when executed by the node, configures the node to detect a processing load; and
load control logic, that when executed by the node, configures the node to notify the remote node when a predetermined processing load level has been reached or exceeded, and to instruct the remote node to reject a portion of the messages received at the remote node without forwarding the messages to the node by replying, to the remote node, to each off-hook notification that is forwarded by the remote node with a Negative Acknowledgment (NAK) and an overload level of the node.

46. The node of claim 45 wherein the node comprises a call server.

47. A node for a communications system comprising:
processing logic, that when executed by the node, configures the node to communicate messages with a remote communication node; and
message filtering logic, that when executed by the node, configures the node to:
receive, in reply to each off-hook notification that is forwarded by the node to the remote node, a notification from the remote node that a predetermined processing load level has been reached or exceeded; and
reduce a rate at which messages are sent to the remote node responsive to receiving an instruction from the remote node by rejecting messages at the level indicated by the remote node, and wherein a message that is not rejected is re-transmitted to the remote node for processing.

48. The node of claim 47 wherein the node comprises a media gateway.

49. The node of claim 47 wherein the message filtering logic is configured to reduce the rate at which the messages are sent to the remote node by rejecting at least a portion of the messages received at the node without forwarding the messages to the remote node.

* * * * *

UNITED STATES PATENT AND TRADEMARK OFFICE
CERTIFICATE OF CORRECTION

| | |
|---|---|
| PATENT NO. | : 8,817,609 B2 |
| APPLICATION NO. | : 11/570008 |
| DATED | : August 26, 2014 |
| INVENTOR(S) | : Broadhurst et al. |

Page 1 of 1

It is certified that error appears in the above-identified patent and that said Letters Patent is hereby corrected as shown below:

On the Title Page, in Item (56), under "OTHER PUBLICATIONS", in Column 2, Line 1, delete "EP 0955749 11/1999".

In the Drawings

In Fig. 18, Sheet 27 of 47, delete "Gayeway" and insert -- Gateway --, therefor.

In the Specification

In Column 2, Line 7, delete "Protcol" and insert -- Protocol --, therefor.

In Column 2, Line 60, delete "node" and insert -- node. --, therefor.

In Column 3, Line 17, delete "shows" and insert -- show --, therefor.

Signed and Sealed this
Seventh Day of July, 2015

Michelle K. Lee
*Director of the United States Patent and Trademark Office*